United States Patent [19]

Fujimoto et al.

[11] Patent Number: 5,170,463
[45] Date of Patent: Dec. 8, 1992

[54] NEURO-COMPUTER

[75] Inventors: Yoshiji Fujimoto; Naoyuki Fukuda, both of Nara; Toshio Akabane, Tenri, all of Japan

[73] Assignee: Sharp Kabushiki Kaisha, Osaka, Japan

[21] Appl. No.: 885,239

[22] Filed: May 20, 1992

Related U.S. Application Data

[63] Continuation of Ser. No. 456,649, Dec. 27, 1989, abandoned.

[30] Foreign Application Priority Data

Dec. 29, 1988 [JP] Japan .............................. 63-330971
Feb. 1, 1989 [JP] Japan .............................. 1-24307
May 19, 1989 [JP] Japan .............................. 1-127274

[51] Int. Cl.$^5$ .......................................... G06F 15/16
[52] U.S. Cl. ........................................ 395/11; 395/24; 395/27; 364/DIG. 2; 364/DIG. 1
[58] Field of Search ............................ 395/11, 24, 27; 364/200, 900

[56] References Cited

U.S. PATENT DOCUMENTS

| | | | |
|---|---|---|---|
| 4,514,807 | 4/1985 | Nogi | 364/200 |
| 4,633,472 | 12/1986 | Krol | 364/200 |
| 4,644,496 | 2/1987 | Andrews | 364/513 |
| 4,660,166 | 4/1987 | Hopfield | 364/807 |
| 4,709,327 | 11/1987 | Hillis et al. | 364/513 |
| 4,739,476 | 4/1988 | Fiduccia | 364/513 |
| 4,766,534 | 8/1988 | De Benedictis | 364/513 |
| 4,796,199 | 1/1989 | Hammerstrom et al. | 364/513 |
| 4,809,193 | 2/1989 | Jourjine | 364/513 |
| 4,811,210 | 3/1989 | McAulay | 364/513 |
| 4,858,147 | 8/1989 | Conwell | 364/200 |
| 4,891,782 | 1/1990 | Johnson | 364/786 |
| 4,908,751 | 3/1990 | Smith | 364/513 |
| 4,912,647 | 3/1990 | Wood | 364/513 |
| 4,918,617 | 4/1990 | Hammerstrom et al. | 364/513 |
| 4,918,618 | 4/1990 | Tomlinson, Jr. | 364/513 |
| 4,920,487 | 4/1990 | Baffes | 364/200 |
| 4,942,517 | 7/1990 | Cok | 364/200 |
| 4,951,239 | 8/1990 | Andes et al. | 364/807 |

OTHER PUBLICATIONS

The Computer Journal, vol. 30, No. 5, Oct. 1987, pp. 413-419; B. M. Forrest et al: "implementing neural network models on parallel computers".

(List continued on next page.)

Primary Examiner—Allen R. MacDonald
Assistant Examiner—George Davis
Attorney, Agent, or Firm—Nixon & Vanderhye

[57] ABSTRACT

A neurocomputer connected to a host computer, the neurocomputer having a plurality of processor elements, each of the processor elements being placed at each of node of a lattice respectively, the neurocomputer includes a plurality of first processor elements, each of the first processor elements being placed at a node of the lattice, capable of transmitting data from and to the host computer and capable of transmitting the data to one of adjacent processor elements, a plurality of second processor elements, each of the second processor elements being placed at a node of the lattice, capable of receiving the data from one of adjacent processor elements, and capable of sending the data to another adjacent processor elements from which the data is not outputted. The neurocomputer also includes a plurality of rectangular regions, each of the rectangular regions including a plurality of the processor elements, a plurality of physical processors, each of the processors being placed in each of the rectangular regions and connected with adjacent processors each other, each of the processors being capable of inputting and outputting to and from the host computer and having all functions of the processor elements included in the rectangular region, and a device for distributing the physical processors to one or a plurality of divided sections formed in the rectangular regions in such a manner that each of the sections is substantially equally assigned to each of the physical processors by permutation.

33 Claims, 45 Drawing Sheets

OTHER PUBLICATIONS

Proceedings of the 1983 International Conference on Parallel Processing, Columbus, Ohio, Aug. 1983, pp. 95-105. IEEE, New York US; T. Hoshino et al: "Highly parallel processor array PAX for wide scientific applications".

1988 Cern School of Computing, Oxford, Aug. 1988, pp. 104-126; P. C. Treleaven: "Parallel architectures for neurocomputers".

IEEE Communications Magazine, vol. 26, No. 6, Jum. 1988, pp. 45-50; T. G. Robertazzi: "Toroidal networks".

Proceedings of the IEEE 1988 National Aerospace and Electronics Conference NAECON '88, Dayton, May 1988, vol. 4, pp. 1574-1580; B. C. Deer et al: "Parallel processor for the simulation of adaptive networks".

D. A. Pomerleau et al, "Neural Network Simulation at Warp Speed: How We Got 17 Million Connections Per Second," Proceedings of the IEEE ICNN, San Diego, Calif., Jul. 1988, vol. II, pp. 143-150.

S. Y. Kung and J. N. Hwang, "Parallel Architectures for Artificial Neural Networks," Proceedings of the IEEE ICNN, San Diego, Calif., Jul. 1988, vol. II, pp. 165-172.

S. Y. Kung and J. N. Hwang, "Ring Systolic Designs for Artificial Neural Nets," Abstracts of the First Annual INNS Meeting, Boston, Mass., Sep. 1988, p. 390.

G. Blelloch and C. R. Rosenberg, "Network Learning on the Connection Machine," Proceedings of the IJ-CAI, Milano, Italy, Aug. 1987, pp. 323-326.

A. Johannet et al, "A Transputer-Based Neurocomputer," Parallel Programming of Transputer Based Machines: Proceedings of the 7th OCCAM User Group Technical Meeting Grenoble, France, Sep. 1987, pp. 120-127.

D. Suter and X. Deng, "Neural Net Simulation on Transputers," Australian Transputer and OCCAM User Group Conference Proceedings, Royal Melbourne Institute of Technology, Jun. 1988, pp. 43-47.

Jim Baily and Dan Hammerstrom, "Why VLSI Implementation of Associative VLCNs Require Connection Multiplexing," Proceedings of the IEEE ICNN, San Diego, Calif., Jul. 1983, vol. II, pp. 173-180.

M. Rundnick and D. Hammerstrom, "An Interconnect Structure for Wafer Scale Neurocomputers," Abstracts of the First annual INNS Meeting, Boston, Mass., Sep. 1988, p. 405.

T. Beynon and N. Dodd, "The Implementation of Multi-Layer Perceptron on Transputer Networks," Parallel Programming of Transputer Based Machines: Proceedings of the 7th OCCAM User Group Technical Meeting Grenoble, France, Sep. 1987, pp. 108-119.

NP:NODE PROCESSOR

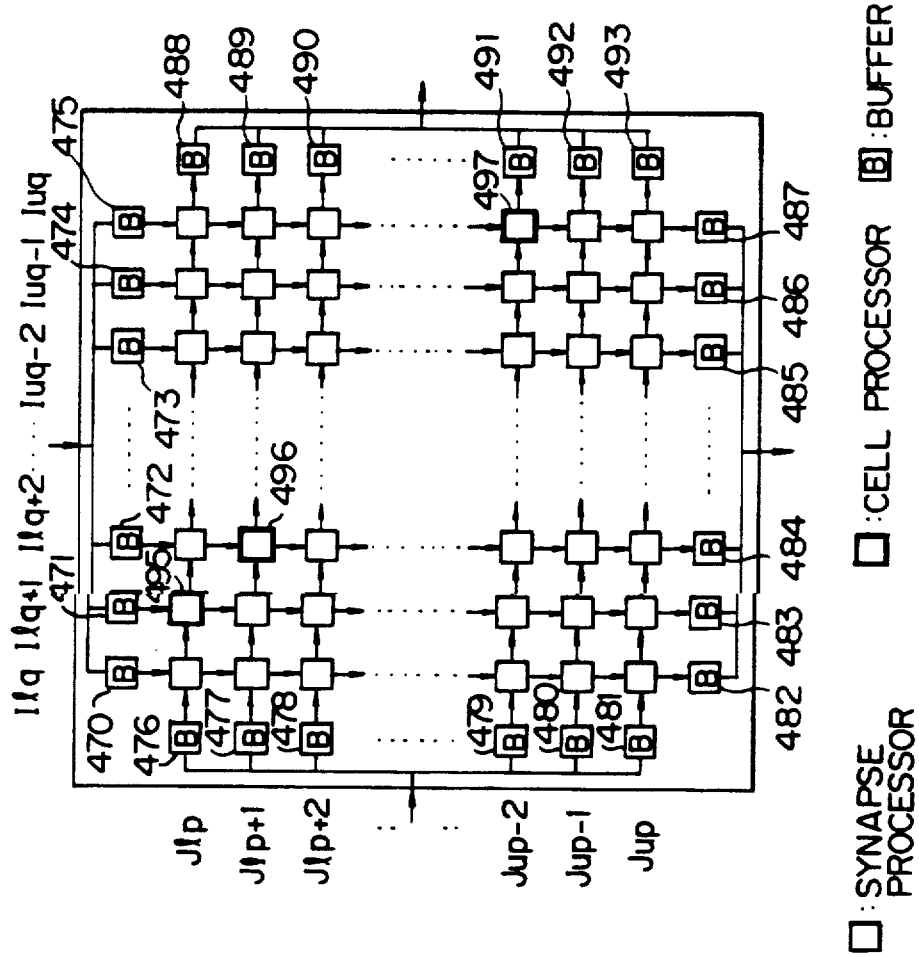

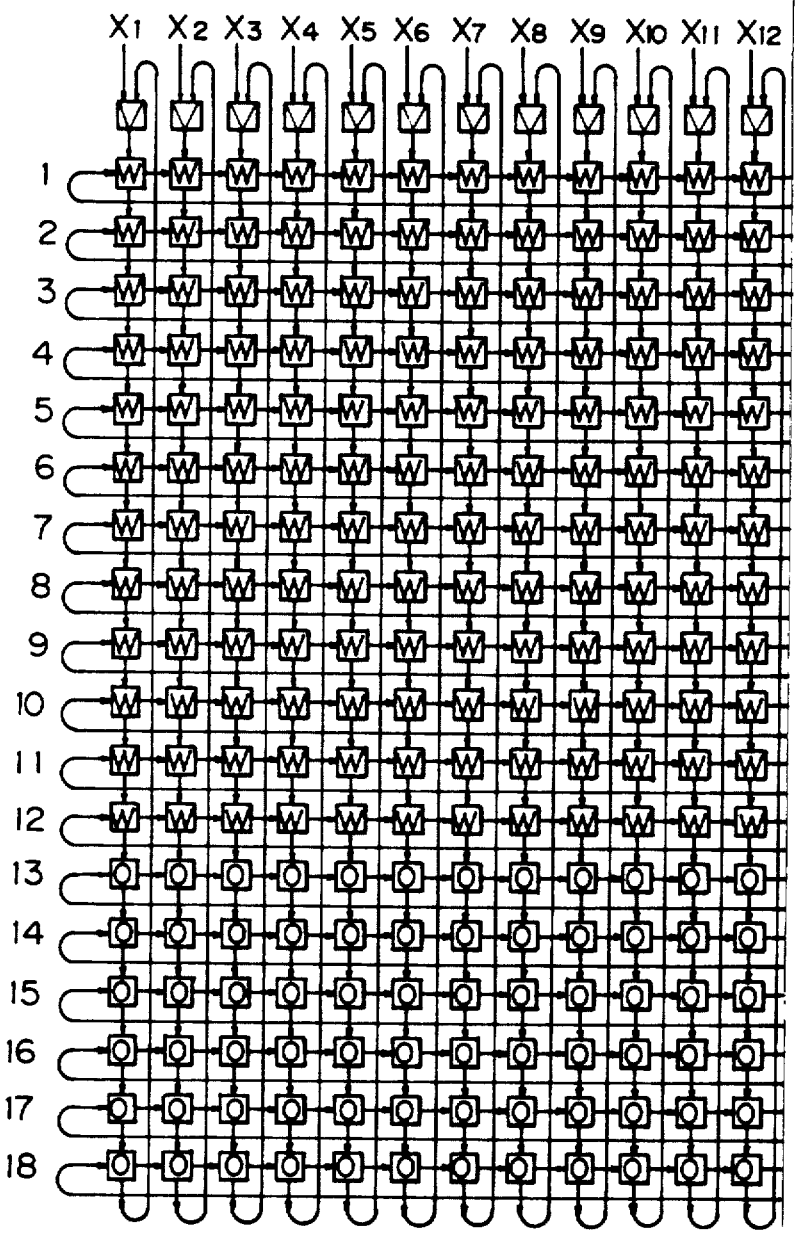

☒ : OUTPUT PROCESSOR     ⊠ : INPUT/OUTPUT PROCESSOR

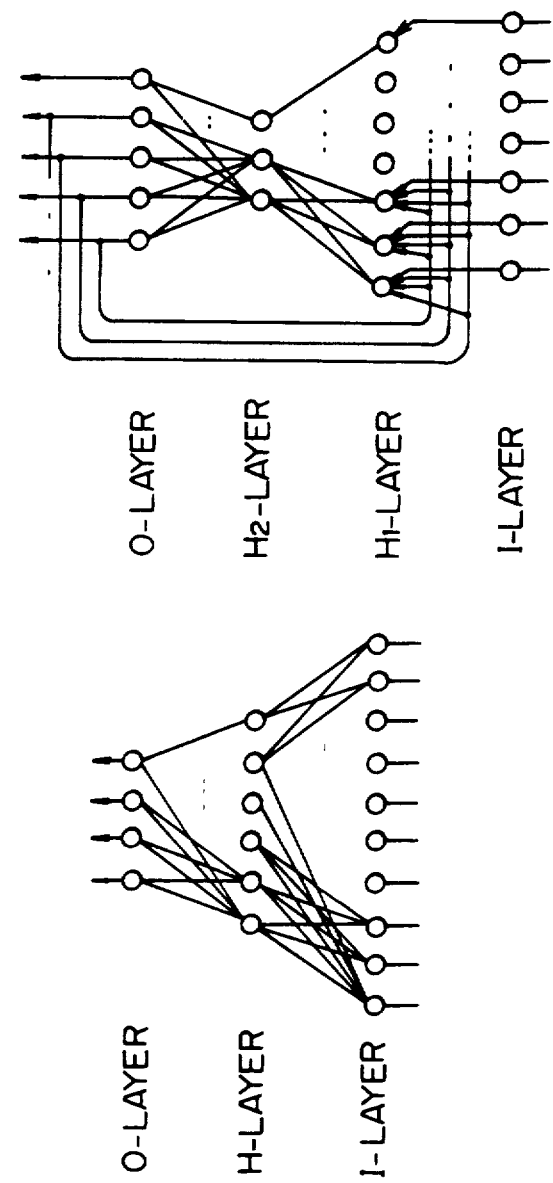

Fig.23

|   | 1 | 2 | ... | 166 | 499 | ... | 664 | 1001 | 1002 | ... | 1166 | 1449 | ... | 1664 | 997 | 1000 | 1999 |
|---|---|---|---|---|---|---|---|---|---|---|---|---|---|---|---|---|---|
|   | ↓ | ↓ | ↓ | ↓ | ↓ | ↓ | ↓ | ↑ | ↑ | ↑ | ↑ | ↑ | ↑ | ↑ | ↓ | ↓ | ↑ |
| 2 | W | O | O | O | O | O | O | C | W | W | W | W | W | W | O | O | W |
| 3 | O | W | O | O | O | O | O | W | C | W | W | W | W | W | O | O | W |
| . | O | O | . | O | O | O | O | W | W | . | W | W | W | W | O | O | W |
| 167 | O | O | O | W | O | O | O | W | W | W | C | W | W | W | O | O | W |
| . | O | O | O | O | O | O | O | W | W | W | W | W | W | W | O | O | W |
| 499 | O | O | O | O | O | O | O | W | W | W | W | W | W | W | O | O | W |
| 999 | O | O | O | O | O | O | O | W | W | W | W | W | W | W | O | O | W |
| 1001 | O | O | O | O | O | O | O | W | W | W | W | W | W | W | O | W | W |

1ST-LINE, 1ST-COLUMN ACTUAL PROCESSOR

|   |   |   |   |   |   |   |   |   |   |   |   |   |   |   |   |   |   |
|---|---|---|---|---|---|---|---|---|---|---|---|---|---|---|---|---|---|
| 500 | O | O | O | O | W | O | O | W | W | W | W | C | W | W | O | O | W |
|   | O | O | O | O | O | . | O | W | W | W | W | W | . | W | O | O | W |
| 665 | O | O | O | O | O | O | W | W | W | W | W | W | W | C | O | O | W |
|   | O | O | O | O | O | O | O | W | W | W | W | W | W | W | O | O | W |
| 997 | O | O | O | O | O | O | O | W | W | W | W | W | W | W | O | O | W |
| 998 | O | O | O | O | O | O | O | W | W | W | W | W | W | W | W | O | W |
| 1000 | O | O | O | O | O | O | O | W | W | W | W | W | W | W | O | O | C |

2ND-LINE, 1ST-COLUMN ACTUAL PROCESSOR

↓: INPUT PROCESSOR
↑: OUTPUT PROCESSOR
O: ZERO PROCESSOR
C: CELL PROCESSOR
W: SYNAPSE PROCESSOR

```
W11 W12 W13 · · ·        W1n
W21
  ·
  ·
  ·
Wm1 · · ·              · Wmn
```

```
W11 O   O  · · ·         O
O   W22 O
O   O   W33
                         ·
  ·
    ·
      ·
O   · · · ·            Wnn
```

NP: NODE PROCESSOR

☐ : SYNAPSE PROCESSOR   ☐ : CELL PROCESSOR
Ⓑ : BUFFER MEMORY       ▽ : INPUT PROCESSOR
△ : OUTPUT PROCESSOR    ⊠ : INPUT/OUTPUT PROCESSOR

☐ : SYNAPSE PROCESSOR
☐ : CELL PROCESSOR
Ⓑ : BUFFER MEMORY

W : SYNAPSE PROCESSOR (WITH CONNECTION)
▽ : INPUT PROCESSOR

◻ : SYNAPSE PROCESSOR (NO CONNECTION)
△ : OUTPUT PROCESSOR

□ : CELL PROCESSOR
⊠ : INPUT/OUTPUT PROCESSOR

W : SYNAPSE PROCESSOR (WITH CONNECTION)
◨ : INPUT PROCESSOR

☐ : SYNAPSE PROCESSOR (NO CONNECTION)
☒ : OUTPUT PROCESSOR

□ : CELL PROCESSOR
⊠ : INPUT/OUTPUT PROCESSOR

NEURO-COMPUTER

This is a continuation of application Ser. No. 07/456,649, filed Dec. 27, 1989, now abandoned.

BACKGROUND OF THE INVENTION

1. Field of the Invention

The present invention relates to a neuro-computer capable of simulating large-scale neural networks constituted on the basis of a neuron model by using parallel processors.

2. Description of the related Art

A high speed general purpose computer is used in order to simulate large-scale neural networks constituted on the basis of a neuron model. However, it takes considerably long time to simulate the learning process of even small-scale neural networks. Therefore, it takes several weeks to simulate the learning process of intermediate scale neural networks. Therefore, the parallel processings using multiprocessors have been introduced recently in order to obtain the high performance. Various models of the neurons have been developed, however only one type of neuron model is usually used in a neural network, and it is rare to use a plurality of models in a neural network. As described above, since the same calculations are executed for simulating neurons in a neural network, the simulation of a neural network is considered to be a suitable for parallel-processing. Therefore, the simulations using a general purpose parallel computer have been attempted. Since the large-scale neural networks include a large amount of connections between neurons, it is a critical factor to select a method of connecting the processors in the case where the simulation is done by multiprocessors. There have been developed various systems such as a mesh type (a lattice type) connection, a cross-bar connection, a tree type connection, a multilevel cross type connection, a cubic type connection, and the like as the method of connection in the parallel computers. In particular, the tree type connection, the multilevel cross-bar type connection, and the cubic type connection are considered to be suitable for simulating the neural networks. However, when the number of the processors is increased, it arises the problems such as a number of switch circuits becomes large, the capacity of the transmission becomes short, and the increasing number of the line intersections causes the implementation to be hard. Therefore, a method of connecting the processors in a parallel-processing for the efficient simulation of the neural networks has not been established.

Since the neural networks consist of the neurons of the same type, a high speed simulation is expected on the parallel processing of multi-processors. However, there are many connections in large-scale neural networks which correspond to the synapses of neurons and the number of the connections is increased in substantially proportion to the square of the number of neurons. Therefore, in the case where the whole neurons are divided into a proper number of groups, each of which has a processor and a simulation is executed by multi-processors, the connections for transmitting information between the processors are necessary since there are connections between the neurons in each of the groups. When the number of the processors are increased in order to raise the performance, the number of the connections between the processors is increased in substantially proportion to the square of the number of the processors. Furthermore, for high speed transmission between the processors, the transmitting capacity must be enlarged and the transmitting speed must be raised by providing parallel transmission lines. That is, when the number of parallel processors are increased for the high speed simulation, the number of the connections between the processors will be increased excessively, causing to make the implementation impossible.

SUMMARY OF THE INVENTION

An object of the present invention is to provide a neuro-computer consisting of parallel processors which can be easily connected to each other and realize a high parallelism in the performance.

Another object of the present invention is to provide a neuro-computer exhibiting an improved efficiency in the parallel processings and thereby capable of executing high speed processings by assigning the physical processors to the virtual processors in such a manner that the load of the processing can be balanced in each of the physical processors.

According to the present invention, the above-described first object can be achieved by a neuro-computer connected to a host computer, said neuro-computer having a plurality of processor elements, each of said processor elements being placed at each nodes of a lattice respectively, said neuro-computer comprising: a plurality of first processor elements, each of said first processor elements being disposed at a node of said lattice, capable of transmitting data from and to said host computer and capable of transmitting said data to one of adjacent processor elements; and a plurality of second processor elements, each of said second processor elements being disposed at a node of said lattice, capable of receiving said data from one of adjacent processor elements, and capable of sending said data to another one of said adjacent processor elements from which said data is not outputted.

According to the present invention, the above-described second object can be achieved by a neuro-computer comprising: a plurality of first processor elements, each of said first processor elements being placed at a node of said lattice, capable of transmitting a data from and to said host computer and capable of transmitting said data to one of adjacent processor elements; a plurality of second processor elements, each of said second processor elements being placed at a node of said lattice, capable of receiving said data from one of adjacent processor elements, and capable of sending said data to another one of said adjacent processor elements from which said data is not outputted; a plurality of rectangular regions, each of said rectangular regions including a plurality of said processor elements; a plurality of physical processors, each of said processors being assigned in each of said rectangular regions and connected with adjacent processors each other, each of said processors being capable of inputting and outputting to and from said host computer and having all functions of said processor elements included in said rectangular region; and unit for distributing said physical processors to one or a plurality of divided sections formed in said rectangular regions in such a manner that each of said sections is substantially equally assigned to each of said physical processors by permutation.

Preferably, the distribution means is capable of distributing said physical processors in such a manner that a number of a column of said processor elements in each of said rectangular regions is substantially equally divided into a plurality of sections by a number of all of said physical processors or by a number of said physical processors in a column direction, and a number of rows of said processor elements in each of said rectangular regions is substantially equally divided into a plurality of sections by a number of all of said physical processors or by a number of physical processors in a row direction, and one or a plurality of said divided sections of in said rectangular regions are substantially equally assigned to each of said physical processors by permutation.

Preferably, each of said rectangular regions is divided and permutated in such a manner that a number of rows and columns are divided by a number of all physical processors, a minimum division unit being formed for each number of said physical processors in said column direction after forming said division so as to assign said division to one row of said physical processors in said row direction for permutation in said row direction; and said minimum division unit being assigned to one column of said physical processors in said column direction at an interval corresponding to a number of said physical processors in a direction of said column for permutation in said column direction.

Preferably, the rectangular regions are equally divided with a residue being generated during said division thereof, said all of generated residue are individually stored in each of a plurality of residue arrays for rows and columns.

Preferably, the residue arrays are successively assigned to rows and columns of said physical processors subjected to said permutation, said physical processors in a row direction and said physical processors in a column direction are respectively arranged to have differences being restricted within one row or one column in a number of said rows and columns of said processor elements to be assigned one column.

Preferably, the first processor elements include a plurality of virtual processors consist of input processors, output processors, and input/output processors.

Preferably, the second processor elements consist of two kinds, one of said kinds being capable of product-sum functions, weight updating functions and the like corresponding to functions of a synapse, and the other one of kinds being capable of threshold functions and neuro-dynamic functions corresponding to activation functions of a cell body.

Furthermore preferably, the second processor elements include a plurality of virtual processors consist of synapse processors and cell processors.

Further objects and advantages of the present invention will be apparent from the following description, reference being had to the accompanying drawings wherein preferred embodiments of the present invention are clearly shown.

BRIEF DESCRIPTION OF THE DRAWINGS

FIGS. 7A, 7B, and 7C are views each of which illustrates the structure of the neuro-computer system consisting of node processors coupled in the form of a toroidal lattice shape and the internal structure of each of the node processor;

FIGS. 9A, 9B, and 9C illustrate the structure of a toroidal lattice comprising a synapse processor, a cell processor, an input processor, an output processor, and an input/output processor for executing a simulation of the three-layered perceptron shown in FIG. 5;

FIGS. 16A, 16B, 16C, and 16D are views each of which illustrates the model of the neural networks;

FIG. 23 is a view which illustrates a portion of the matrix of the physical processors to which the above-described virtual processors are plotted;

Figures 24A, 24B, 24C, 24D:
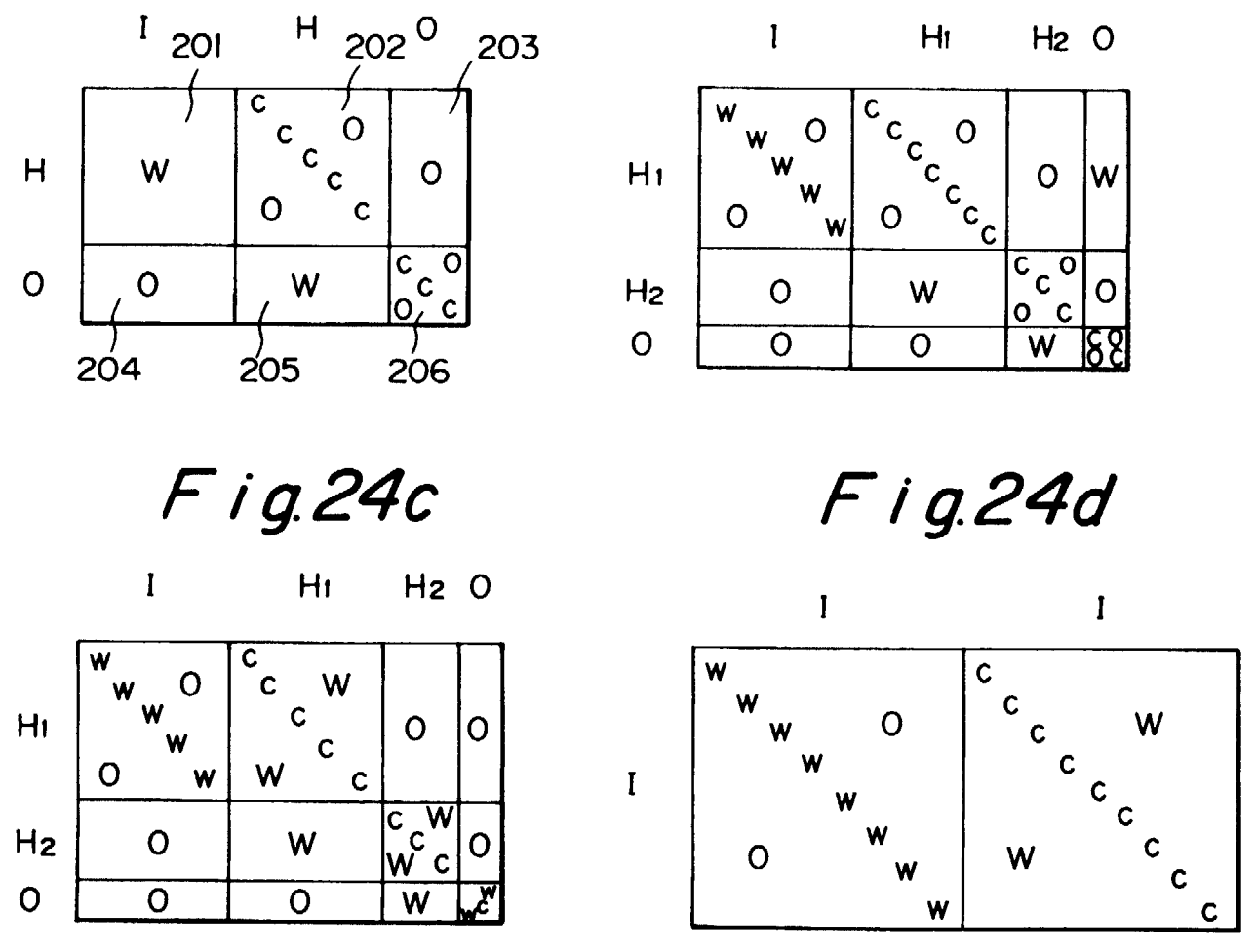

FIGS. 24A, 24B, 24C, and 24D are views each of which illustrates the matrix of the virtual processors for simulating the model of the above-described neural networks; and FIGS. 25A, 25B, 25C, 25D, and 25E are views each of which illustrates the matrix pattern in which a predetermined rectangular regions of the matrix of the above-described virtual processors are classified.

DESCRIPTION OF THE PREFERRED EMBODIMENTS

Figure 1:
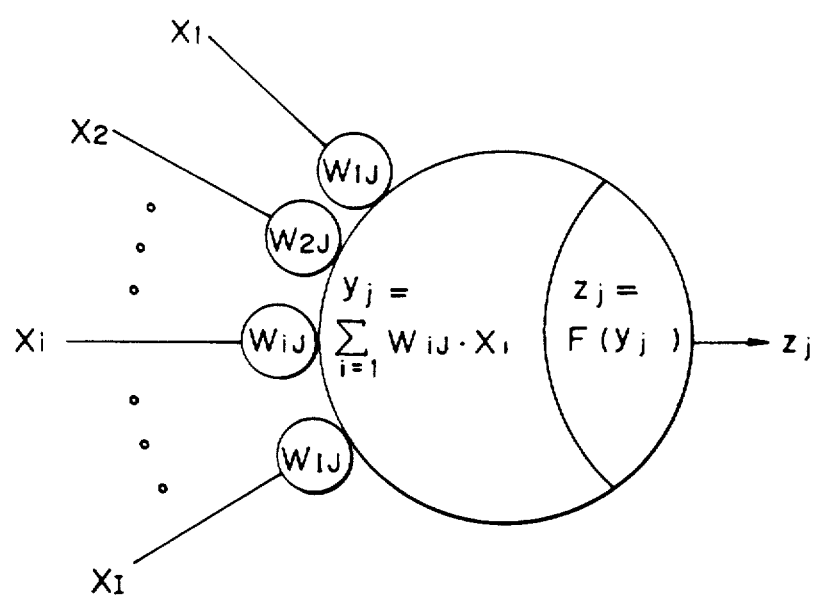
FIG. 1 is a view which illustrates the model of a usual neuron.

There are various models of neural networks. In general, the model of the neuron can be expressed by the following equation as shown in FIG. 1:

$$y_j = \sum_{i=1}^{n} W_{ij} \cdot X_i \qquad (1)$$

$$z_j = f(y_j) \qquad (2)$$

Equation (1) corresponds to the function of the synapse which is the product-sum operation of the coefficients of the connections (the weight) of the synapses and the corresponding inputs. Equation (2) corresponds to the function of the cell body, the Equation (2) being expressed in a usual manner in which it is changed depending upon the mode of the neuron. For example, in the case of a perceptron, it is expressed in the form of a sigmoid function, while in the case of a Hopfield model, it is expressed in the form of a differential equation.

Figure 2:
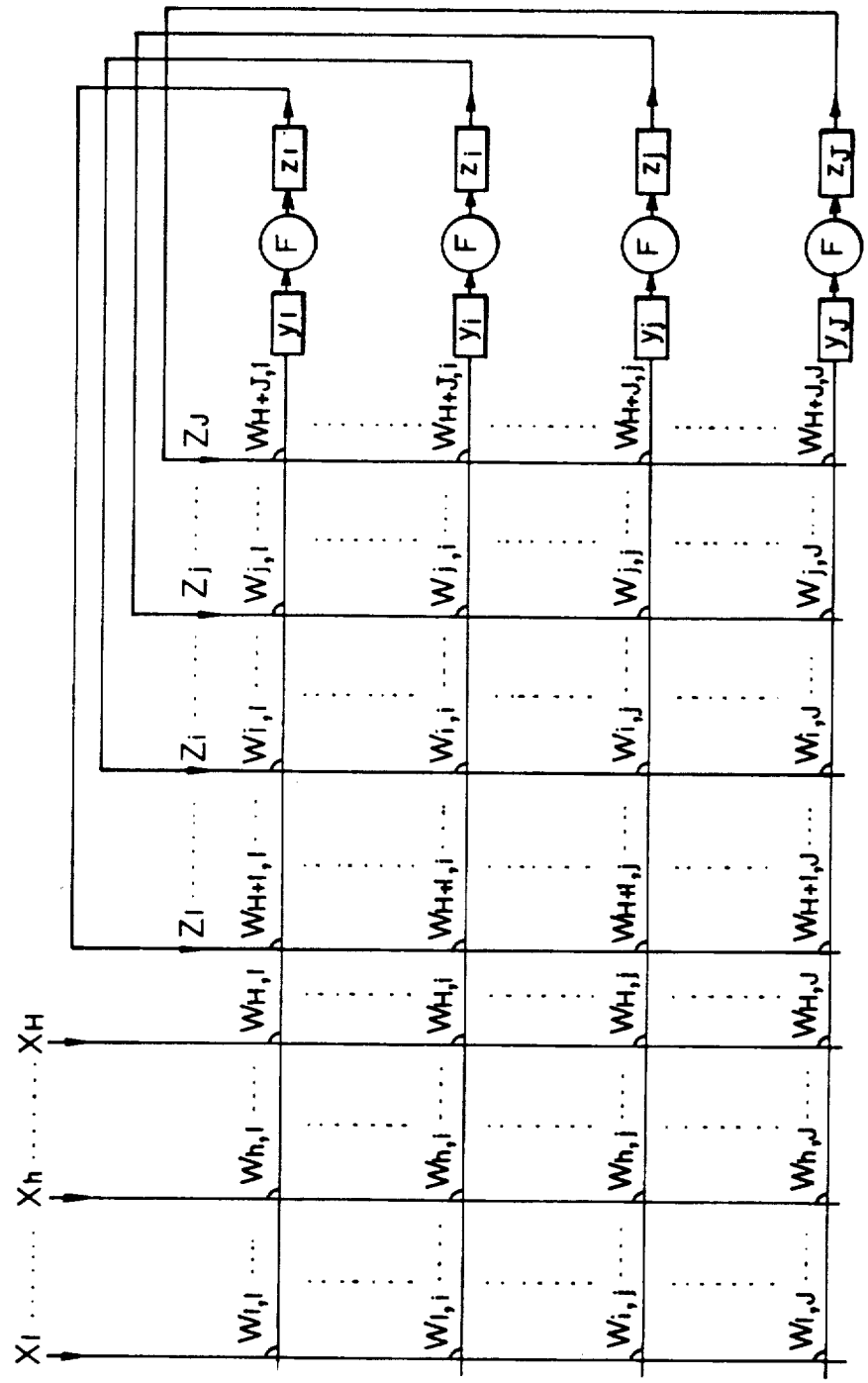
FIG. 2 is a view which illustrates the structure of a usual neural networks.

The neural networks are expressed in a general form as shown in FIG. 2. Provided that the input to the neural networks is column vector $x = (x_1, x_2, \ldots x_h, \ldots, x_H)^T$, the outputs from all of the neural networks are column vector $z = (z_1, z_2, \ldots z_j, \ldots, z_J)^T$, the intermediate results are column vector $y = (y_1, y_2, \ldots y_j, \ldots, y_J)^T$, the weight is matrix $W = [w_{ij}]$, the model of the neural networks can be expressed as follows where $(\ )^T$ represents the transpose between the column vector and the row vector.

$$y = W \cdot v \qquad (3)$$

where $v = [x^T, z^T] = (x_1, x_2, \ldots, x_H, z_1, z_2, \ldots, z_J)$, and [,] represents the concatenation of the vectors.

$$z = F(y) = (F(y_1), F(y_2), \ldots, F(y_j), \ldots, F(y_J))^T \qquad (4)$$

When the row elements of the matrix W is expressed by row vector $wj = (w_{1,j}, w_{2,j}, \ldots, w_{h,j}, \ldots, w_{H,j}, \ldots,$ $w_{H+Z,j}, \ldots, w_{H+j,j}, \ldots w_{J+H,j})$, Equation (1) can be expressed as follows in which the inner product of vector is used:

$$y_j = w_j \cdot v \qquad (5).$$

Further decomposing Equation (5), $y^i$ can be expressed by the recurrence formula of Equation (6):

$$y_j^i = y_j^{i-1} + w_{ij} \cdot v_i \qquad (6).$$

According to the model of the neural networks of this type, Equations (3), (5), and (6) correspond to the function of each of the synapses, the function being the product-sum operation of the coefficient of the connection (the weight) of the synapse and the input of the neural networks and the output of the cell. Equation (4) corresponds to the function of each of the cell bodies.

According to the present invention, in order to execute the largest number of the product-sum operation in parallel, in the calculations of the neural networks, the operation of Equation (6) in which the partial sum that is the decomposition of the product-sum operation, is calculated, and the storage of the weight which is necessary in this calculation are included in the synapse processor functions. The calculation of Equation (4) corresponding to the function of the cell body is executed by the cell processor. The synapse processor and the cell processor are connected to each other so as to form a lattice and can exchange information with the upper, the lower, the right, and the left processors. For example, in the case of Equation (6), a synapse processor receives signal $v_i$ which has been transmitted from the upper synapse processor, and executes the product operation between the weight $w_{ij}$ of the synapse processor and the signal $v_i$. Then, the partial sum $y_j^{i-1}$ which has been received from the left synapse processor is added to the result of the product operation so that a new partial sum $y_j^i = y_j^{i-1} + w_{ij} \cdot v_i$ is obtained. Finally, t thus new partial sum is transmitted to the right synapse processor. On the other hand, the synapse processor transmit the signal $v_i$ to the lower synapse processor which has been transmitted from the upper synapse processor. As described above, the partial sum is calculated through the synapse processors on a row. When the process reaches the cell processor placed on each row, the sum of the products operation is completed. The result of the product-sum operation is used for the calculation of $z_j$ given by Equation (4) in the cell processor. The output $z_j$ from the cell body is transmitted to the lower synapse processor so as to be used in the next calculation. Since one or no cell processor is placed on each column, the output from the cell processor does not overlap the output from the other cell processors. The product-sum operation for the neural network model executed by the synapse processor and the cell processor arranged in the form of a lattice can also be used in the learning of the neural networks.

In the case where, it is assumed that the synapse processor, the cell processor, the input processor, the output processor, the input/output processor are the virtual processors, the virtual processor groups arranged to form the J+1 rows and H+J columns are divided into P sections in the vertical direction and into O sections in the horizontal direction, a physical processor is assigned to each of the rectangular section which has been divided as described above, and a physical processor is connected to form P-rows, Q-columns toroidal lattice, each of the physical processor can parallel execute the product-sum operation which has been executed by the synapse processor. Equation (6) can be rewritten into an equation for each of the physical processors as follows:

$$y_j^q = y_j^{q-1} + \sum_{Ilq \leq i \leq Iuq} w_{ij} \cdot v_i \tag{7}$$

where Ilq and Iuq respectively represent the first column number and the final column number of the reactangular region corresponding to the physical processor of the P-row, Q-column. The product-sum operation in the latter half on the right side of Equation (7) can be executed in parallel by each of the physical processors. The calculation of Equation (4) to be executed by the cell processor cannot be executed before the completion of the calculation $y_j$. However, each physical processor which include the cell processors can parallel execute the calculations of Equation (4) when the calculation of $y_j$ has been completed. On the other hand, since the transmission of $y_j^q$ to the adjacent physical processor can be done during the calculation of the next $y_{j+1}^q$, the transmission between the actual processors cannot be any bottle neck.

Then, a description of the simulation of a multi-layer perceptron will be made as an application example of this invention. The neuron model of the perceptron can be expressed by the following equations provided that the input is $x_1$ and the coefficient of the connection is $w_{ij}$:

$$y_j = \sum_{i=1} w_{ij} \cdot x_i \tag{8}$$

$$z_j = f(y_j) = \frac{1}{1 + e^{-y_j/T}} \tag{9}$$

According to this model, Equation (8) corresponds to the function of the synapses which is the sum of the products of the coefficient of the connection (the weight) of the synapse and the input value. Equation (9) corresponds to the function of the cell body which is threshold-operation by a sigmoid function. As described above, in the perceptron model, the calculation for a neuron can be divided into the product-sum operation corresponding to the synapse and the calculation corresponding to the cell body.

Figure 3:
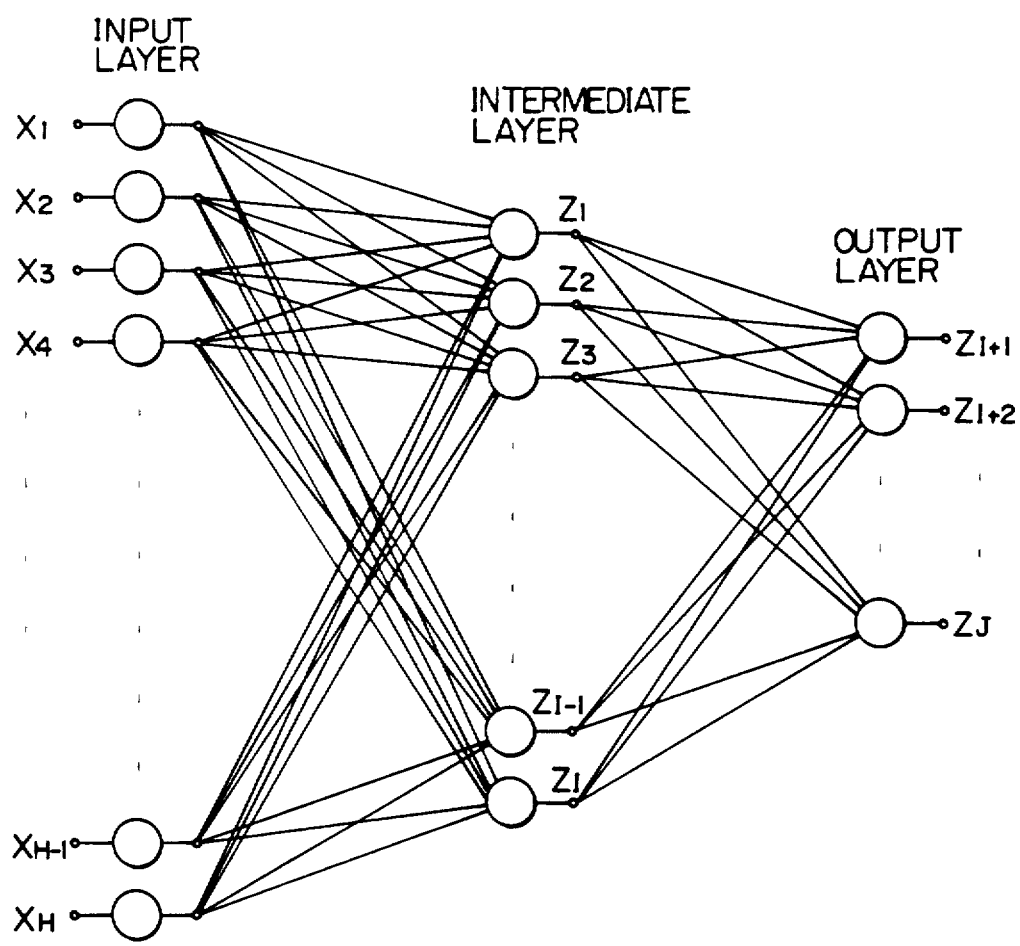
FIG. 3 is a view which illustrates the structure of a multi-layer perceptron.

The model of the multi-layer perceptron shown in FIG. 3 can be expressed as follows, where the n-th input to the neural networks is $x_h(n)$ [h=1, 2, ..., H, n=1, 2, ..., I, ..., J, n=1, 2, ..., N], and the coefficient of the connection (the weight) of the neural networks at the n-th learning iteration is wij (n) (i=1, 2, ..., H+J, j=1, 2, ..., J):

The first intermediate layer $$y_j(n) = \sum_{h=1}^{H} w_h(n) \cdot x_h(n) \tag{10}$$

$$z_j(n) = f(y_j(n)) = \frac{1}{1 + e^{-y_j/T}} \tag{11}$$

The intermediate layers except the first intermediate layer and the output layer $$y_j(n) = \sum_{i=H+1}^{H+J} w_{ij}(n) \cdot z_{i-H}(n) \tag{12}$$

$$z_j(n) = f(y_j(n)) = \frac{1}{1 + e^{-y_j/T}} \tag{13}$$

Provided furthermore that a target output value correspond to the input value $x_h(n)$ is $t_j(n)$, the supervised learning is performed by the error back propagation algorithm shown in Equations (14) to (19).

$$\Delta w_{ij}(n) = \alpha \cdot \delta_j(n) \cdot x_i(n) [i=1,2,...,H] \tag{14}$$

$$\Delta w_{ij}(n) = \alpha \cdot \delta_j(n) \cdot z_{i-H}(n) [i=H+1, H+2, ..., H+J] \tag{15}$$

$$w_{ij}(n+1) = w_{ij}(n) + \Delta w_{ij}(n) + \beta \cdot \Delta w_{ij}(n-1) \tag{16}$$

Output layer $$\begin{aligned}\delta_j(n) &= f'(y_j(n)) \cdot (t_j(n) - z_j(n)) \\ &= [z_j(n) \cdot (1 - z_j(n)] \cdot (t_j(n) - z_j(n))\end{aligned} \tag{17}$$

Intermediate layer $$S_j(n) = \sum_{k=1}^{J} \delta k(n) \cdot w_{H+J,k}(n) \tag{18}$$

$$\begin{aligned}\delta_j(n+1) &= f'(y_j(n)) \cdot S_j(n) \\ &= [z_j(n) \cdot (1 - z_j(n))] \cdot S_j(n)\end{aligned} \tag{19}$$

where parameters $\alpha$ and $\beta$ indicate the coefficients for determining the conditions of the learning.

In the above-described calculation operation for the learning, Equations (14), (15), (16), and (18) can be assigned to correspond to the function of the synapse, while the Equations (17) and (19) can be arranged to correspond to the function of the cell body. Therefore, Equations (10), (12), (14), (15), (16), and (18) can be assigned to the synapse processor, while Equations (11), (13), (17), and (19) can be assigned to the cell processor.

In the calculation of the multi-layer perceptron, the calculations are sequentially performed for each of the layers from the input layer toward the output layer in the forward direction. In the calculation of the learning, the calculations are sequentially performed for each of the layers from the output layer toward the input layer in the backward direction. Therefore, assuming that the number of the layers excluding the input layer is M, L=M−1, and $$v_i(n, m) = x_i(n) \quad [i=1, 2, ..., H] \tag{20}$$
$$\tag{21}$$

$$v_i(n, m) = z_j(n, m) \quad [i=H+1, H+2, ..., H+J]$$
$$i = g(j) = H + j$$

Equations (10) to (19) can be expressed as follows when the process of the calculation is subdivided:

Forward activation process $$z_j(n, 0) = 0 \tag{22}$$

-continued $$w_j(n, m) = \sum_{i=1}^{H+J} w_{i,j}(n) \cdot v_i(n, m) \quad (23)$$

$$z_j(n, m + 1) = f(y_j(n, m)) = \frac{1}{1 + e^{-y_j/T}} \quad (24)$$

$$z_j(n) = z_j(n, M) \quad (25)$$

Back propagation learning process $$\Delta w_{ij}(n) = \alpha \cdot \delta_j(n, L) \cdot v_i(n, M) \quad (26)$$

$$w_{ij}(n+1) = w_{ij}(n) + \Delta w_{ij}(n) + \beta \cdot \Delta w_{ij}(n-1) \quad (27)$$

Output layer $$\delta_j(n, l) = [z_j(n) \cdot (1 - z_j(n))] \cdot (t_j(n) - z_j(n)) \quad (28)$$

Intermediate layer $$\delta_j(n, 0) = 0 \quad (29)$$

$$S_j(n, l) = \sum_{k=1}^{J} \delta_k(n, l) \cdot w_k(j), \, k(n) \quad (30)$$

$$\delta_j(n, l + 1) = [z_j(n) \cdot (1 - z_j(n))] \cdot S_j(n, l) \quad (31)$$

Further decomposing Equation (23), $y_j^k(n, m)$ can be expressed as the partial sum by the recurrence formula of Equation (32):

$$y_j^k(n,m) = y_j^{k-1}(n,m) + w_{k,j}(n) \cdot v_k(n,m) \, [k=1, 2, \ldots, H+J] \quad (32)$$

Similarly, Equation (30) can be decomposed into the recurrence formula of Equation (33) by using partial sum $S_j^k(n)$:

$$S_j^k(n,l) = S_j^{k-1}(n,l) + \delta_k(n,l) \cdot w_{j,k}(n) \quad (33)$$

Under the preparations described above, a method of performing the simulation of a multi-layer perceptron by using the synapse processor, cell processor, input processor, output processor, and input/output processor connected to each other in the form of a toroidal lattice will be described.

Figure 4:
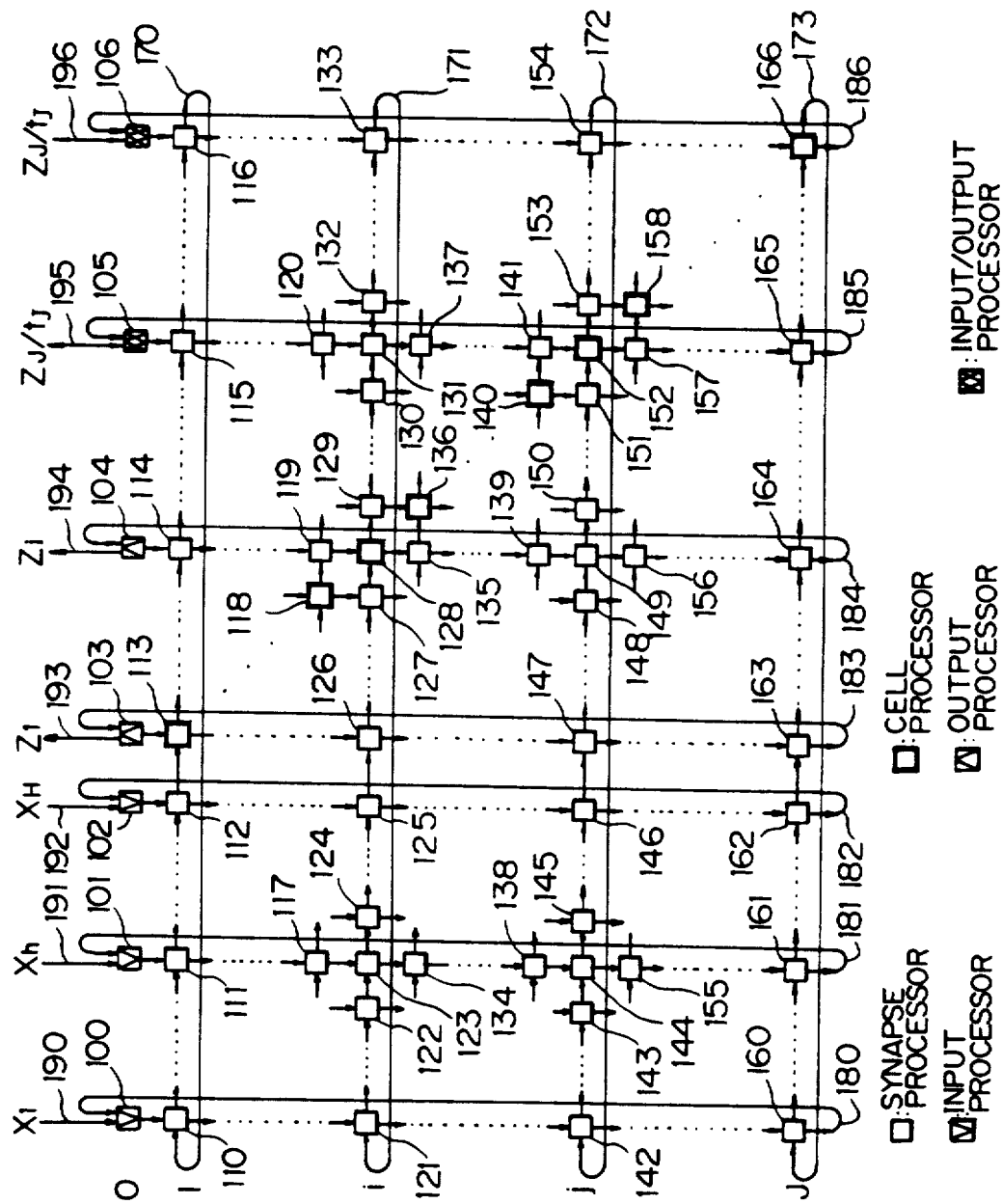
FIG. 4 is a view which illustrates the structure of an embodiment of the present invention, where a toroidal lattice structure comprising a synapse processor, a cell processor, an input processor, an output processor, and an input/output processor is shown.

The structure of the parallel processing system of five types of processors: synapse processor, cell processor, input processor, output processor, and input/output processor are shown in FIG. 4, where □ represents the synapse processor, □ represents the cell processor, represents the input processor, represents the output processor, and represents the input/output processor respectively.

The processors of the types described above are arranged in the form of a lattice of (J+1) rows and (H+J) columns provided that the number of the external inputs of the neural networks is H and the number of the neuron is J. In the 0-th line there are placed the number of H input processors 100 to 102, the number of I output processors 103 to 104, and the number of (J-I) input/output processors 105 to 106. From the first row to the J-th row, (H+J−1) synapse processors 110 to 112, 114 to 117, 119 to 127, 129 to 135, 137 to 139, 141 to 151, 153 to 157, and 160 to 165 and one cell processor 113, 118, 128, 136, 140, 152, 158, and 166 are placed. The cell processors are placed on a diagonal line from the first row, the (H+1)-th column to the J-th row, the (H+J)-th column.

Each of the synapse processors and the cell processors are connected to the upper, lower, left, and right synapse processors or the cell processors in the form of a lattice. The right-most synapse processors 116, 133, and 154 and the cell processor 166 are respectively connected to the left-most synapse processors 110, 121, 142, and 160 or the cell processor on the same rows by signal lines 170 to 173. Simultaneously, the bottom synapse processors 160 to 165 and the cell processor 166 are connected to the input processors 100 to 102, the output processors 103 to 104, or the input/output processors 105 to 106 on the same column by signal lines 180 to 186. The input processors 100 to 102a, the output processors 103 to 104, and the input/output processors 105 to 106 are further respectively connected to an external processor by signal lines 190 to 196. As a result of the established connections, the synapse processors, the cell processors, the output processors, and the input/output processors form the toroidal lattice shape.

Then, each synapse processor has a 1 bit connection flag that indicates whether or not the weight is used, that is, whether or not the connection is established. The synapse processor is arranged to have a function of storing the weight $w_{ij}(n)$ if this weight is used (if the coupling flag="1"). The cell processor has a function of storing the output value $z_j$ (n, m) of the cell and the intermediate value $\delta_j$ (n, l) of the calculation of the learning. The input processor has a function of temporarily holding the input data. The input/output processor has a function of temporarily holding the target data.

Figure 5:
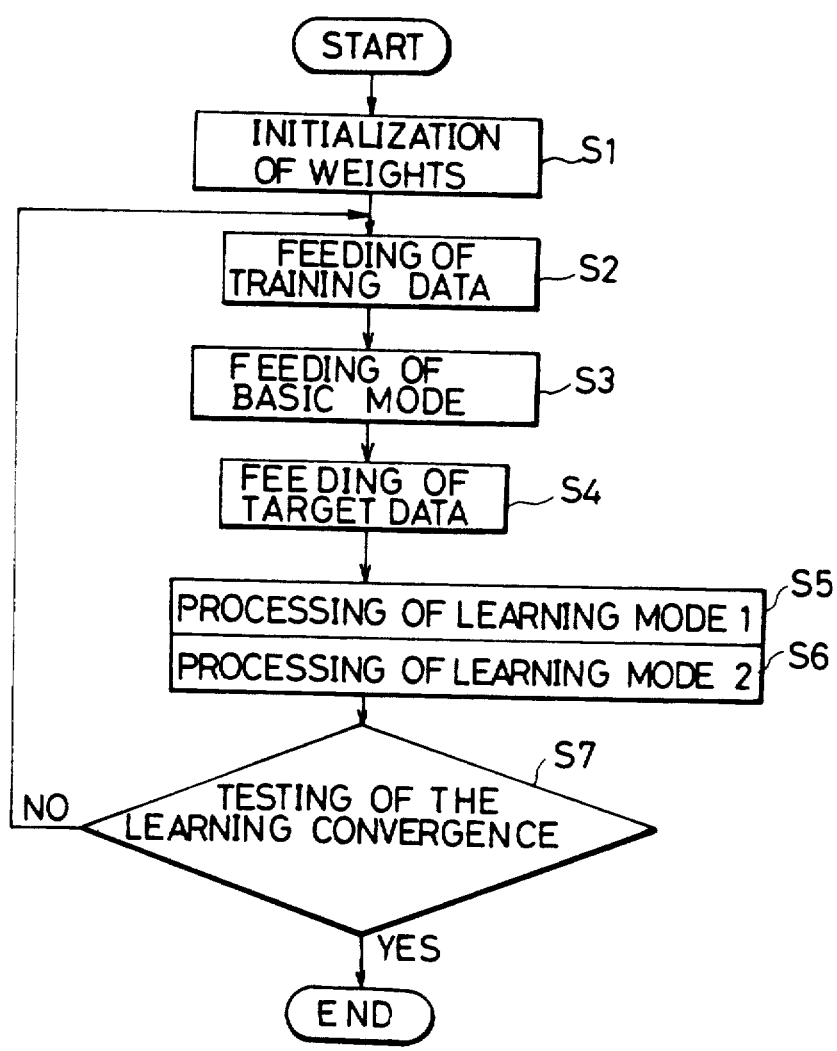
FIG. 5 is a view which illustrates the procedure of the simulation of a multi-layer perceptron.

In the simulation of the multi-layer perceptron, there are a forward processing in which the output is calculated from the input signal and a backward processing in which the learning is performed by a back propagation method, where the former processing is called a "a basic mode", while the latter is called "a learning mode" hereinafter. The learning mode is divided into a learning mode 1 in which the intermediate value $\delta_j(n)$ is calculated and a learning mode 2 in which the weight is updated. As shown in FIG. 5, the learning of the multilayer perceptron is performed by repeating the feeding of the training data, the calculations of the basic mode, the feeding of the target data, the learning mode 1 and the learning mode 2 respectively. A manner with which the learning processing of the multi-layer perceptron shown in FIG. 5 is performed by the processor groups connected in the toroidal lattice shape shown in FIG. 4 will be described.

S1: Initializing of the weight

The weight $w_{ij}(n)$ stored in the synapse processors whose connection flags are $F_{ij}=1$, the synapse processors 110 to 112, 114 to 117, 119 to 127, 129 to 135, 137 to 139, 141 to 151, 153 to 157, and 160 to 165 are initialized by random number.

S2: Feeding of the training data

In the feeding of the training data, the input processors 100 to 102 receive training data $x_h(n)$ from an external processor through the signal lines 190 to 192, the thus received data being held as $v_h(n, m)$ which are also transmitted to the lower adjacent synapse processors.

S3 Processing of the basic mode

In the processing of the basic mode, all of the output values $z_j(n, 0)$ from the cell processors 113, 118, 128, 136, 140, 152, 158, and 166 are set zero by Equation (22). Each of the synapse processors and the cell processors perform the following calculations, where the processing in the case of the h-th column, the j-th row synapse processor 144, the j-th row, the (H+1) column synapse processor 149, and the j-th row, the (H+j)-the column cell processor 152 will be described as the representative example. When the output processor and the input-/output processor receive $v_j(n, m)$ from the lowermost synapse processor or the cell processor in the same column, they immediately transmit the $v_j(n, m)$ to the synapse processor or the cell processor placed immediately below in the same column.

Weight processor 144 at the j-th row, the h-th column (1) It receives the signal $v_h(n, m)$ transmitted from the upper adjacent synapse processor 138 and transmits it to the lower adjacent synapse processor 155.

(2) If the connection flag="1", the product of the signal $v_h(n)$ and the stored weight $w_h(n)$ is added to the partial sum $y_j^{h-1}(n, m)$ which has been transmitted from the left adjacent synapse processor 143 as shown by Equation (32) so that a new partial sum $y_j^h(n, m)$ is calculated and then transmitted to the right adjacent synapse processor 145. If the connection flag="0", the partial sum $y_j^{h-1}(n, m)$ which has been transmitted from the left adjacent synapse processor 143 is transmitted as $y_j^h(n, m)$ to the right adjacent synapse processor 145.

The synapse processor 149 at the j-th row, the (k=H+i)-th column (1) It receives signal $v_k(n, m)$ which has been transmitted from the upper adjacent synapse processor 139 and transmits it to the lower adjacent synapse processor 156. However, the lowermost synapse processor or the cell processor transmits the signal $v_k(n, m)$ to the uppermost output processor or the input/output processor.

(2) If the connection flag="1", the product of the signal $v_k(n)$ and the stored weight $w_k(n)$ is added to the partial sum $y_j^{k-1}(n, m)$ which has been transmitted from the left adjacent synapse processor 148 as shown by Equation (32) so that a new partial sum $y_j^k(n, m)$ is calculated and then transmitted to the right adjacent synapse processor 150. If the connection flag="0", the partial sum $y_j^{k-1}(n, m)$ which has been transmitted is transmitted as $y_j^k(n, m)$ to the right adjacent synapse processor 150. However, the right-most synapse processor or the cell processor transmits $y_j^{H+J}(n, m)$ to the left-most synapse processor or cell processor as $y_j^0(n, m)$.

The cell processor 152 at the j-th row, the (k=H+j)-th column (1) It transmits the output $z_j(n, m)$ of the cell processor as $v_g(j)(n, m)$ to the lower adjacent synapse processor 157.

(2) It transmits as the partial sum $y_{jk}(n, m)=$"0" to the right adjacent synapse processor 153.

(3) If the connection flag="1", the product of the signal $v_k(n)$ and the stored weight $w_k(n)$ is added to the partial sum $y_j^{k-1}(n, m)$ which has been transmitted from the left adjacent synapse processor 151 so that a final product-sum $y_j(n, m)=y_j^k(n, m)$ is obtained. If the connection flag="0", the partial sum $y_j^{k-1}(n, m)$ is made the final product sum $y_j(n, m)=y_j^{k-1}(n, m)$.

(4) In accordance with Equation (24), the final product sum $y_j(n, m)$ is converted by a sigmoid function so that the output $z_j(n, m+1)$ from the neural cell is obtained.

Since the output values are successively determined from the first intermediate layer in the above described calculations, the output $z_j(n, M)$ from the cell processor in the output layer can be obtained by repeating the above calculations as many times as the number of the intermediate layers and the output layer, that is M times.

S4: Feeding of target data

In the Feeding of the target data, the input/output processors, for example, 105 and 106 which correspond to the cell processors of all of the cell processors which can output the result to the external processor receive target data $t_j(n)$ from the external processor through the signal lines 195 and 196 so as to transmit the same to the lower adjacent synapse processor or the cell processor. Each of the synapse processors receives the target data from the upper adjacent synapse processor so as to transmit it to the lower adjacent synapse processor. Each of the cell processors execute the following calculation on the basis of the target data received from the upper adjacent synapse processor so as to initialize the intermediate error value $\delta_j(n, l)$ of the learning.

The cell processor 152 (output layer) at the j-th row, the (k=H+j)-th column

The cell processor in the output layer receives target data $t_j(n)$ transmitted from the upper adjacent synapse processor 141 and calculates the initial value of the intermediate error value $\delta_j(n, 0)$ in accordance with Equation (28).

The cell processor 128 (intermediate layer) at the i-th row, the (k=H+1)-th column In the cell processor in the intermediate layer, the initial value of the intermediate error value $\delta i(n, 0)$ is made zero in accordance with Equation (29).

S5: The processing of the learning mode 1

In the learning mode 1, each of the synapse processors and each of the cell processors perform the following calculation processings, where the calculation processings of the j-th row, the h-th column synapse processor 144, the j-th row, the (H+i)-th column synapse processor 149, the j-th row, the (H+j)-th column cell processor 152, and the i-th row, the (H+i)-th column cell processor 128 are shown as the examples. When the output processor and the input/output processor receive the $S_j(n, l)$ from the lowermost synapse processor or the cell processor in the same column, they immediately transmit it to the synapse processor or the cell processor placed immediately below the column.

The synapse processor 144 at the j-th row, the h-th column (1) It receives signal $\delta_j(n, l)$ which has been transmitted from the left adjacent synapse processor 143 and transmits it to the right adjacent synapse processor 145.

The synapse processor 149 at the j-th row, the (k=H+i)-th column (1) It receives signal $\delta_j(n, l)$ which has been transmitted from the left adjacent synapse processor 148 and transmits it to the right adjacent synapse processor 150. However, the synapse processor or the cell processor or the cell processor in the right-most column transmits the signal $\delta_j(n, l)$ to the left-most synapse processor or the cell processor.

(2) If the connection flag="1", the product of the signal $\delta_j(n, l)$ and the stored weight $w_k(n)$ is added to the partial sum $S_j^{l-1}(n, l)$ which has been transmitted from the upper adjacent synapse processor 139 as shown by Equation (33) so that a new partial sum $S_j{}^i(n, l)$ is then transmitted to the lower adjacent synapse processor 156. If the connection flag="0", the partial sum $S_j{}^{i-1}(n, l)$ which has been transmitted is transmitted as $S_j{}^i(n, l)$ to the lower adjacent synapse processor 156. However, the synapse processor or the cell processor on the lowermost line transmits $S_j{}^i(n, l)$ as $S_j{}^O(n, l)$ to the uppermost output processor or input/output processor as $y_j{}^O(n, l)$.

The cell processor (output layer) 152 at the j-th row, the (k=H+j)-th column (1) The intermediate error value $\delta_j(n, l)$ in the learning is transmitted to the right adjacent synapse processor 153.

(2) In the output layer, since the intermediate error value $\delta_j(n, l)$ is not changed by l, it is made $\delta_j(n, l+1) = \delta_j(n, l)$.

The cell processor (intermediate layer) 128 at the i-th row, the (k=H+i)-th column (1) The intermediate error value $\delta_i(n, l)$ in the learning is transmitted to the right adjacent synapse processor 129.

(2) It transmits as the partial sum $S_j{}^i(n, l)$="0" to the lower adjacent synapse processor 135.

(3) If the connection flag="1", the product of the signal $\delta_i(n, l)$ and the stored weight $w_{ki}(n)$ is added to the partial sum $S_i{}^{i-1}(n, l)$ which has been transmitted from the upper adjacent synapse processor 119 in accordance with Equation (33) so that a final product-sum $Si(n, l) = S_i{}^i(n, l)$ is obtained. If the connection flag="0", the partial sum $S_i{}^{i-1}(n, l)$ is made the final product sum $Si(n, l) = S_i{}^{i-1}(n, l)$.

(4) A new intermediate value $\delta_i(n, l+1)$ is calculated in accordance with the final product-sum $Si(n, l)$ and the output value $z_i(n)$ in accordance with Equation (31).

Since the calculations are successively executed from the output layer toward the input layer for each of the layers similarly to the basic mode, the intermediate value $\delta_i(n, L)$ of the learning can be obtained by repeating by the number of the intermediate layers, that is, by $L = M - 1$ times.

S6: The processing in the learning mode 2

In the learning mode 2, each of the synapse processors and the cell processors execute the following processings, where the processings of the 0-th row, the h-th column input processor 101, the j-th row, the h-th column synapse processor 144, the j-th row, the (H+i)-th column synapse processor 194, and the i-th row, the (H+i)-th column cell processor 128 are shown as the examples. When the output processor and the input/output processor receive the $v_j(n, M)$ from the lowermost synapse processor or the cell processor in the same column, they immediately transmit it to the synapse processor or the cell processor placed immediately below in the same the column.

The synapse processor 101 at the 0-th row, the h-th column (1) It transmits training data signal $x_h(n)$ as $v_h(n, M)$ to the lower synapse processor 111.

The synapse processor 144 at the j-th row, the h-th column (1) It receives the intermediate error value $\delta_j(n, L)$ of the learning which has been transmitted from the left adjacent synapse processor 143 and transmits it to the right adjacent synapse processor 145.

(2) It receives the intermediate value $V_h(n)$ of the learning which has been transmitted from the upper adjacent synapse processor 138 and transmits it to the lower adjacent synapse processor 145.

(3) If the connection flag="1", the quality of change $\Delta w_{hj}(n)$ of the weight $w_{hj}(n)$ is calculated from the intermediate value $\delta_j(n, L)$ of the learning transmitted from the left adjacent synapse processor 143 and the signal $v_h(n)$ transmitted from the upper adjacent synapse processor 138 in accordance with Equation (26). Then, the weight $w_{hj}(n)$ is updated in accordance with Equation (27). If the connection flag="0", no processing is executed.

The synapse processor 149 at the j-th row, the (k=H+i)-th column (1) It receives the intermediate error value $\delta_j(n, L)$ of the learning transmitted from the left adjacent synapse processor 148 and transmits it to the right adjacent synapse processor 150. However, the synapse processor or the cell processor on the right-most column transmits the signal $\delta_j(n, L)$ to the synapse processor or the cell processor on the left-most column.

(2) It receives the signal $v_k(n, M)$ transmitted from the upper adjacent synapse processor 139, and transmits it to the lower adjacent synapse processor 156. However, the synapse processor or the cell processor on the lowermost line transmits the signal $v_k(n, M)$ to the output processor or the input/output processor in the uppermost row.

(3) If the connection flag="1", the quantity of change $\Delta w_{kj}(n)$ of the weight $w_{kj}(n)$ is calculated from the signal $\delta_j(n, L)$ transmitted from the left adjacent synapse processor and the signal $v_k(n, M)$ transmitted from the upper adjacent synapse processor 139 in accordance with Equation (26). Then, the weight $w_{kj}(n)$ is updated in accordance with Equation (27). If the connection flag="0", no processing is executed.

The cell processor 152 at the j-th row, the (k=H+j)-th column (1) It transmits the intermediate error value $\delta_j(n, L)$ of the learning in the cell processor to the right adjacent synapse processor 153.

(2) The output $zj(n, M)$ in the cell processor is transmitted to the lower adjacent synapse processor 157 as $V_g(j)(n, M)$.

(3) If the connection flag="1", the quantity of change $\Delta w_{kj}(n)$ of the weight $w_{kj}(n)$ is calculated from the intermediate error value $\delta_j(n, L)$ of the learning contained by the cell processor and the output signal $Vk(n, M) = Zj(n, M)$ in accordance with Equation (26). Then, the weight $w_{kj}(n)$ is updated in accordance with Equation (27). If the connection flag="0", no processing is conducted.

S7: Testing of the learning convergence

In the testing of the learning convergence, it is tested whether or not the average value or the maximum value of error $\xi_j - (tj(n) - zj(n))^2$ between the output signal from the cell processor in the output layer and the target data is larger than a predetermined value. Thus, the fact whether or not the learning has been completed is determined. If the error is smaller than the predetermined value, the learning is completed. On the other hand, if the error is larger than the predetermined value, the process returns to S2 in which the learning is continued by repeatedly supplying the training data and target data.

As described above, the architecture of the neuro-computer capable of parallel processing the simulation of the above-described multi-layer perceptron serving as an example of the neural networks is established.

However, in the neuro-computer including the processor groups connected to each other to form the toroidal lattice shape, an extremely large number of the processor: $(J+1)\times(H+J)$ pieces is necessary to be provided if the scale of the neural networks becomes enlarged. Therefore, it cannot be preferably used in terms of the practical use. Accordingly, the present invention further discloses means capable of simulating large-scale neural networks with the feasible number of the physical processors on the basis of the above-described toroidal lattice connection.

Figure 6:
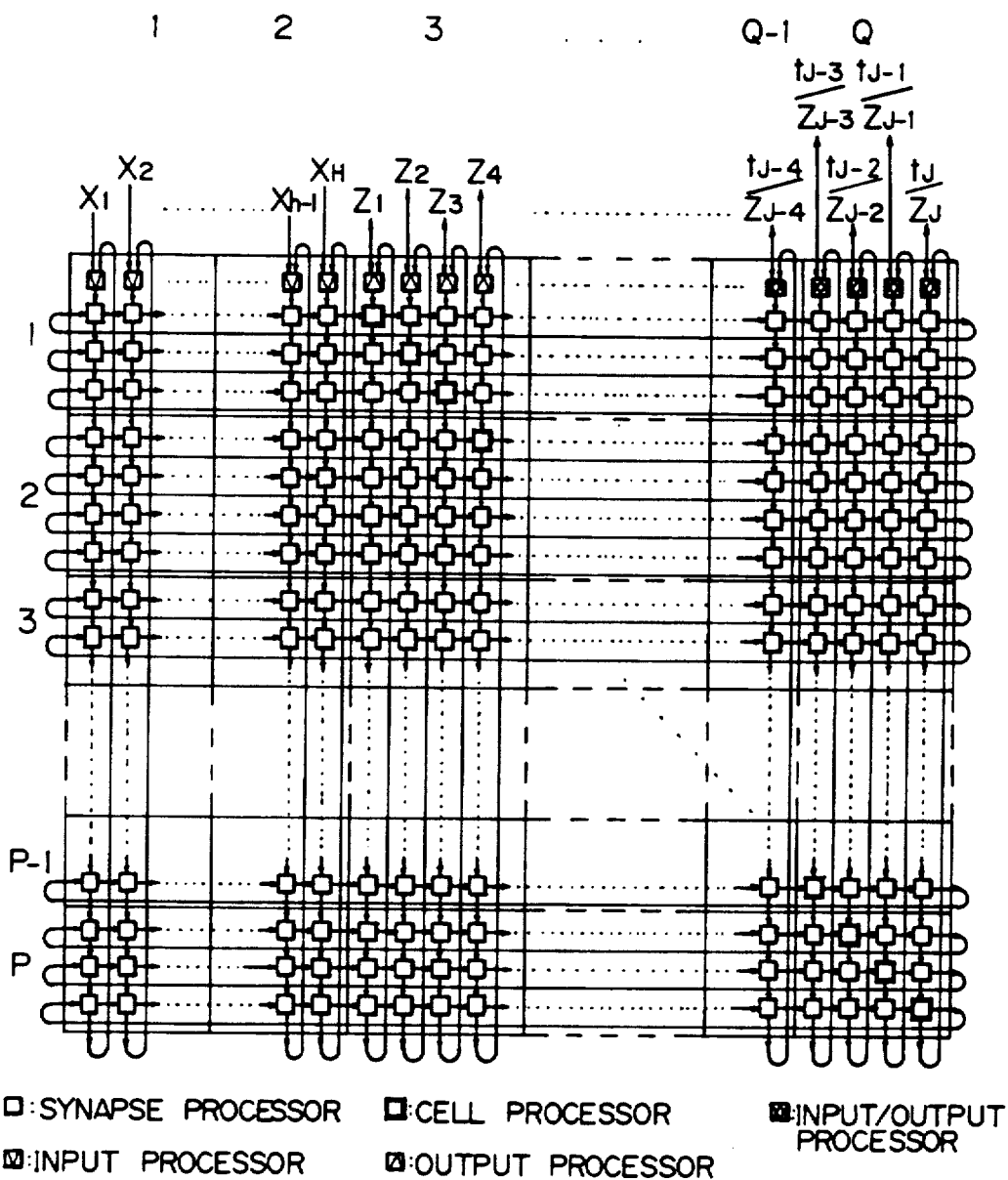
FIG. 6 is a view which illustrates the manner of dividing the virtual processor groups into rectangular regions according to the present invention.

Provided that all of the above-described synapse processors, cell processors, input processors, output processors, and input/output processors are the virtual processors, the virtual processor groups arranged to form a lattice of $J+1$ rows, $H+J$ columns are divided into P ($P<J+1$) pieces in the direction of the row, and into Q ($Q<H+J$) pieces in the direction of the column as shown in FIG. 6.

Figure 7A:
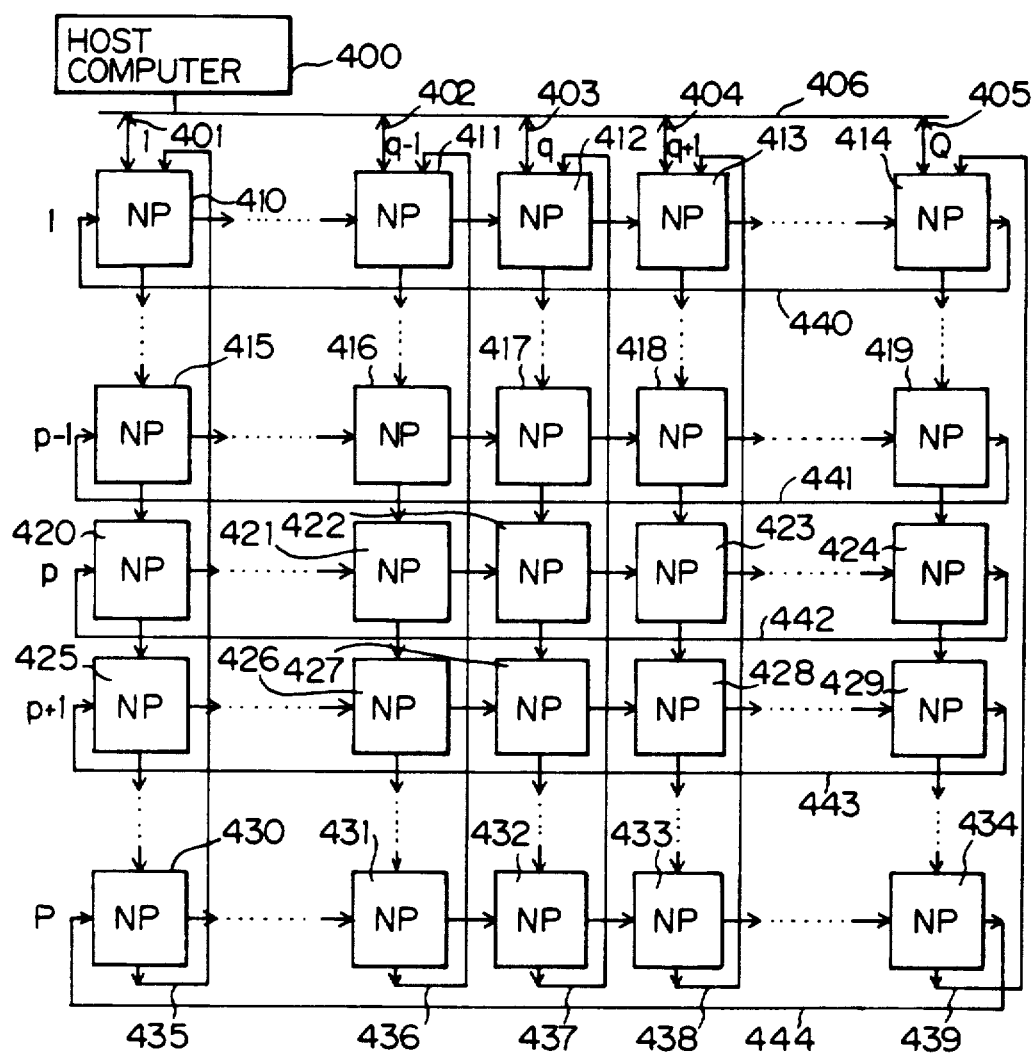

As shown in FIG. 7A, physical processors 410 to 434 is respectively assigned to a rectangular region which has been formed by the divition performed as shown in FIG. 7A. As a result, the arrangement of the physical processors of P-rows, Q-columns is formed. Each of the physical processors is connected in a lattice manner to the upper, lower, left, and right physical processors. The right-most physical processors 414, 419, 424, 429, and 484 are connected to the left-most physical processors 410, 415, 420, 425, and 430 on the same row via the signal lines 440 to 444. The physical processors 430 to 434 at the bottom are connected to the top physical processors 410 to 414 on the same column via the signal lines 435 to 439. In order to cause at least one of the physical processors 410 to 414 on each of the columns to have an Input/Output function, it is connected to a bus line 406 of a host computer 400 via the signal lines 401 to 405.

Figure 7B:
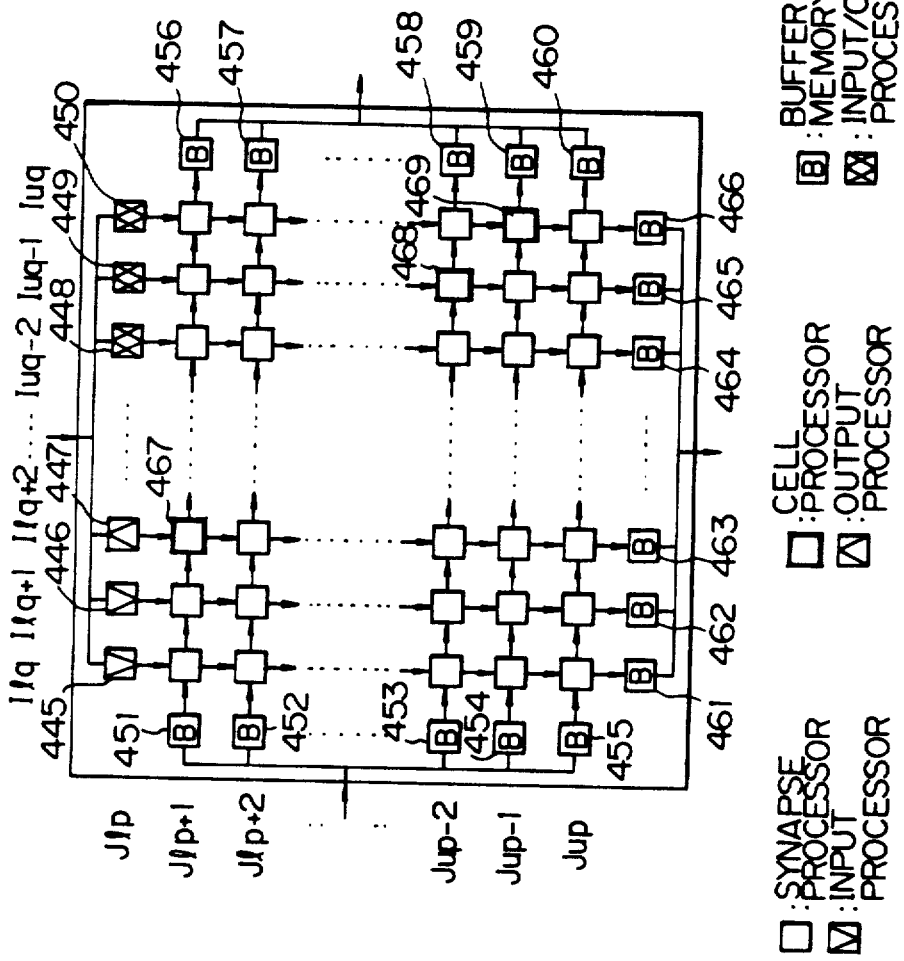

As shown in FIG. 7B, the physical processor thus having the Input/Output function performs the calculation operation and the storage operation of the input processors, the output processors, the input/output processors, the synapse processors, and the cell processors, included in the assigned rectangular region. As shown in FIG. 7C, the other physical processors performs the calculation operation and the storage operation of the synapse processors and the cell processors included in the assigned rectangular regions. The physical processor may be a usual microprocessor having the four transmission channels for processor-processor connections in the four directions and the data memory which stores the coefficient of the weight, the output value from the cell, and the intermediate value of the learning. Preferably, it has a high speed product-sum operation performance. The physical processor groups thus arranged form a toroidal lattice shape as same as the virtual processor groups. Since the physical processor described above is positioned at the node (a junction) of the lattice, it can be called "a node processor" which can be abbreviated to "an NP".

Thus, a neuro-computer capable of parallel calculating large-scale neural networks with the feasible number of the processors can be realized by using the node processor groups connected to form a toroidal lattice shape with P and Q determined properly. Each of the node processors performs the sequential processing, in which P×Q node processors perform the parallel processing. In particular, as for the product-sum operation which takes an excessively long time, the calculations of the partial sums which have been individually performed by the synapse processors can be processed by each of the node processors individually as the calculations of the partial sums in the rectangular region which corresponds to each of the node processors. That is, the product-sum operation as expressed by Equation (32) can be recomposed into Equations (34) and (35):

$$B_j^q(n, m) = \sum_{i=rlq}^{Iuq} w_{ij}(n) \cdot v_i(n, m) \cdot F_{ij} \tag{34}$$

$$y_j^q(n, m) = y_j^{q-1}(n, m) + B_j^q(n, m) \tag{35}$$

where Iuq represents the right-most column number of the rectangular region, while Ilq represents the left-most column number of the same.

The product-sum operation expressed in Equation (33) can be recomposed into Equations (36) and (37):

$$D_j^p(n, l) = \sum_{k=Jlp}^{Jup} \delta_k(n, l) \cdot w_g(j)K(n) \cdot F_{g(j)k} \tag{36}$$

$$S_j^p(n, l) = S_j^{p-1}(n, l) + D_j^p(n, l) \tag{37}$$

where Jup represents the lowermost row number in the rectangular region, while JIP represents the uppermost row number.

Therefore, Equations (34) and (36) are parallel calculated by each of the node processors, while Equations (35) and (37) are successively calculated during the passage of the partial sum $y_j^q(n, m)$ and $S_j^p(n, l)$ through the node processor series.

Referring to FIGS. 7B and 7C, mark represents a buffer memory.

Under the conditions thus prepared as described above, the parallel operation of the toroidal lattice neuro-computer will be described with reference to FIGS. 7A, 7B, and 7C in accordance with a flow chart shown in FIG. 5 to simulate the multi-layer perception as well as the synapse processors, the cell processor, the input processor, the output processors, and the input/output processors do.

S1: Initialization of the weight

Each of the node processors successively initializes the coefficient of the weight stored by the corresponding synapse processor by using a random number. Each of the node processors initializes the coefficients of the weight in parallel.

S2: Feeding of training data

Each of the node processors 410 to 414 having the Input/Output function successively receives training data from the host computer, the training data corresponding to the input processors. The received training data is held in buffers 445 and 446.

S3: Processing of the basic mode

In the processing of the basic mode, each of the node processors including the cell processors successively set output value $z_j(n, 0) = v_{g(j)}(n, 0)$ of the cell processor zero as an initial value in accordance with Equation (22).

Then, the following processing is repeated where m = 0. Although the description of the processing of the synapse processors and the cell processors on the node processor 422 at the p-th row, the q-th column, will be made as an example the processing are parallel and simultaneously performed by each of the node processors.

(1) If there is column k=g (j) in which a cell processor is present in a rectangular region to which the node processor at the p-th row, the q-th column is assigned, the value $v_k(n, m) = Z_k(n, m)$, is then successively transmitted together with column number k to the lower adjacent node processor 427. If there is column h in which the input processor is present, the value $v_h(n, m) = x_h(n)$ is then successively transmitted together with column number h to the lower node processor 427. As for the columns in which no cell processor and no input processor is present, signals $v_i(n)$ [i∈{Ilp, Ilp+1, . . ., Iup−1, Iup}] which have been transmitted from the upper adjacent node processor 417 are successively received and held in the output processor, input/output processor 448, or buffers 470, 473, and 474 for each of the columns. Simultaneously, the signals are successively transmitted together with column number i to the lower adjacent node processor 427. In the case where p=P, Vi(n, m) is transmitted together with column number i to the uppermost node processor 412.

(2) If the cell processor is contained in the node processor 422 at the p-th row, the q-th column, the initial values $y_j^q(n, m) = 0$ of the partial sum are successively transmitted with the row number j which is the position of the all of the cell processors to the node adjacent processor 423.

(3) The partial sum $B_j^q(n, m)$ in the rectangular region for the synapse processor in the rectangular region to which the node processor 422 at the p-th row, the q-th column is assigned is calculated in accordance with Equation (34). The result of the calculation is stored in the buffers 456 to 460 and 488 to 498.

(4) When the partial sum $y_j^{q-1}(n, m)$ has been transmitted together with the row number j from the left adjacent node processor 421, it is tested whether or not the calculation of the partial sum $B_j^q(n, m)$ in the rectangular region has been completed. If it has been completed, a new partial sum $y_j^q(n, m)$ is calculated in accordance with Equation (35). If the calculation of the partial sum in the rectangular region has not been completed, the partial sum $y_j^{q-1}(n, m)$ is temporarily held together with the row number j in the buffer memories 456 to 460 and 488 to 492 in which the completion of the calculation of the partial sum $B_j^q(n, m)$ is waited for. When the partial sum $B_j^q(n, m)$ in the rectangular region has been completed, a new partial sum $y_j^q(n, m)$ is immediately calculated in accordance with Equation (35). At this time, whether or not the cell processor is contained in the j-th row is tested. If it is not contained, the new partial sum $y_j^q(n, m)$ is transmitted together with the row number j to the right adjacent node processor 423. If q=Q, then the partial sum $y_j^Q(n, m) = y_j^Q(n, m)$ is transmitted together with the row number j to the left-most node processor 420. If it is contained then the new partial sum $Y_j^q(n, m)$ is set as the result of the product-sum $y_j(n, m)$.

(5) As for the rows containing the cell processor, when the calculation of the result $y_j(n, m)$ of the product-sum operation has been completed, the result $y_j22$ m) is converted to the output $z_j(n, m+1)$ of the neural cell, by the sigmoid function in accordance with Equation (24), the result being then stored in the buffer memories which are assigned to the cell processors 467 to 469 and 493 to 495.

Since the output values of neurons are successively determined from the first intermediate layer to the output layer in the above-described calculations, the output $z_j(n, M)$ of the cell processor in the output layer can be obtained by repeating the calculations as many time as the number of the intermediate layers and the output layer, that is, M times.

S4: Feeding of target data

In the feeding of target data, the node processors 410 to 414 having the Input/Output function receives target data $t_j(n)$ for the each column of the cell processors in the output layer from the host computer via the signal bus 406, the target data $t_j(n)$ being then transmitted to the lower node processor. The each of the node processors receives the target data from the upper adjacent node processor so as to transmit the target data to the lower adjacent node processor. The node processors including each of the cell processor initialize the intermediate error value $\delta_j(n, 1)$ of the learning in accordance with Equation (29).

(1) The node processor including the cell processor in the output layer receives the target data $t_j(n)$ transmitted from the upper adjacent node processor and calculates the initial value of the intermediate error value $\delta_j(n, 0)$ in accordance with Equation (28) and then stores the result in the memory area which is assigned to the cell processor.

(2) The node processor including the cell processor in the intermediate layer sets the initial value of the intermediate value $\delta_j(n, 0)$ in accordance with Equation (29) and then store it in the memory area which is assigned to the cell processor.

S5: The processing of the learning mode 1

In the learning mode 1, each of the node processors repeats the following processing after making l=0. Although the processing of the synapse processors and the cell processors on the node processor 422 at the p-th row, the q-th column, will be described as an example the processing are parallel and simultaneously performed by each of the node processors.

(1) If there is a row j containing the cell processor in the virtual processors which are assigned to the node processor 422 at the p-th row, the q-th column, the intermediate error value $\delta_j(n, 1)$ of the learning is transmitted together with row number j to the right adjacent node processor 423. When no cell processor is included in the k-th row, the intermediate error values $\delta_k(n, 1)$ [k∈{Jlq, Jlq+1, . . ., Juq−1, Juq}] of the learning transmitted from the left adjacent node processor are successively received and then stored in the buffers 452 to 455, 478, 480, and 781 on each row. Simultaneously, the intermediate value $\delta_k(n, 1)$ of the learning is transmitted together with row number k to the right adjacent node processor 423. In the case where q=Q, the intermediate value $\delta_k(n, 1)$ of the learning is transmitted together with the row number k to the left-most node processor 420.

(2) If the cell processor is included in the virtual processors which are assigned to the node processor 422 at the p-th row, the q-th column, the initial value $S_j^p(n, 1) = 0$ of the partial sum for all of the included cell processors is transmitted with the column number k=g(j) at which the cell processor is placed, to the lower adjacent node processor 427.

(3) The partial sum $D_j^p(n, l)$ for the synapse processors in the rectangular region to which the node processor 422 at the p-th row, q-th column is assigned is calculated for each of the columns according to Equation (36). When the calculation has been completed, the result is stored together with the row number k in the buffers 461 to 466, and 482 to 487.

(4) When the partial sum $S_j^{p-1}(n, l)$ has been transmitted together with the column number k from the upper adjacent node processor 417, a fact whether or not the calculation of the partial sum $D_j^p(n, l)$ in the rectangular region has been completed is tested. If it has been completed, a new partial sum $S_j^p(n, l)$ is calculated according to Equation (37). If the calculation of the partial sum in the rectangular region has not been completed, the partial sum $S_j^{p-1}(n, $ is temporarily stored together with the row number j in the buffers 461 to 466 and 482 to 487 to wait for the completion of the calculation of the partial sum $D_j^p(n, l)$ in the rectangular region. And when the calculation of the partial sum $D_j^p(n, l)$ in the rectangular region has been completed, the new partial sum $S_j^p(n, l)$ is immediately calculated according to Equation (37). At this time, a fact whether or not the cell processor is included in the k-th column in the rectangular region is tested. If it is not included there, the new partial sum $S_j^p(n, l)$ is transmitted together with the column number K to the lower adjacent node processor 427. In the case where p=P, the partial sum $S_j^p(n, l) = S_j^p(n, l)$ is transmitted together with the column number k to the uppermost node processor 412. If it is included there, the new partial sum $S_j^p(n, l)$ is used as the result $S_j(n, l)$ of the product-sum operation.

(5) After the calculation of the final product-sum $S_j(n, l)$ of the cell processor included in the column k=g(j) has been completed, $\delta_j(n, l+1)$ is calculated from the result $S_j(n, l)$ and stored in the memory area which is assigned to the cell processor.

In the learning mode 1, since the calculations for each layer are successively performed from the output layer to the input layer in the same way the basic mode, the intermediate error value $\delta_j(n, l)$ of the learning can be obtained by repeating the calculations as many times as the number of the intermediate layers, that is, $L = M - 1$ times.

S6; The processing of the learning mode 2

In the learning mode 2, each of the node processors performs the following processings. Although the processing of the synapse processors and the cell processors on the node processor 422 at the p-th row, the q-th column will be described as an example, the processing are parallel and simultaneously performed by each of the node processors.

(1) If the cell processor is included at the j-th row, the i=g(j) column in the virtual processor groups in the rectangular region to which the node processor 422 at the p-th row, the q-th column is assigned, the intermediate error value $\delta_j(n, L)$ of the learning is transmitted together with the row number j to the right node adjacent processor 423. Simultaneously, the output $z_j(n)$ from the cell processor is, as $v_i(n) = z_j(n)$, transmitted together with the column number i to the lower adjacent node processor. If there is a column h including the input processor in the virtual processor which are assigned to the node processor 422 at the p-th row, the q-th column, it is made that the input signal $x_h(n)$ is, as $v_h(n) = x_h(n)$, transmitted together with the column number h to the lower node processor adjacent 427. Where no cell processor and no input processor are present on the k-th row, the intermediate error values $\delta_k(n, L)$ [k∈{Jlp, Jlp+1, ..., Jup−1, Jup}] of the learning transmitted from the left adjacent node processor 421 are successively received and stored in the buffers 451 to 455, and 476 to 481 for each row. Simultaneously, the intermediate error value $\delta_k(n, L)$ of the learning is transmitted together with the row number k to the right adjacent node processor 423.

In the case where q=Q, the transmission to the right adjacent node processor is performed with respect to the left-most node processor. In the case where p=P, the transmission to the lower node processor is performed with respect to the uppermost node processor.

(2) If there is the synapse processors with the connection flag = "1" in the rectangular region to which the node processor at the p-th row, the q-th column is assigned, the change quantity $\Delta w_{ij}(n)$ of the weight coefficient $w_{ij}(n)$ is calculated from the intermediate error value $\delta_j(n, L)$ of the learning transmitted from the left adjacent node processor and the signal $v_i(n)$ transmitted from the upper adjacent node processor according to Equation (26). Then, the weight coefficient $w_{ij}(n)$ is updated according to Equation (27). If the coupling flag = "0", no processing is executed.

S7: The testing of the learning convergence

In the testing of the learning convergence, the node processor including the cell processor in the output layer tests whether or not the average value or the maximum value of the error $\xi_j = (t_j(n) - z_j(n))^2$ between the output signal and the target data is smaller than predetermined value. Thus, the completion of the learning is determined. If the error is smaller than the predetermined value, the learning is completed. If the error is larger than the predetermined value, the training data and target data is repeatedly supplied and the learning is repeated from the processing in S2.

As described above, parallel processing for the simulation of the neural networks can be performed by the node processors connected to form a toroidal lattice shape. However, next question is how the load balance among the node processors can be done. A method to solve this problem will be described with reference to a specific example of the multi-layer perceptron shown in FIG. 8.

Figure 8:
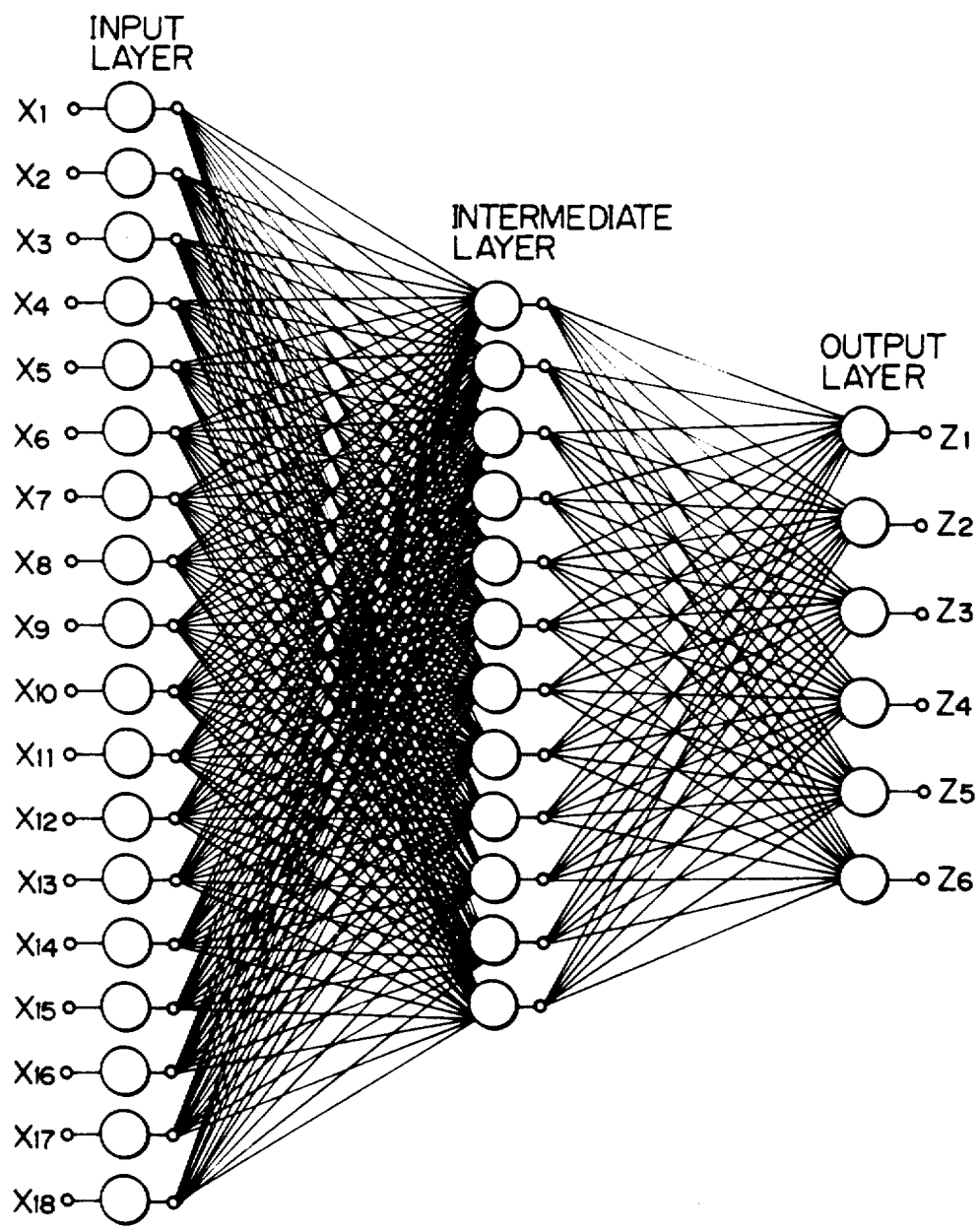
FIG. 8 is a view which illustrates the specific example of a three-layered perceptron.
Figure 9B:
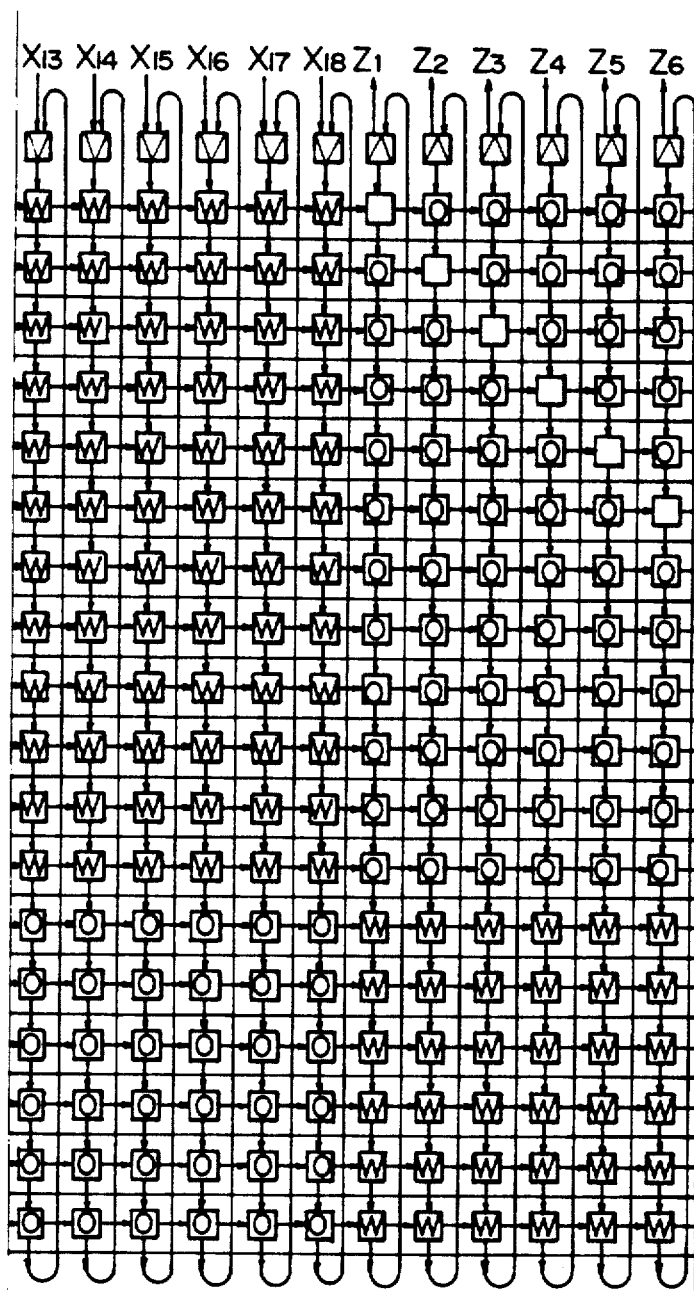
Figure 9C:
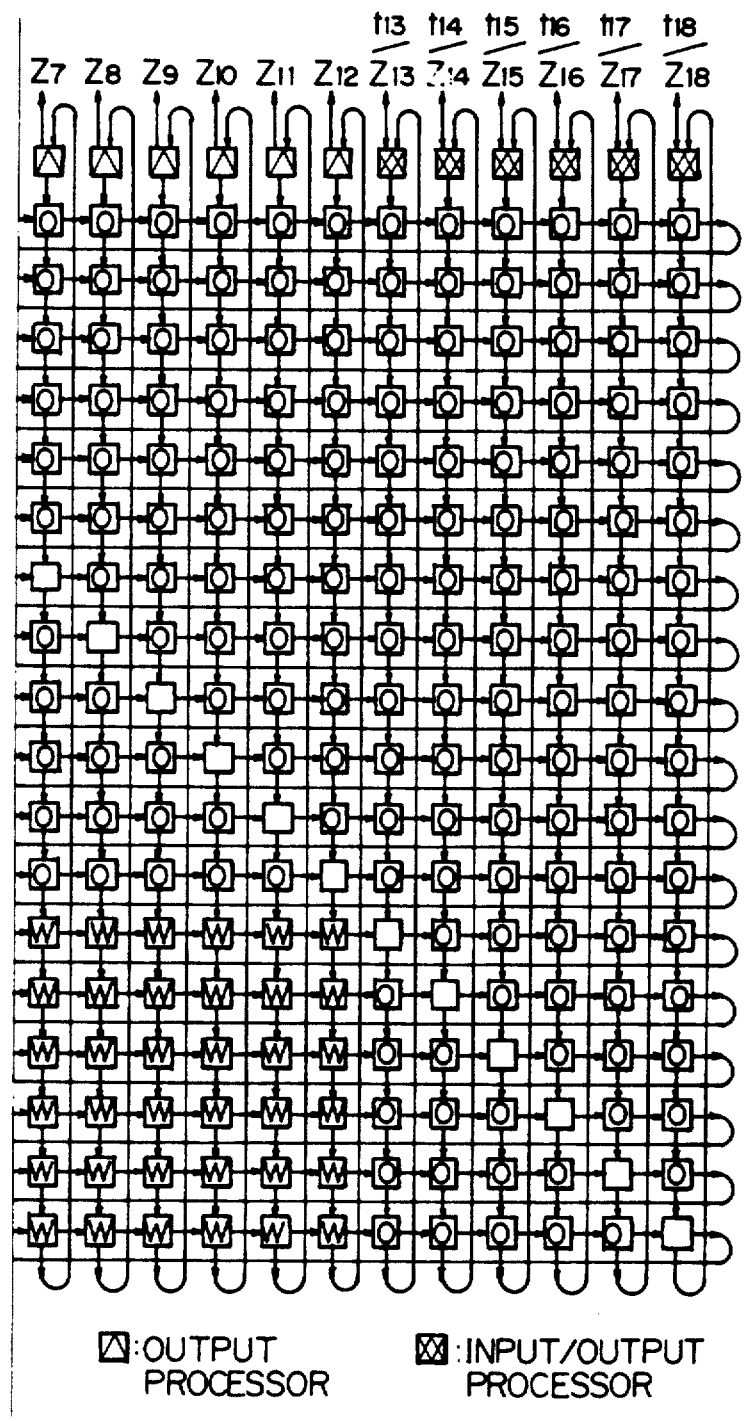

The structure of the virtual processor for simulating the 3 layer perceptron shown in FIG. 8 is shown in FIG. 9. In FIG. 9, mark   represents the synapse processor where the connection flag Fij=1 is shown, mark   represents the synapse processor, where the connection flag Fij=0 is shown. It is not necessary for the synapse processor whose connection flag Fij=0 to execute the product-sum operation for the partial sum, while only the synapse processor whose connection flag Fij=1 is necessary to execute the product-sum operation for the partial sum. Although the number of the cell processor is small, the processings are generally so complicated that the processing load of the all processor becomes 10 times or more than the processing load of the synapse processor.

Figure 10A:
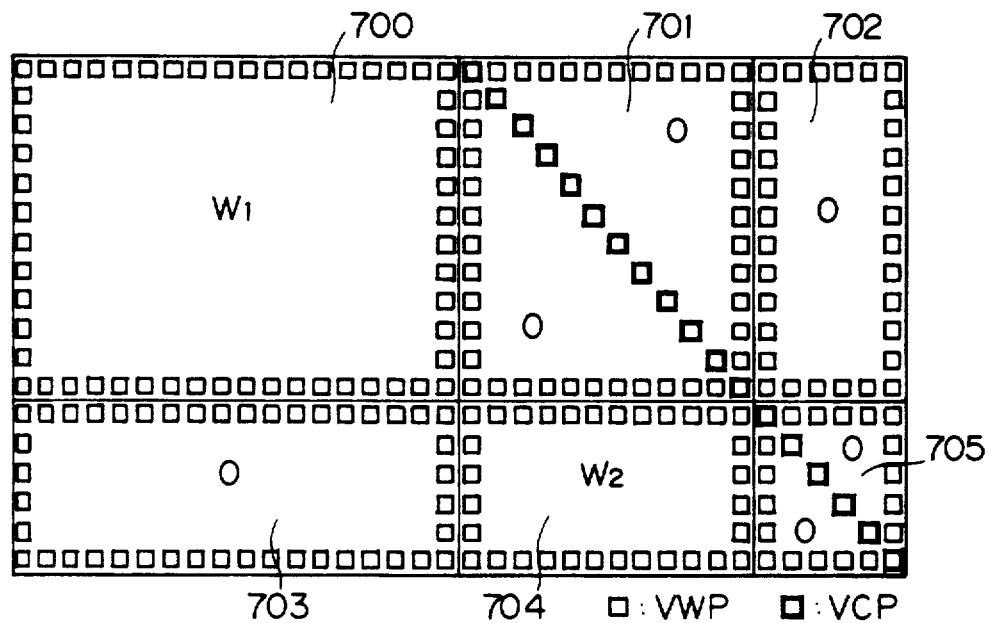
FIGS. 10A and 10B are views each of which illustrates unbalanced load of each of the node processors at the time of simulating the three-layered perceptron.

FIG. 10A is a view which simply illustrates the arrangements of the synapse processors of the connection flag Fij=1 and Fij=0 and cell processor. As is shown from the FIG. 10A, in the multi-layer perceptron, the overall area is divided into rectangular regions 700 and 704 including of the synapse processors whose connection flag Fij=1, rectangular regions 702 and 703 consisting of the synapse processors whose connection flag Fij=0, and rectangular regions 701 and 705 in which the synapse processor whose connection flag Fij=0 and the cell processor are mixed. Therefore, the load for the node processor to which a larger number of the synapse processors whose connection flag Fij=0 are assigned can be reduced. On the other hand, the load for the node processor to which a larger number of the cell processors or the synapse processors whose connection flag Fij=1 are assigned becomes heavier. In order to effectively perform the parallel processing, it is necessary for each of the node processors to complete its processing in the same time period. If a node processor takes a relatively longer time than other node processors to complete its processing, the other node processors must wait for the completion of the processing to synchronize the processing phase of all node processor. As a result, the efficiency of the parallel processing is decreasing.

Figure 10B:
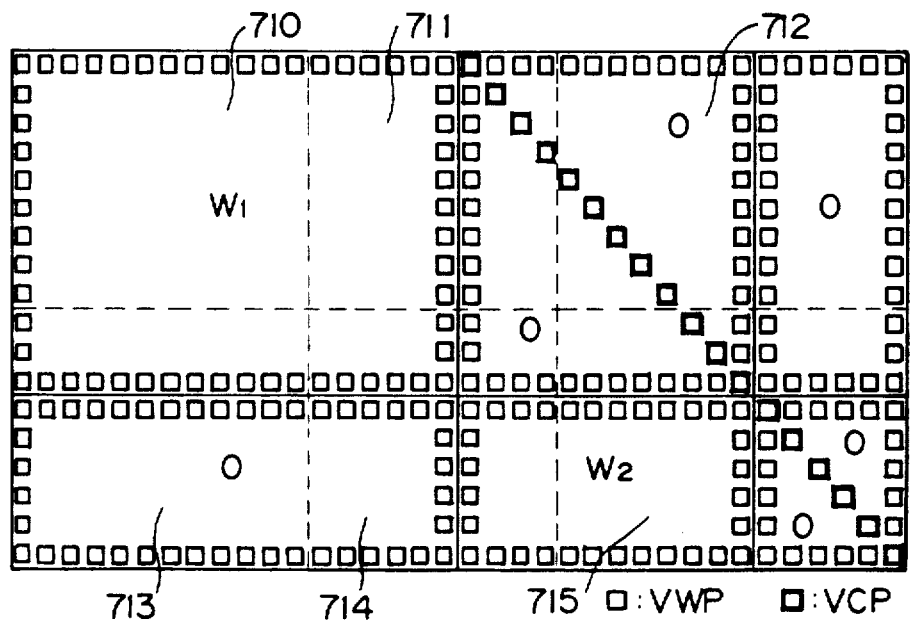

FIG. 10B is a view which illustrates a case in which the lattice of the synapse processors and the cell processors are divided to six rectangular parts by short dash horizontal and vertical lines in order to balance the loads of 6 node processors of two rows and three columns as good as possible. In the rectangular region 710 to which the node processor at the first-row, the first-column is assigned, there are 108 synapse processors whose connection flag Fij=1. On the other hand, in the rectangular region 713 to which the node processor at the second-row, the first-column is assigned, there are only 36 synapse processors whose connection flag Fij=1, and the other synapse processors whose connection flag Fij=0. Similarly, in the rectangular region 714 to which the node processor at the second-row, the second-column is assigned, there are 42 synapse processors whose connection flag Fij=1, and the other synapse processors whose connection flag Fij=0. In the rectangular region 715 to which the node processor at the second row, the third-column is assigned, 48 synapse processors whose connection flag Fij=1 and 9 cell processors are present. On the other hand, in the rectangular region 712 to which the node processor at the first-row, the third-column is assigned, only 5 cell processors are present, and the other synapse processors whose connection flag Fij=0. As described above, a considerable unbalanced load distribution takes place among the node processors.

Figure 11A:
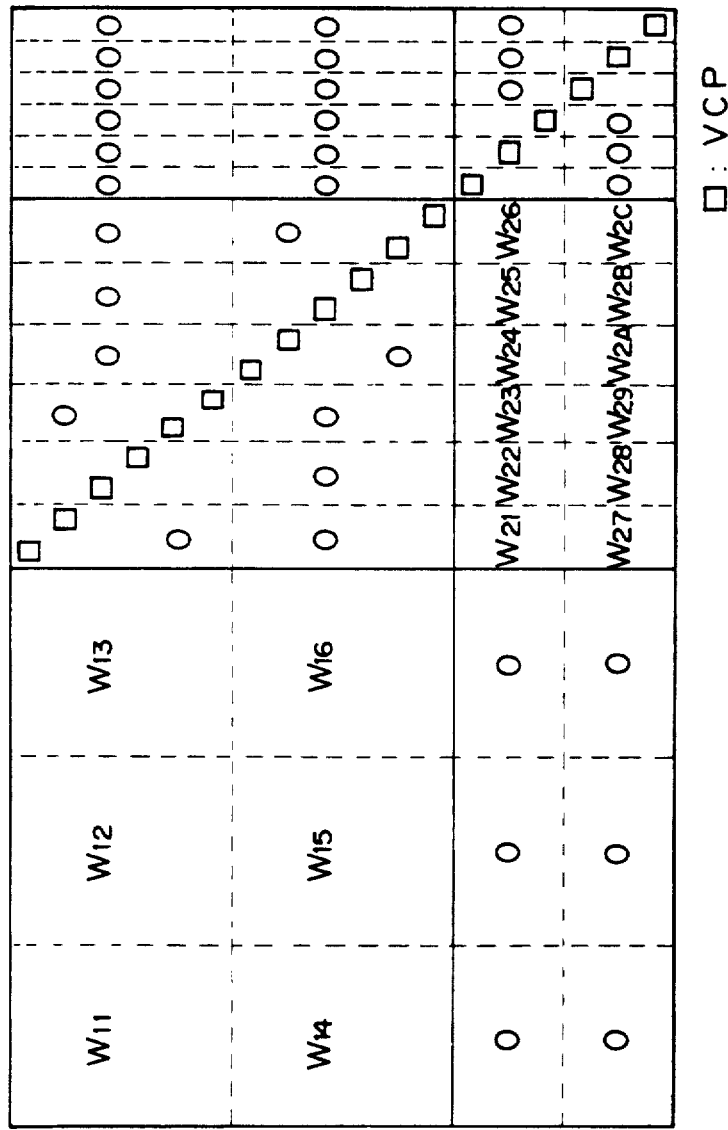
FIGS. 11A and 11B are views each of which illustrates a state in which the unbalanced load is balanced by permutating the columns.
Figure 11B:
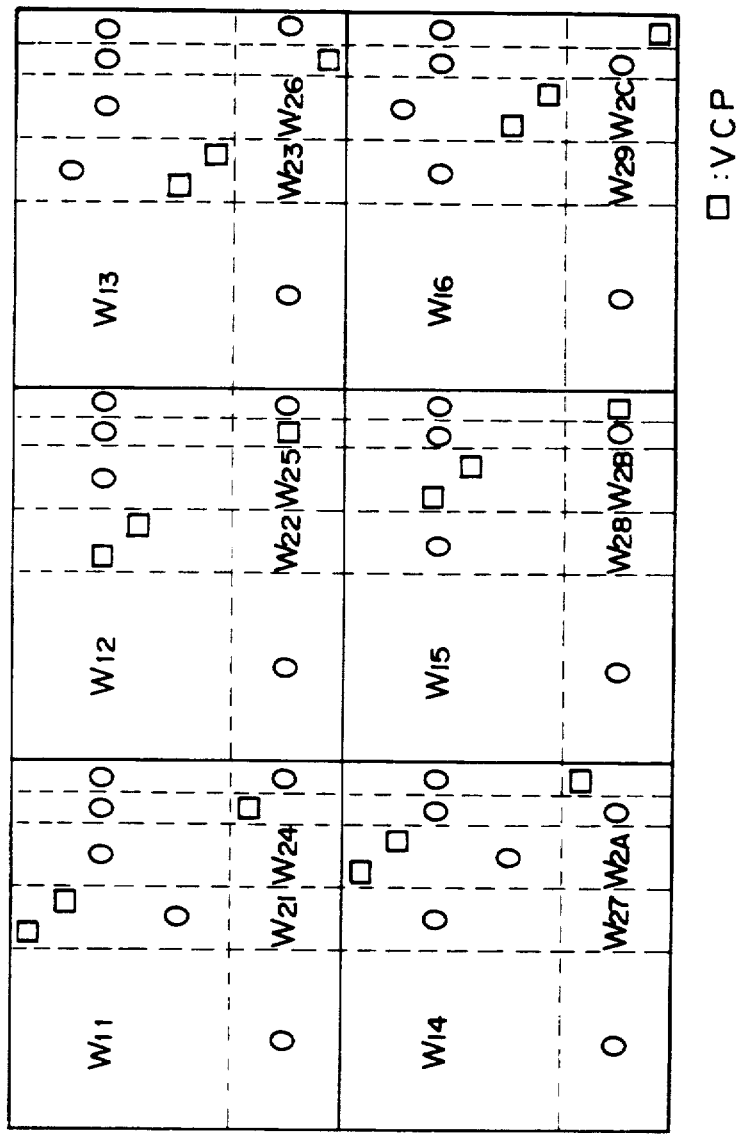

In order to solve the above-described problem, permutation of the row or the column of the virtual processor is performed. Since the product-sum operations shown in Equations (23) and (30) are not affected by the different sequential order of the addition, the same results can be obtained even if the permutation between the rows or between the columns is executed. FIG. 11A is a view which illustrates the cases in which the rectangular regions 700 and 704 in which only the synapse processors whose connection flag Fij=1 are present, the rectangular regions 702 and 703 in which only the synapse processors whose connection flag Fij=0 are present, and the rectangular regions 701 and 705 in which only the cell processor and the synapse processors whose connection flag Fij=0 are present are respectively divided into 6 regions or 12 regions. An arrangement shown in FIG. 11B can be realized by successively performing the permutations of the rows and the columns as a unit of the above described subdivide portion. When the rearrangement shown in FIG. 11B is obtained by the permutations, the division of the virtual processor lattice into 6 rectangular regions can be readily achieved balancing the load of 6 node processors.

Figure 12A:
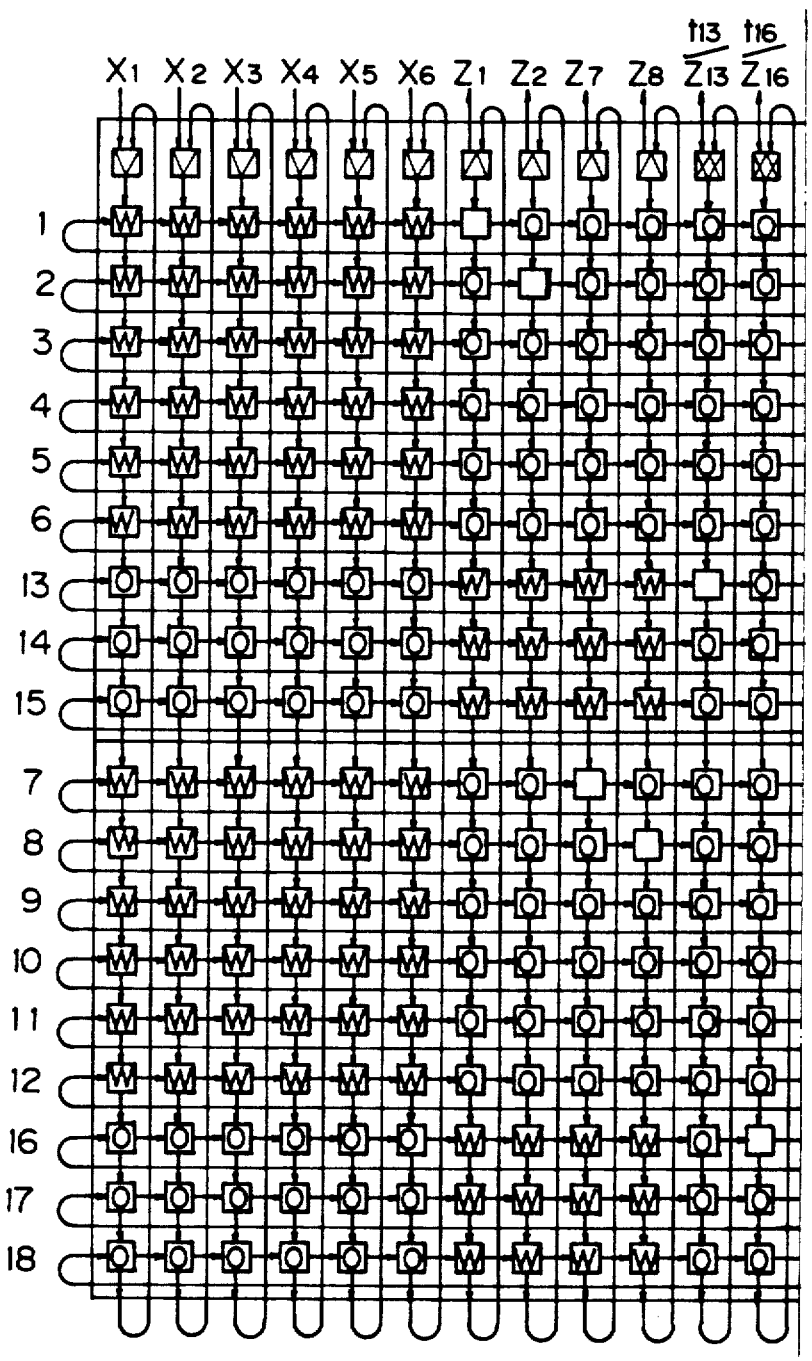
FIGS. 12A, 12B, and 12C illustrate the structure of a toroidal lattice comprising a synapse processor, a cell processor, an input processor, an output processor, and an input/output processor after the unbalanced load has been balanced.
Figure 12B:
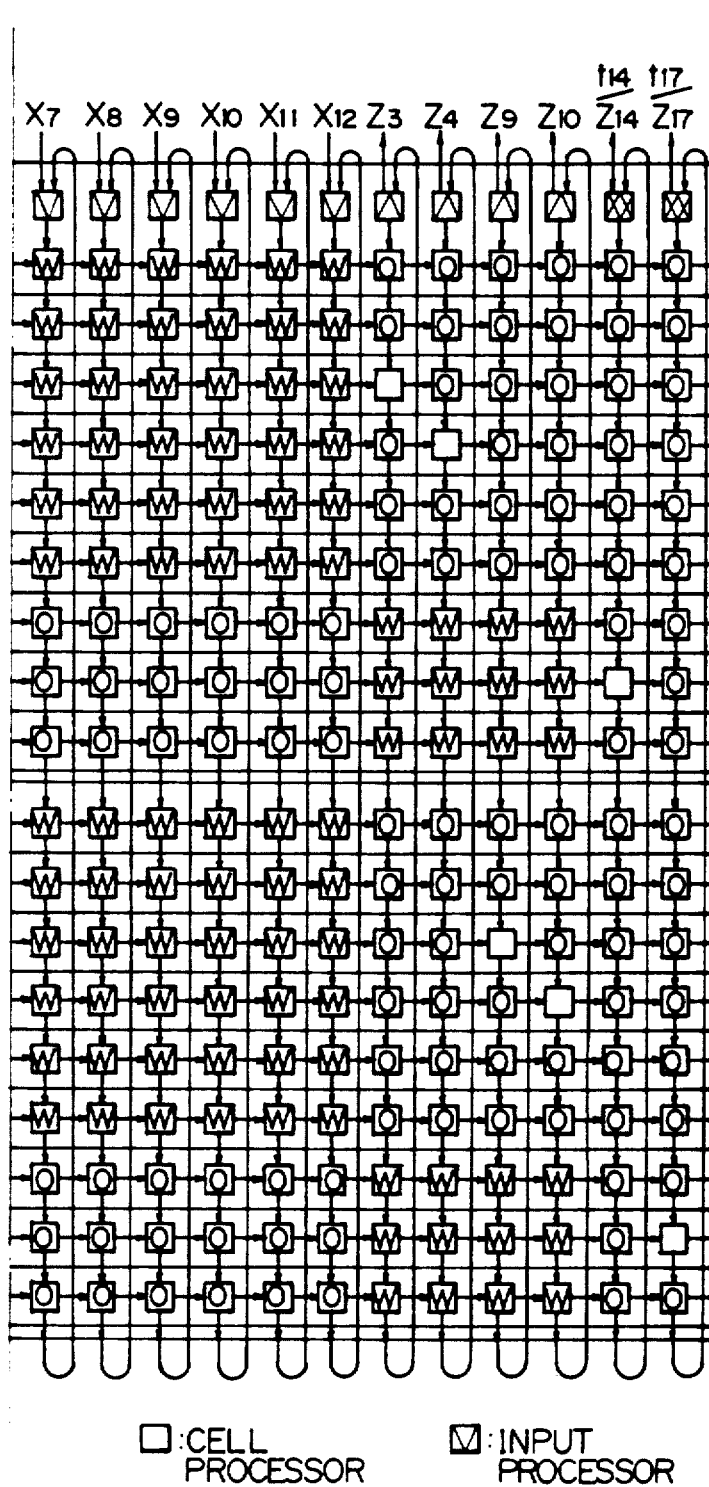
Figure 12C:
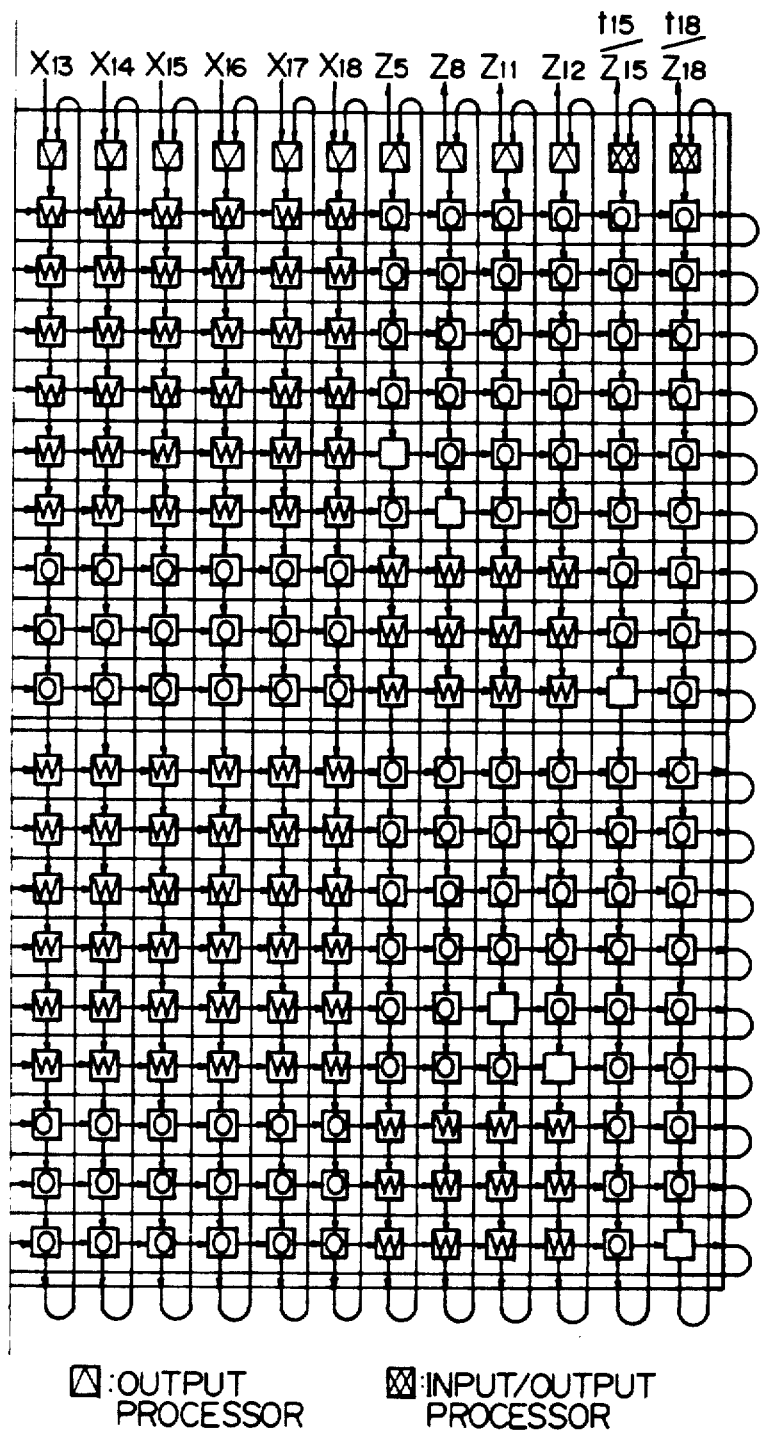
Figure 13:
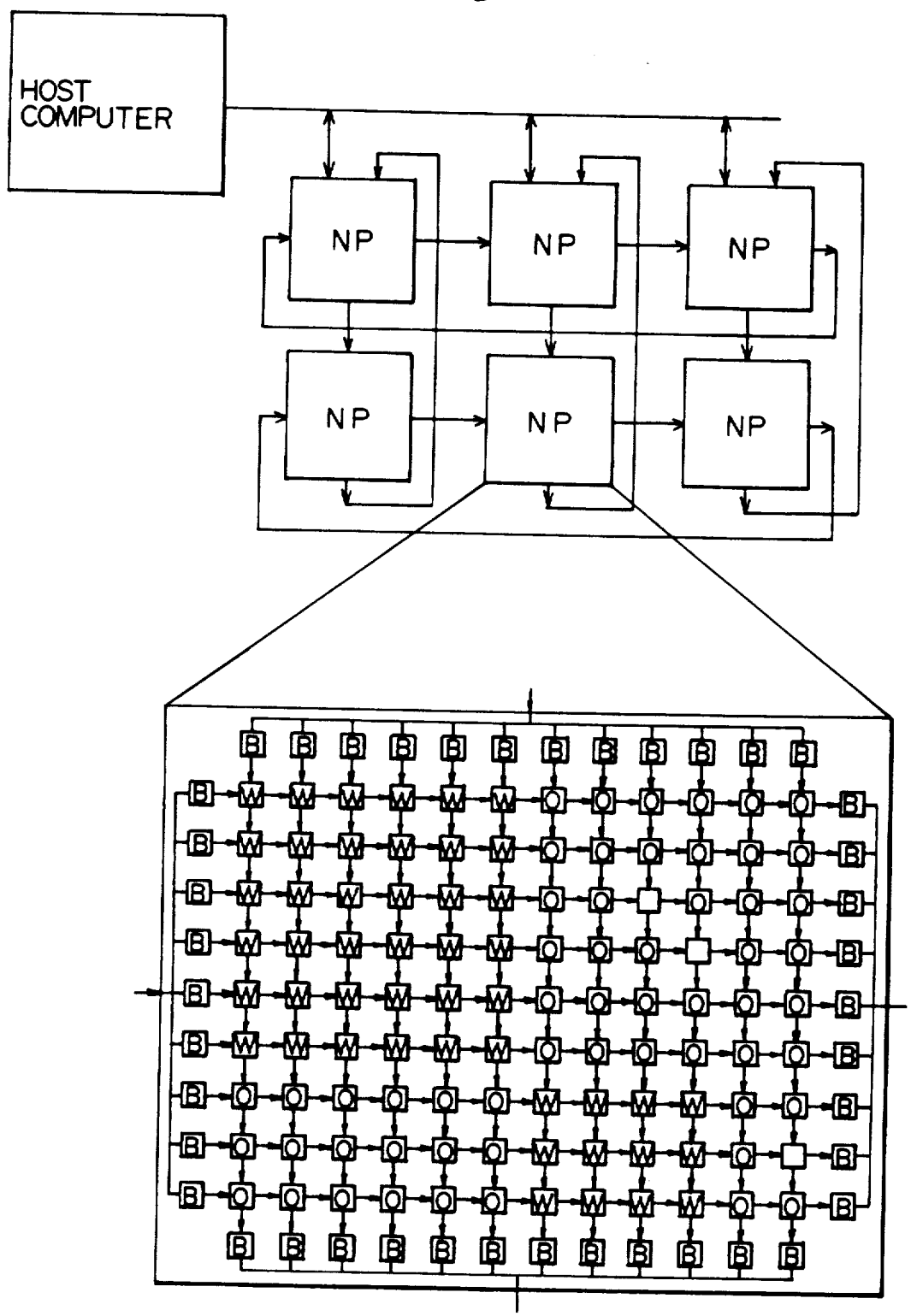
FIG. 13 is a view which illustrates the neuro-computer consisting of the node processors coupled in the form of a toroidal lattice shape of two lines and three columns.

FIG. 12 is a view which illustrates the rearrangement and the division of the toroidal lattice including the synapse processors, cell processors, input processors, output processors, and input/output processors after the load distribution has been balanced by the permutation. FIG. 13 is a view which illustrates the architecture of the neuro-computer consisting of the node processors connected to form a toroidal lattice and the virtual processors assigned to the node processors of the 2nd row and the 2nd column.

Even if the permutation of the rows and columns of the virtual processor is performed as described above, the above-described processings can be applied simply by changing the function g(j) which expresses the relationship between the rows and the columns at which the cell processor is placed. However, it is necessary for the input processors, the output processors, and the input-/output processors are placed on the 0-th row.

According to this case, since the numbers of the rows and the columns of the virtual processor can be exactly divisible by the numbers of the rows and the columns of the node processor, the division can be done so completely that the loads of the node processors are the same. While, even if the above-described numbers cannot be exactly divisible, the difference of the loads among the node processors can be limited in a range of the load of the virtual processors in one row or one column.

The toroidal lattice architecture of a feasible number of node processors and a load balancing method for the parallel neuron computer capable of simulating large-scale neural networks are described as the simulation of the multi-layer perceptron. Although the description has been made about the case of the multi-layer perceptron, the present invention can readily be applied to the other type neuron models such as the Hopfield model. In particular, the Hopfield discrete model can be expressed by Equations (38), (39), and (40). Therefore, the simulation the Hopfield model can be performed by the same processing as the basic mode of the multi-layer perceptron by making Equations (38) and (39) correspond to the function of the cell body, that is, the cell processor and Equation (40) correspond to the function of the synapse, that is, the synapse processor.

$$y_i(t) \cdot y_i(t - 1) = -y \cdot y_i(t) + S_i \quad (38)$$

$$z_i(t) = F(y_i(t)) \quad (39)$$

$$S_i = \sum_j w_{ij} \cdot z_{j-xi} \quad (40)$$

Figure 14:
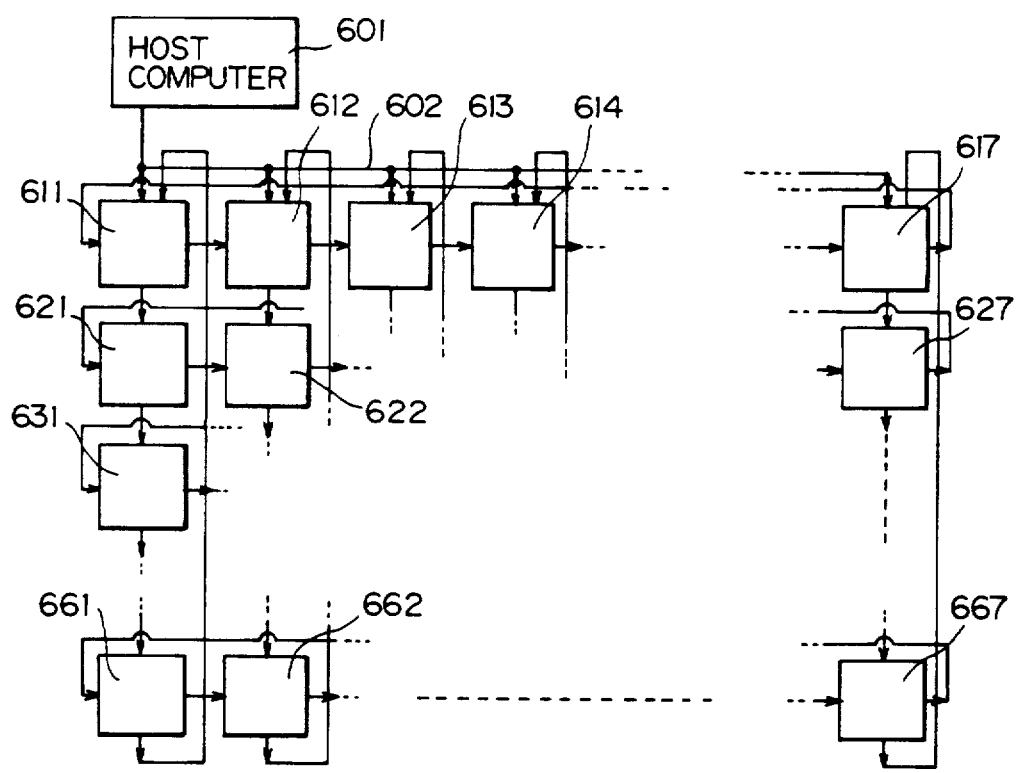
FIG. 14 is a view which illustrates the neuro-computer according to an embodiment of the present invention.

FIG. 14 is a view illustrates an embodiment of a neuro-computer according to the present invention. The neuro-computer comprises a host computer 601 and P×Q (=42) pieces of physical processors arranged in a matrix of the number of the rows P=6 and the number of the columns Q=7. Reference numerals 611, 612, ..., 617 represent the physical processors on the first row, 621, 622, ..., 627 represent the same on the second row, 661, 662, ..., 667 represent the same on the sixth row. The physical processors thus arranged to form a matrix are connected to four physical processors: upper, lower, right, and left physical processors to form a lattice. The physical processors 611, 621, ..., 661 on the first column are connected to the physical processors 617, 627, ..., 667 respectively at the same row, the seventh column. The physical processors 611, 612, ..., 617 on the first row are connected to the physical processors 661, 662, ..., 667 on the sixth row, the same column respectively. The physical processors 611, 612, ..., 617 on the first row are connected to the above-described host computer via a bus line 602.

Figure 15:
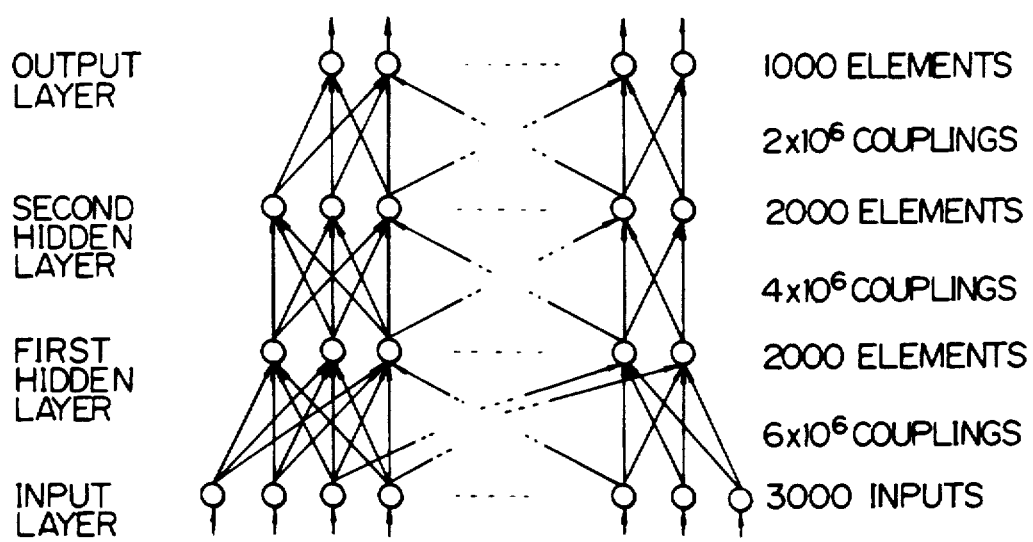
FIG. 15 is a view which illustrates the perceptron model.

Then, the case in which the model of the neural networks to be simulated is a multi-layer perceptron shown in FIG. 15 will be described.

The above-described multi-layer perceptron serves as an example of the hierarchical network shown in FIG. 16A which comprises four layers: an input layer, a first hidden layer, a second hidden layer, and an output layer. The input layer has $I=3000$ pieces of outer inputs, while the first hidden layer, second hidden layer, and the output layer respectively have 2000, 2000, and 1000 neuron elements. The above-described multi-layer perceptron includes $6 \times 10^6$ connections between the input layer and the first hidden layer, similarly $4 \times 10^6$ connections between the first hidden layer and the second hidden layer, $2 \times 10^6$ connections between the second hidden layer and the output layer. When the perceptron above is simulated by a virtual processor in the form of a toroidal lattice structure or connected to form a rectangular lattice, the arrangement of the matrix of the virtual processor is arranged to be as shown in FIG. 17. The matrix of the virtual processor above is consisting of $(J+1)=5001$ lines, $(I+J)=8000$ columns provided that the number of the inputs is I and the number of the neuron elements is J. The matrix is formed by rectangular regions 401, 406, and 411 in which only the synapse processors W are placed, rectangular regions 403, 404, 405, 408, 409, and 410 in which only zero-processors O are placed since there is no connection, square regions 402, 407, and 412 in which only the cell processors C are placed on the diagonal components and only the zero-processors O are placed on the diagonal components, and a region 400 constituted by the input processors, the output processors, and input/output processors on the first-row. The region formed by integrating the rectangular regions 401, 405, and 409 is a region showing the connection from the input terminal in the above-described input layer to the other neuron elements, this region being called "region Ai". The region formed by integrating the rectangular regions 402, 406, and 410 is a region showing the connection from the neuron elements in the first hidden layer to the other neuron elements, this region being called "region Bi". The region formed by integrating the rectangular regions 403, 407, and 411 is a region showing the connection from the neuron elements in the second hidden layer to the other neuron elements, this region being called "region Ci". The region formed by rectangular regions 404, 408, and 412 is a region showing the connection from the neuron elements in the output layer to the other neuron elements, this region being called "region Di". A region 400 formed by the input, output, input/output processors on the first line is arranged to be "region Ei". A region formed by integrating the rectangular regions 401, 402, 403, and 404 are the region showing the connection from the other neuron elements to the neuron elements in the first hidden layer, this region being called "region Fi". A region formed by integrating the rectangular regions 405, 406, 407, and 408 is the region showing the connection from the other neuron elements to the neuron elements in the second hidden layer, this region being called "region Gi". A rectangular region formed by integrating the rectangular regions 409, 410, 411, and 412 is the region showing the connection from the other neuron elements to the neuron elements in the output layer, this region being called "region Hi". In order to cause the number of the rows and the columns in each of the regions above to be easily recognized, the row numbers and the column numbers are shown in FIG. 17.

The above-described virtual processors are assigned to the physical processors as follows. In this case, since the cell processor C has the largest calculation operation load among the 5 types of the virtual processors, the rectangular regions including the cell processor C are divided into the directions of the row and the column respectively. Furthermore, the regions which do not include the cell processor C are divided into the direction of the column (it is not divided into the direction of the row). The small matrices formed by the division above (to be called "blocks" hereinafter) are assigned to the physical processors, respectively. The residue rows or the columns generated at the time of the division above are temporarily stored in a predetermined residue before being assigned to the physical processors, respectively.

(1) First, the rectangular regions Ai in which no cell processor C is included are divided into substantially equal $Q(=7)$ sections in the direction of the column (in the vertical direction). As a result, 428 columns per block is formed, and a residue of four columns are generated. Then, each of the above-described blocks is assigned to each column of the 7 columns of the above-described physical processors.

Figure 18:
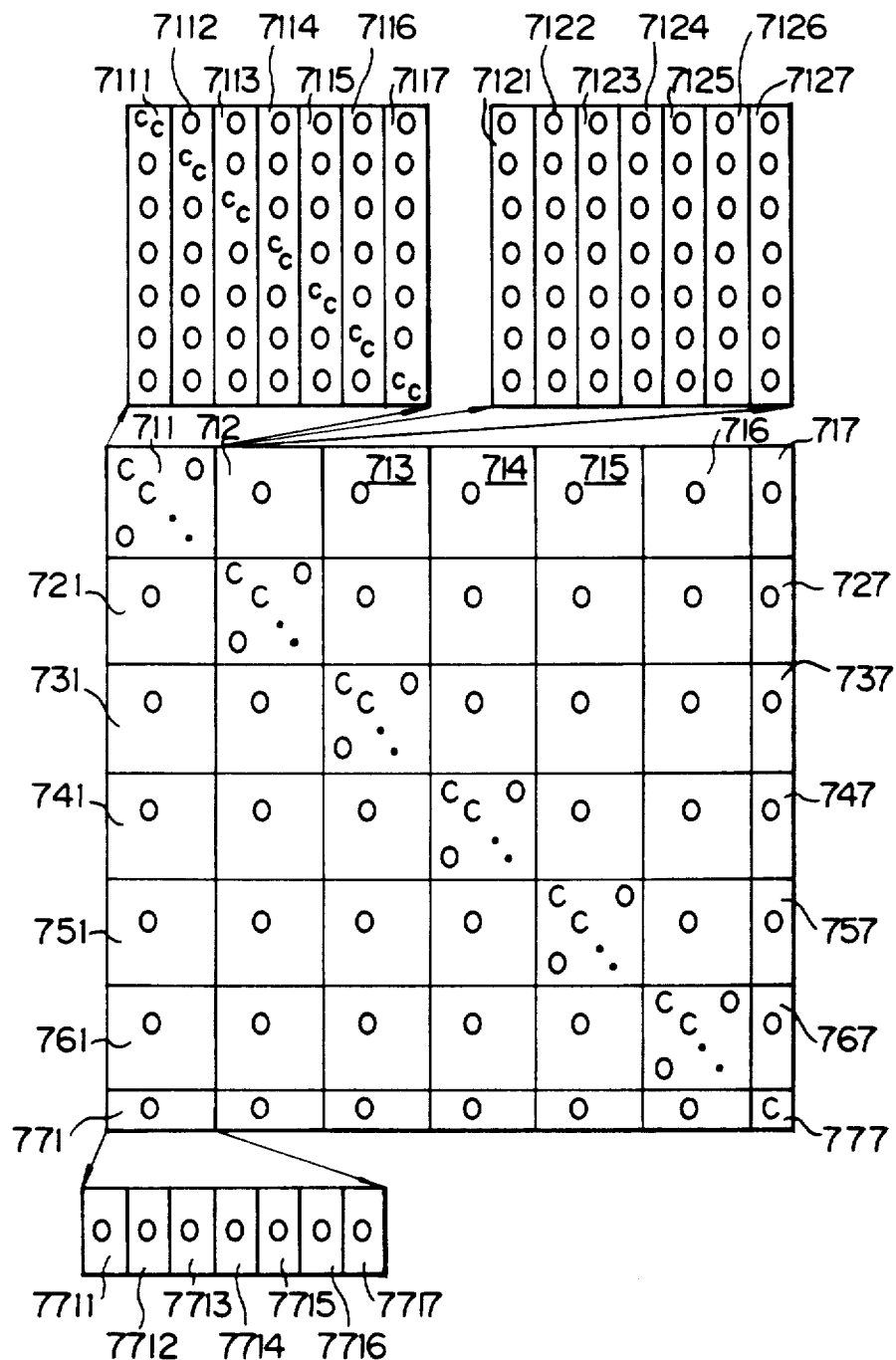
FIG. 18 is a view which illustrates a portion of the matrix of the above-described virtual processor.

(2) Then, the rectangular regions Bi including the cell processor C are divided into $P \times Q$ (=42) sections in both the directions of the row and the column. The rectangular regions Ci and Di are similarly divided into 42 sections in the direction of the row and the column. The above-described rectangular regions Bi and Ci are divided into 47 columns per block, and a residue of 26 columns is generated. The rectangular regions Di are divided into 23 columns per block, and a residue of 34 columns is generated. FIG. 18 is a view which illustrates a state in which a region BiFi in which the above-described rectangular regions Bi and Fi overlap. Then, the division of this region BiFi in both the directions of the column and the line into 42 sections, and integrating each 7 blocks form regions 711, 712, .... These regions 711, 712, ... respectively include blocks 7111 to 7117, 7121 to 7127, .... The blocks in the above-described rectangular region Bi are taken out by a cycle of 7 blocks. The 6 blocks of the thus taken out are assigned to a column of the physical processors. This assignment of 6 blocks is applied to each of the columns of the physical processors. In the case of the above-described region BiFi, the virtual processors are assigned to the first column of the physical processor by each 47 columns for a block (one block) at a cycle of 329 columns (7 blocks). For example, 6 blocks: 7111, 7121, 7131, 7141, 7151, and 7161 are assigned to the physical processor 611 shown in FIG. 14. Similarly, blocks 7112 to 7162 are allotted to the physical processor 612, blocks 7113 to 7163 are assigned to the physical processor 613, blocks 7114 to 7164 are assigned to the physical processor 614, and blocks 7117 to 7167 are assigned to the physical processor 617.

(3) When each of the rectangular regions excluding the rectangular region $E_i$ is divided into $P \times Q$ (=42) sections similarly to the direction of the column in the direction of the row of the above-described virtual processor, the rectangular regions Bi and Gi are respectively arranged to be 47 rows per block, and a residue of 26 rows is generated. The rectangular region Hi is arranged to be 23 lines per block, and a residue of 34 rows is generated. The rows are not permutated and 7 blocks are integrated as it is in each of the rectangular regions, that is, the rectangular regions Fi and Gi are collected into 329 rows, the rectangular region Hi is collected into 161 rows so as to be respectively assigned to each of the rows of the above-described physical processor. For example, the blocks 7111 to 7161 are assigned to the physical processor 611, the blocks 7211 to 7261 are assigned to the physical processor 621, the blocks 7311 to 7361 are assigned to the physical processor 631, and the blocks 7611 to 7661 are assigned to the physical processor 661.

(4) After the above-described assigning of the each of the block has been performed, the residues generated at the divisions are assigned to the physical processors.

First, the residues generated at the time of the divisions in the direction of the column are processed. A residue is previously prepared, and the following 90 columns are stored in this residue: 4 columns (the 2997, 2998, 2999, and 3000-th column) generated at the time of dividing the above-described rectangular region Ai into 7 sections, 26 columns (the 4975-th column to the 5000-th column) generated at the time of dividing the rectangular region Bi, 26 columns (the 6975-th column to the 7000-th column) generated at the time of dividing the rectangular region Ci, and 34 columns (the 7967-th column to the 8000-th column) generated at the time of dividing the rectangular region Di. The columns of the residue arrangements are assigned to the physical processors of 7 columns in a cyclic manner for each column. That is, 13 columns of virtual processor columns are assigned from the first physical processor column to the sixth physical processor column, and 12 columns of virtual processor columns are assigned to the 7-th processor column. For example, 13 columns: the 2997-th, 4978-th, 4985-th, 4992-th, 4999-th, 6980-th, 6987-th, 6994-th, 7967-th, 7974-th, 7981-th, 7988-th, and 7995-th are newly assigned to the first column of the physical processor.

Then, the residue generated when the virtual processor matrix is divided in the direction of the rows are processed. In the above-described residue arrangements, the following 86 rows are stored: the residue 26 rows (the 1976-th row to the 2001-th row) generated at the time of dividing the above-described rectangular region Fi, 26 rows (the 3976-th row to the 4001-th row) generated at the time of dividing the above-described rectangular region Gi, and 34 row (the 4968-th row to the 5001-th row) generated at the time of dividing the above-described rectangular region Hi. Then, since the rectangular region Ei has been assigned to the first row of the above-described physical processor, the rows of the above-described residue arrangements are assigned from the second row of the 6-row physical processor by each row in a cyclic manner. That is, 15 rows of the virtual processors are assigned to the first to the third-row of the physical processor including a row of the rectangular region Ei, and 15 rows are assigned to the fourth to sixth rows. For example, the following 15 rows are assigned to the first row of the physical processor: the 1981, 1987, 1993, 1999, 3979, 3985, 3991, 3997, 4969, 4975, 4981, 4987, 4993, and 4999-th rows.

Figure 19:
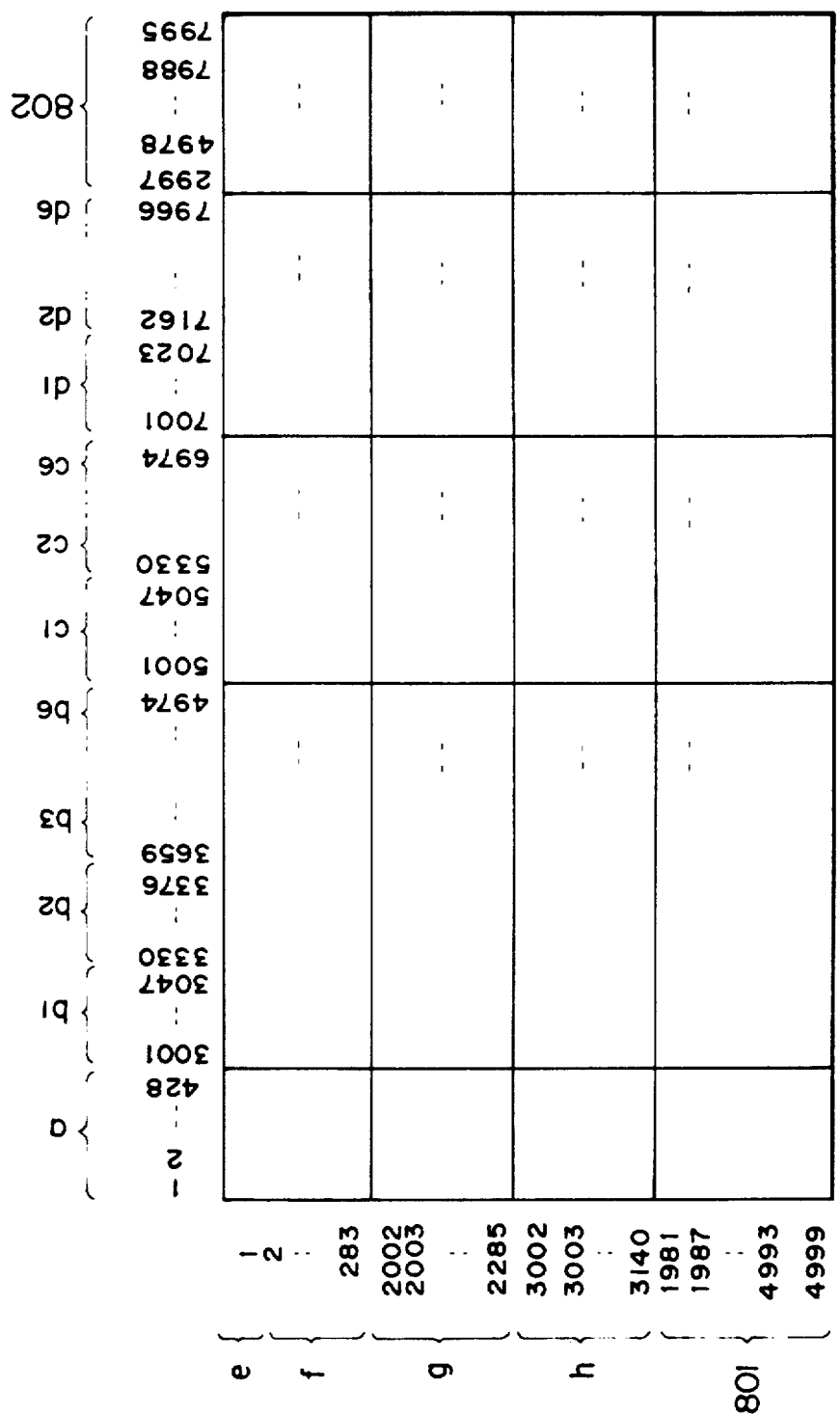
FIG. 19 is a view which illustrates a portion of the matrix of the actual processors to which the above-described virtual processors are assigned.

FIG. 19 is a view which illustrates the arrangement in which the above-described virtual processors is assigned to the physical processor 611 at the first-row, the first-column. Referring to the drawing, symbol represents a region to which the rectangular region Ai is assigned, b1, b2, b3, . . . , b6 are regions to which the rectangular region Bi is assigned, c1, c2, . . . , c6 are regions to which the rectangular region Ci is assigned, d1, d2, . . . , d6 are regions to which the rectangular region Di is assigned, and reference numeral 802 represents a region to which the residues generated at each of the divisions in the direction of the column are assigned. On the other hand, symbol e represents a region to which the rectangular region Ei is assigned, f represents a region to which the rectangular region Fi is assigned, g represents a region to which the rectangular region Gi is assigned, h represents a region to which the rectangular region Hi is assigned, and reference numeral 801 represents a region to which the residue generated at the time of the division in the direction of the line is assigned. The numbers in the directions of the columns and the lines represent the number of the columns and the lines of the virtual processor.

Thus, the synapse processor W and the cell processor included in each of the rectangular regions can be substantially uniformly assigned to the physical processor by dividing the virtual processor capable of simulating the perceptron model and by assigning it to the actual processor. Therefore, the neuro-computer can eliminate the deflection of the calculation load between the physical processors, and the efficiency in the parallel processing can be improved and the time required to complete the calculation can be shortened.

A general allotting manner with respect to a usual perceptron will be described.

Figure 20:
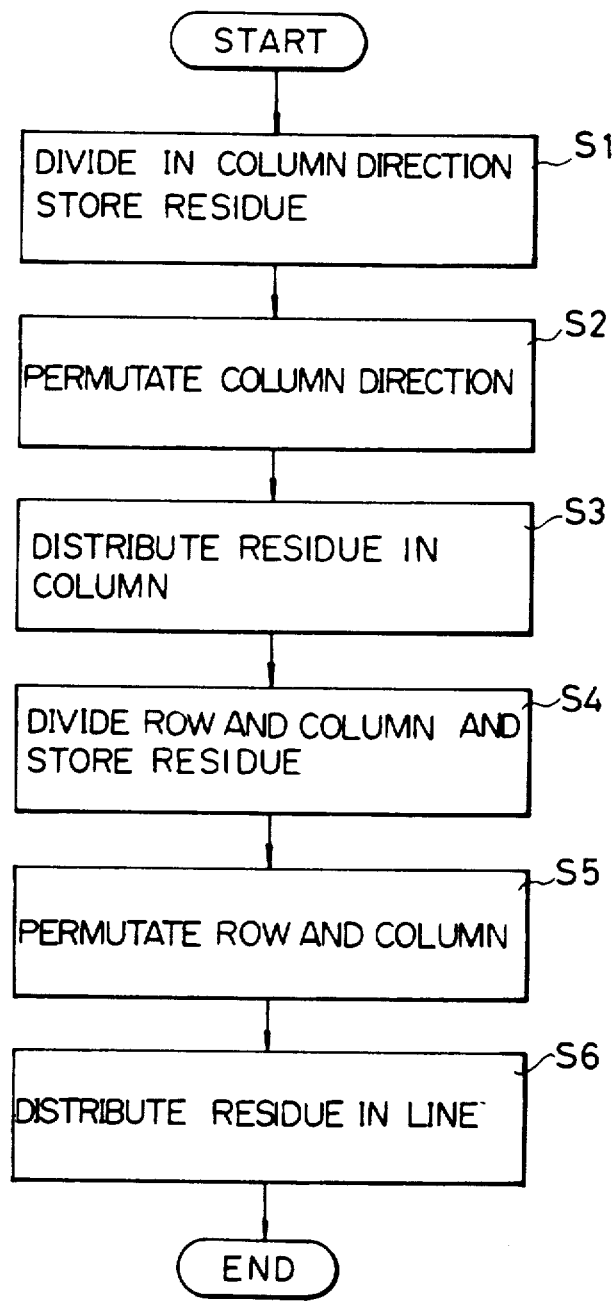
FIG. 20 is a flow chart which illustrates the procedure of assign the above-described virtual processors to the physical processors.

It is assumed that the dimension (the number of the neuron elements in the 0-th layer) of the input vector to the neural networks is $L_0$, the number of the layers including the input layer and the output layer is M, the number of the neuron elements in the k-th layer is $L_k$, the number of all of the neuron elements $$\left( \sum_{k=0}^{M} L_k \right),$$

and the physical processor to be used here is arranged to be P lines, Q columns (P×Q pieces). The virtual processor is assigned in accordance with the procedure shown in FIG. 20, where symbols (A mod B) represents the residue of the division of A with B, int represents the integer portion of x.

(5) First, the column address is permutated.

It is assumed that symbol s represents the column address of the imaginary processor matrix.

(a) when $0 < s \leq L_0$

The permutation address or the column address s is positioned in the actual processor on the n-th column, $$n = \text{int}(s/\text{int}(L_0/Q)) + 1 \tag{41}$$

at the u-th column from the front end, $$u = s - (n-1) \cdot \text{int}(L_0/Q) \tag{42}$$

in the case where residue is present, that is in the case $(L_0 \bmod Q) \neq 0$, the following s is stored in the array named surplus:

$$L_0 - (L_0 \bmod Q) < s \leq L_0$$

where $$D^k_{PQ} = \text{int}(LK/P/Q), \quad Ck = \sum_{i=0}^{k-1} Li$$

(b) when $Ck < s \leq Ck + Lk$
Here, $$D^K_{PQ} = \text{int}(Lk/P/Q), \quad Ck = \sum_{i=0}^{k-1} Li$$

The permutation address of the column address s is, in the physical processor on the n-th column, $$n = (\text{int}((s - Ck)/D^k_{PQ}) \bmod Q) + 1 \quad (43)$$

at the u-th column from the top column of the physical processor.

$$u = \text{int}(L_0/Q) + \sum_{i=0}^{k-1} (D^i_{PQ} \times P) + \quad (44)$$

$$\text{int}((s - Ck)/Q/D_{PQ}) \times D^k_{PQ} + ((s - Ck) \bmod D^k_{PQ}) + 1$$

in the case where a residue exits, that is in the case where (Lk mode $(P \times Q)) \neq 0$, the residue expressed by:

$$Ck + Lk - (Lk \bmod(P \times Q)) < s \leq Ck + Lk \quad (45)$$

S is stored in the array named surplus (steps $S_1$ and $S_2$).

(6) Then, the surplus array is processed.

The above-described surplus array is assigned to the physical processor of Q columns in a cyclic manner for each column (step $S_3$).

(7) Then, the row address is permutated.

It is assumed that t represents a row address.

When $t = 1$, it is assigned to the first-row processor.

When $Ck + 1 < t \leq Ck + Lk + 1$, where $D^k_{PQ} = \text{int}(Lk/P/Q)$, $$Ck = \sum_{i=0}^{k-1} Li,$$

$$\delta_{ij} = \begin{cases} 1(i = j) \\ 0(i \neq j) \end{cases}$$

The permutation address of the row address t is, in the m-th row physical processor, $$m = \text{int}((t - Ck - 1)/Q/D^k_{PQ}) + 1 \quad (46)$$

at the v-th row from the front end, $$v = \sum_{i=0}^{k-1} (D^i_{PQ} \times Q) + t - Ck - 1, \quad (47)$$

$$- (m - 1) \cdot Q \cdot D^k_{PQ} + \delta_{lm}$$

When a residue exists, that is, when (Lk mod($P \times Q$))$\neq 0$, t expressed by $$Ck + Lk - (Lk \bmod(P \times Q)) < t \leq Ck + Lk \quad (48)$$

is stored in the surplus array (steps S4 and S5).

(8) Finally, the surplus array is processed.

The above-described surplus array is successively assigned to the P-row physical processor from the second physical processor row for each row in a cyclic manner (step $S_6$).

Figure 21:
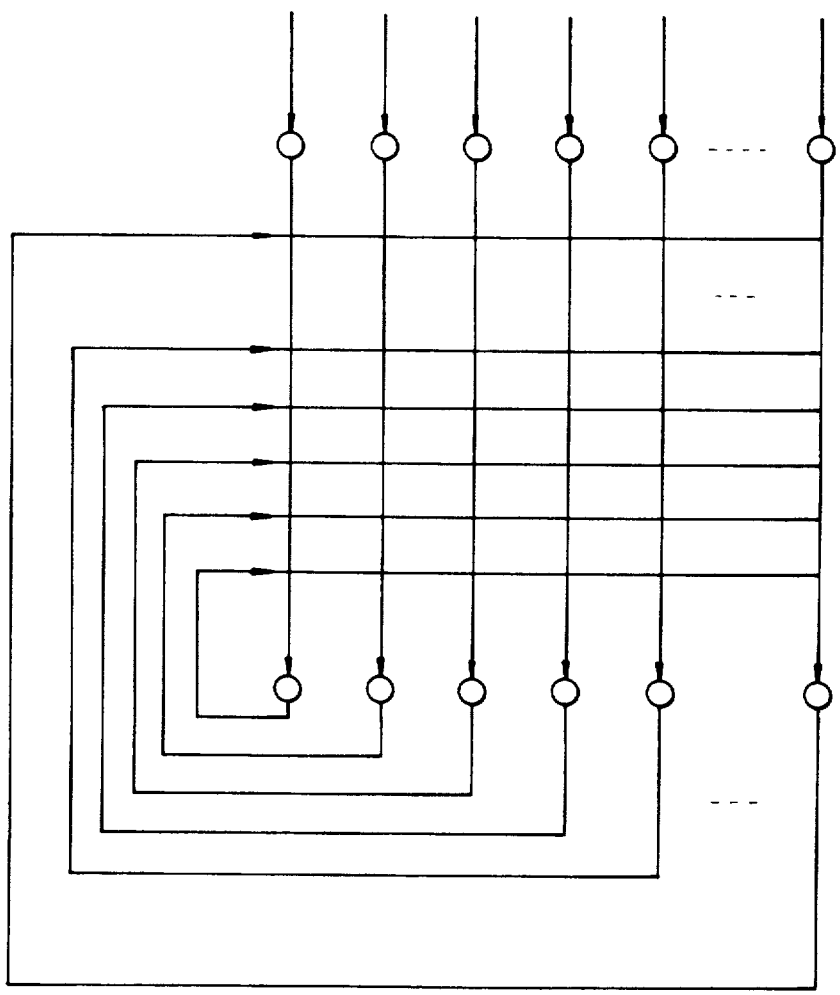
FIG. 21 is a view which illustrates a Hopfield model.

Then, a case will be described in which the above-described neuro-computer comprises $P \times Q$ ($= 6$) pieces of physical processors placed on a matrix whose number of the rows $P = 2$ and the number of columns $Q = 3$, and the model of the neural networks to be simulated is the Hopfield model shown in FIG. 21.

Figure 16D:
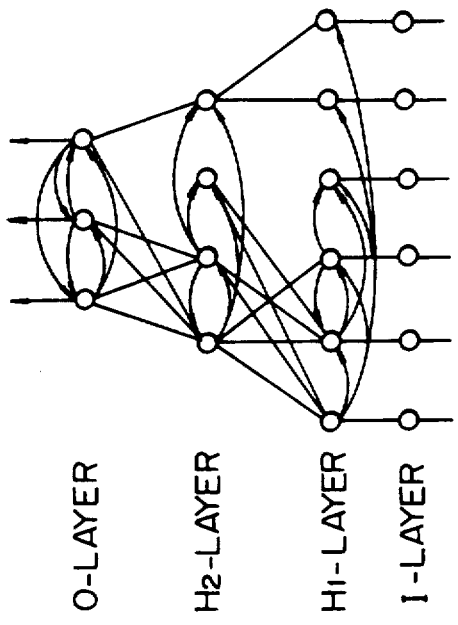
Figure 17:
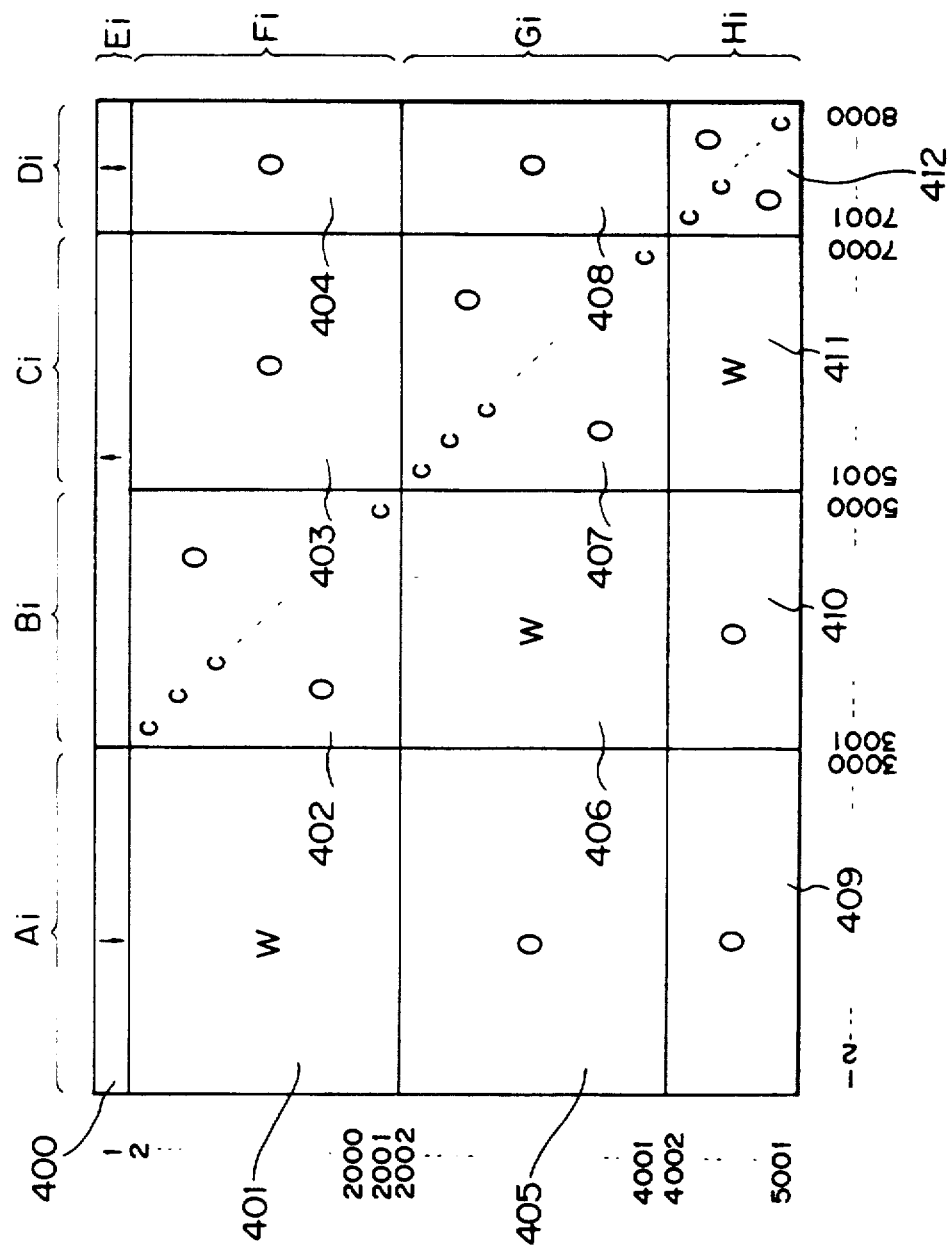
FIG. 17 is a view which illustrates the matrix of a virtual processor for simulating the above-described perceptron model.
Figure 22:
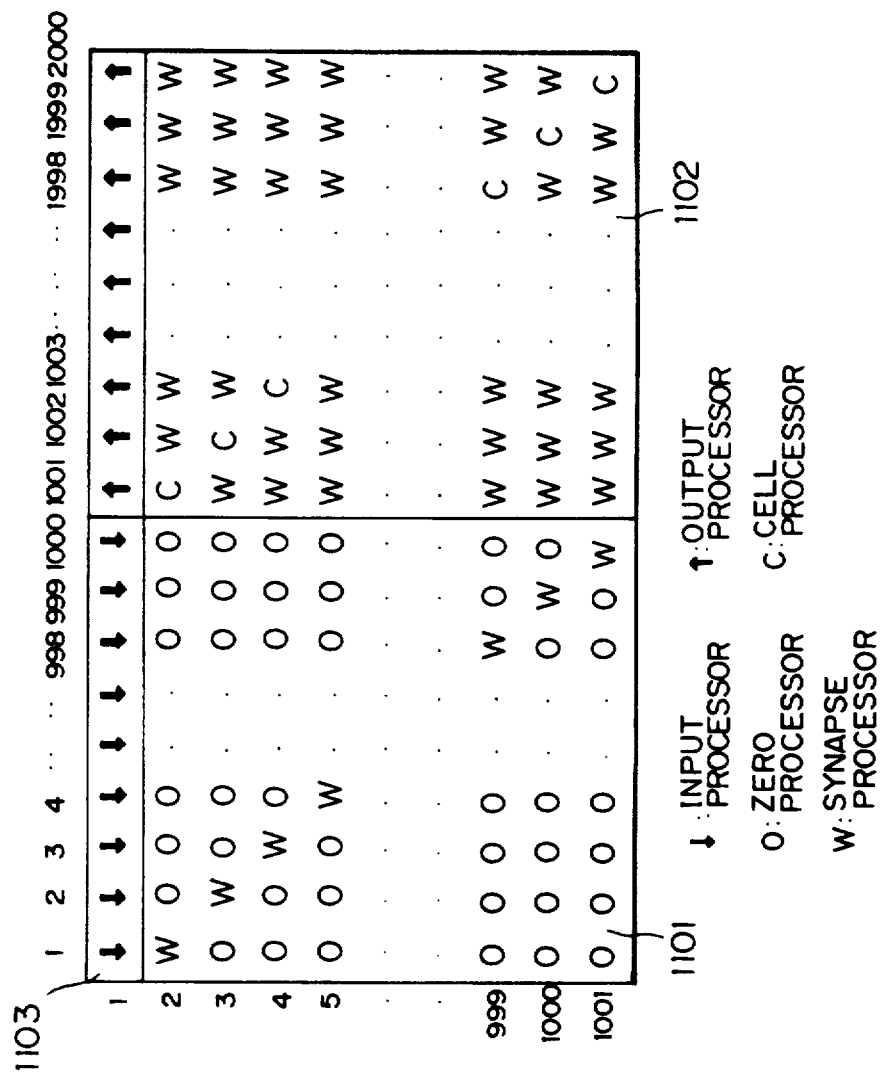
FIG. 22 is a view which illustrates the matrix of the virtual processors for simulating the above-described Hopfield model.

This Hopfield type network is an example of the structure shown in FIG. 16D in which the number of all of the neurons $I = 1000$, and the number of the connection is $(I \times I)$. In the case where the Hopfield network is simulated by virtual processors connected in a toroidal lattice or a rectangular lattice, the matrix of the virtual processor is as shown in FIG. 22. The matrix of this virtual processor is consisting of $(I + 1) = 1001$ rows and $2I = 2000$ columns, the matrix being consisting of a region 1101 in which only the synapse processors W are arranged in the diagonal component and only the zero processors 0 are placed in the non-diagonal component, a region 1102 in which only the cell processor are placed in the diagonal component and only the synapse processors W are placed in the non-diagonal component, and a region 1103 (the first row) in which the input processors (represented by symbol) and output processors (represented by symbol) are placed.

The above-described imaginary processors are assigned to the actual processors in the procedure as shown in FIG. 23 as follows:

(9) The regions 1101 and 1102 are divided into $P \times Q$ ($= 6$) blocks substantially equally in the direction of the column. The regions 1101 and 1102 are respectively divided into 166 column per block, and a residue of 4 columns are generated. The blocks in the regions 1101 and 1102 collected are taken out in the direction of the column at a cycle of three blocks. The thus taken out four blocks are assigned to a column of the physical processor. Samely this assignment of four blocks is each carried out on the columns of the physical processors.

While, the residue 8 columns generated at the time of the above-described divisions are temporarily stored in the surplus array which has been previously prepared so as to be cyclically assigned to one residue column for one physical column respectively from the first column of the physical processors. For example, three columns: the 997, 1000, and 1999-th columns are assigned to the first column of the physical processor. Similarly, the three columns of residue 8 columns are assigned to the second physical processor column, and the rest two columns of residue 8 columns is assigned to the third physical processor column.

(10) Then, both the above-described regions 1101 and 1102 are divided into $P \times Q$ ($= 6$) blocks substantially equally in the direction of the row. An arrangement of 166 rows per block is formed, and a residue of 4 rows are generated. The rows are not permutated, and the same are collected by three blocks unit so as to be assigned to each of the rows of the above-described physical processor. For example, the second to the 499-th rows of the above-described virtual processor are assigned to the first row of the physical processors. The residue 4 rows are temporarily stored in the surplus array before being cyclically assigned from the second row of the physical processors of the two rows for each row. For example, the 999 and 1001-th rows of the virtual processor is assigned to the first row of the physical processors, and the 998 and 1000-th row of the virtual processor are assigned to the second row of the physical processors.

FIGS. 23A and 23B are views which illustrate the arrangement formed by assigning the virtual processors the first-row, first column, and the second row, the second column physical processors.

As described above, when the virtual processor capable of simulating the Hopfield model is divided so as to be assigned to the physical processor, the neuro-computer can eliminate the unbalanced calculation load between the physical processors similarly to the above-described perceptron model. As a result, the efficiency in the parallel processing can be improved, and the required time to complete the calculations can be shortened.

The general assignment can be performed for usual Hopfield in accordance with the procedure shown in FIG. 23 as follows:

(11) First, the column addresses are permutated.

It is assumed that symbol s represents the column address.

(a) When $0 < s \leq I$, where $D_{PQ} = \text{int}(I/P/Q)$.

The permutated address of the column address s is, in the physical processor at the n-th column, $$n = (\text{int}(s/D_{PQ}) \bmod Q) + 1 \quad (49)$$

at the u-th column from the front end, $$u = \text{int}(s/Q/D_{PQ}) \times D_{PQ} + (s \bmod D_{PQ}) + 1 \quad (50)$$

in the case where a residue is present, that is, when (I mod(P×Q))≠0, s expressed as follows is stored in the surplus array:

$$I - (I \bmod(P \times Q)) < s \leq I.$$

(b) When $I < s \leq 2I$, the permutated address of the column address is, in the physical processor at the n-th column, $$n = \text{int}((s - I)/Q/D_{PQ}) + 1 \quad (51)$$

at the u-th column from the front end, $$u = D_{PQ} \times P + \text{int}((s - I)/Q/D_{PQ}) \times D_{PQ} + ((s - I) \bmod D_{PQ}) + 1 \quad (52)$$

In the case where a residue exists, that is, when (I mod(P×Q))≠0, s expresses as follows is stored in the surplus array (steps $S_1$ and $S_2$):

$$2I - (I \bmod(P \times Q)) < s \leq 2I \quad (53)$$

(12) Then, the surplus array is processed.

The above-described surplus array is successively assigned to the physical processors of Q columns cyclically for each column (step $S_3$).

(13) Then, the row address is permutated.

It is assumed that t presents the row address.

When t = 1, it is assigned to the first row processor,

When 1 < t, the permutated address of the row address t is, in the m-th row physical processor, $$m = \text{int}\,((t - 1)/D_{PQ}/Q) + 1 \quad (54)$$

at the v-th row from the front end, $$v = t - 1 - (m - 1) \cdot Q \cdot D_{PQ} + \delta lm \quad (55)$$

In the case where a residue exists, that is, when (I mod (P×Q))≠0, t expressed as follows is stored in the array named surplus (steps $S_4$ and $S_5$):

$$I + 1 - (I \bmod(P \times Q)) < t \leq I + 1 \quad (56)$$

(14) Finally, the surplus array is processed.

The above-described surplus is successively assigned to the P-row physical processors from the second physical processors row for each row in a cyclic manner (step $S_6$).

As described above, the description has been made about the example in which the neuro-computer according to the present invention is applied to the multilayer perceptron and Hopfield models. The present invention is not limited to these two network models. For example, the present invention can be applied to the other type network models shown in FIGS. 16B and 16C.

Figure 16C:
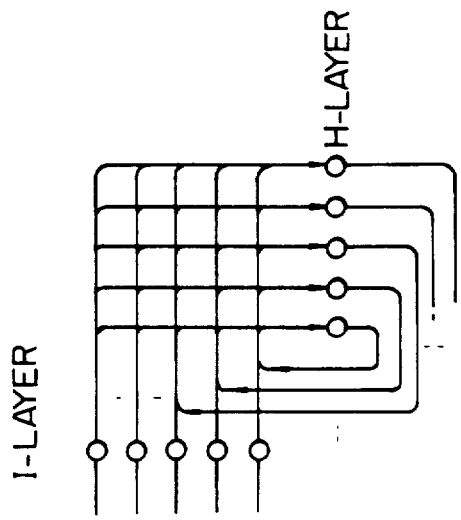

When all of the neuron elements between the layers are connected in the models shown in FIGS. 16A and 16B, when all of the neurons in the same layer and between the layers in the model shown in FIG. 16C, and when all of the neuron elements are connected in the model shown in FIG. 16D, imaginary processors connected to form a toroidal lattice or a rectangular lattice cause the pattern of the virtual processors matrix to become as shown in FIGS. 24A, 24B, 24C, and 24D, where symbol W represents the synapse processor, O represents a zero processor (which corresponds to the case in which no connection is present between the neurons), and C represents the cell processor (to be common hereinafter). In order to make the description simple, the input processors, the output processors, and input/output processors placed at the first row are omitted from illustration. As is shown form the figures, the matrix of the imaginary processors generates a rectangular region in which there are the same type processors, and a rectangular region in which the same type processor are present on the diagonal component and the other type processors are present on the non-diagonal component. The above-described rectangular regions are classified into five types of rectangular regions with the first row excluded as shown in FIGS. 25A to 25E. FIGS. 25A and 25B show the former type region, while FIGS. 25C, 25D, and 25E show the latter type region.

As described above, according to the present invention, a neuro-computer can be provided which is capable of simulating large-scale neural networks at high speed by parallel operating a multiplicity of processors.

In particular, a problems in terms of the complicated connections between the processors which arises when large-scale neural networks are parallel simulated by parallel processors can be overcome by a toroidal lattice architecture which is extremely practical for the packaging. Furthermore, in the parallel processing of parallel processors, the load can be balanced by permutating along the rows and columns of the virtual processor matrix. Furthermore, the information transmission between the physical processors can be performed for each of the rows and columns in parallel with the calculation operation. Therefore, the processing performance cannot deteriorate due to the transmission capacity. Therefore, the performance of each of the processors can be realized sufficiently. Consequently, the processing performance of the neuro-computer can be improved in proportion to the number of the provided processors. On the other hand, even if the number of the physical processor is determined, the presented neurocomputer can simulate the neural network which consist of ambiguous number of neurons. However, the size of neural network which the toroical lattice connected neurocomputer can simulate is limited by the capacity of the physical processor memory. This means that the toroidal lattice connected neurocomputer can simulate the neural network no matter how it is large if sufficient memories are provided. Samely, the performance of the toroidal lattice neurocomputer increases in proportion to the number of the connected processors. Furthermore, as this connection method claimed in this invention represents the function of neurons in general, various neural network models can be simulated on this neurocomputer besides multi layer perceptron model and Hopfield network model. Now, the second embodiment of the present invention will be described in details, without describing the same parts of the 1st embodiment (except repeating the necessary equations). In the second embodiment, $$y_j = w_j \cdot v \tag{5}$$

Further decomposing Equation (5), $y_j^i$ can be expressed by the recurrence formulas of Equations (6) and (57):

$$y_j^i = y_j^{i-1} + w_{ij} \cdot v_i \tag{6}$$

$$y_j^i = y_j^{i+1} + w_{ij} \cdot v_i \tag{57}$$

According to the model of the neural networks of this type, Equations (3), (5), (6) and (57) correspond to the function of each of the synapses, the function being the product-sum operation between the coefficient of the connection (the weight) of the synapse and the input of the neural networks or the output of the neuron cell. Equation (4) corresponds to the function of each of the neuron cell bodies.

According to the second embodiment, in order to execute the largest number of the product-sum operation in parallel in the calculations of the neural networks, the operations of Equations (6) and (57) in which the partial sum that is the decomposition of the product-sum operation is calculated and the storage of the weight which is necessary in this calculation are included in the synapse processor function. The calculation of the Equation (4) corresponding to the function of the cell body is executed by the cell processor. The synapse processors and the cell processors are connected to each other by bi-directional channel so as to form a rectangular lattice and can exchange information with the upper, the lower, the right and the left processors.

For example, in the case of Equation (6), as $y_j^i = w_{ij} \cdot v_i$, the partial sum is calculated from the left-most synapse processor to the right direction through the synapse processors on a row as well as the first embodiment. When the process reaches the cell processor placed on the row, the product-sum operation is completed.

While, in the case of Equation (57), synapse processor receives signal $v_i$ which has been transmitted from the upper synapse processor and executes the product operation between weight $w_{ij}$ of the synapse processor and signal $v_j$. Then, the partial sum $y_j^{i+1}$ which has been received from the right synapse processor is added to the result of the product operation so that a new partial sum $y_j^i = y_j^{i+1} + w_{ij} \cdot v_i$ is obtained. Finally, the thus new partial sum is transmitted to the left synapse processor. On the other hand, synapse processor receives signal $v_i$ to the lower synapse processor which has been transmitted from the upper synapse processor.

As $y_j^{H+J} = W_{H+J,j} \cdot V_{H+J}$, the partial sum is calculated from the right-most synapse processor passing through the synapse processors on a row in the left directions. When the process reaches the cell processor placed on the row, the sum of the products operation is completed.

Adding the results of the sum of the products from both directions, the added results are used in the calculation in Equation (4) in the cell processor. The calculated output $z_j$ from the cell body is stored in the cell processors, and then transmitted to the upper and lower synapse processors so as to be used in the following calculation.

In the case where, it is assumed that the synapse processor, the cell processor, the input processor, the output processor, the input/output processor are the virtual processors, the virtual processor groups arranged to form the J+1 rows and H+J columns are divided into P sections in the vertical direction and into Q sections in the horizontal direction, an physical processor is assigned to each of the rectangular section which has been divided as described above, and an physical processor is connected to form P-rows, Q-columns rectangular lattice, each of the physical processor can parallel execute the product-sum operation which has been performed by the synapse processor. Equations (6) and (57) can be rewritten into equations for each of the physical processors as follows:

$$y_j^q = y_j^{q-1} + \sum_{Ilq \leq i \leq Iuq} w_{ij} \cdot v_i \tag{7}$$

$$y_j^q = y_j^{q+1} + \sum_{Ilq \leq i \leq Iuq} w_{ij} \cdot v_i \tag{58}$$

where Ilq and Iuq respectively represent the first column number and the final column number of the rectangular region corresponding to the physical processor of the p-row, q-column. The product-sum operation in the latter half on the right sides of Equations (7) and (58) can be performed in parallel for each of the physical processors, described above, further decomposing Equation (23), $y_j^k(n, m)$ can be expressed as the partial sum by the recurrence formulas of Equations (58) to (61):

$$y_j^1(n,m) = w_{1,j}(n) \cdot v_1(n,m) \tag{58}$$

$$y_j^k(n,m) = y_j^{k-1}(n,m) + w_{k,j}(n) \cdot v_k(n,m) [k=2, \ldots, g(j)] \tag{59}$$

$$y_j^{H+J}(n,m) = w_{H+J,j}(n) \cdot v_{H+J}(n,m) \tag{60}$$

$$y_j^k(n,m) = y_j^{k+1}(n,m) + w_{k,j}(n) \cdot v_k(n,m) \ [k=g(j)+1, \ldots, H+J-1] \tag{61}$$

Similarly, Equation (30) can be expressed by the recurrence formulas of Equations (62) to (65) by using $S_j^k(n)$:

$$S_j^1(n,l) = \delta_1(n,l) \cdot w_{g(j),1}(n) \tag{62}$$

$$S_j^k(n,l) = S_j^{k-1}(n,l) + \delta_k(n,l) \cdot w_{j,k}(n) \ [k=2, \ldots, j] \tag{63}$$

$$S_j^j(n,l) = \delta_j(n,l) \cdot w_{g(j), J(n)} \tag{64}$$

$$S_j^k(n,l) = S_j^{k+1}(n,l) + \delta_k(n,l) \cdot w_{g(j), k(n)} \quad [k=j+1, \ldots, J-1] \tag{65}$$

Figure 26:
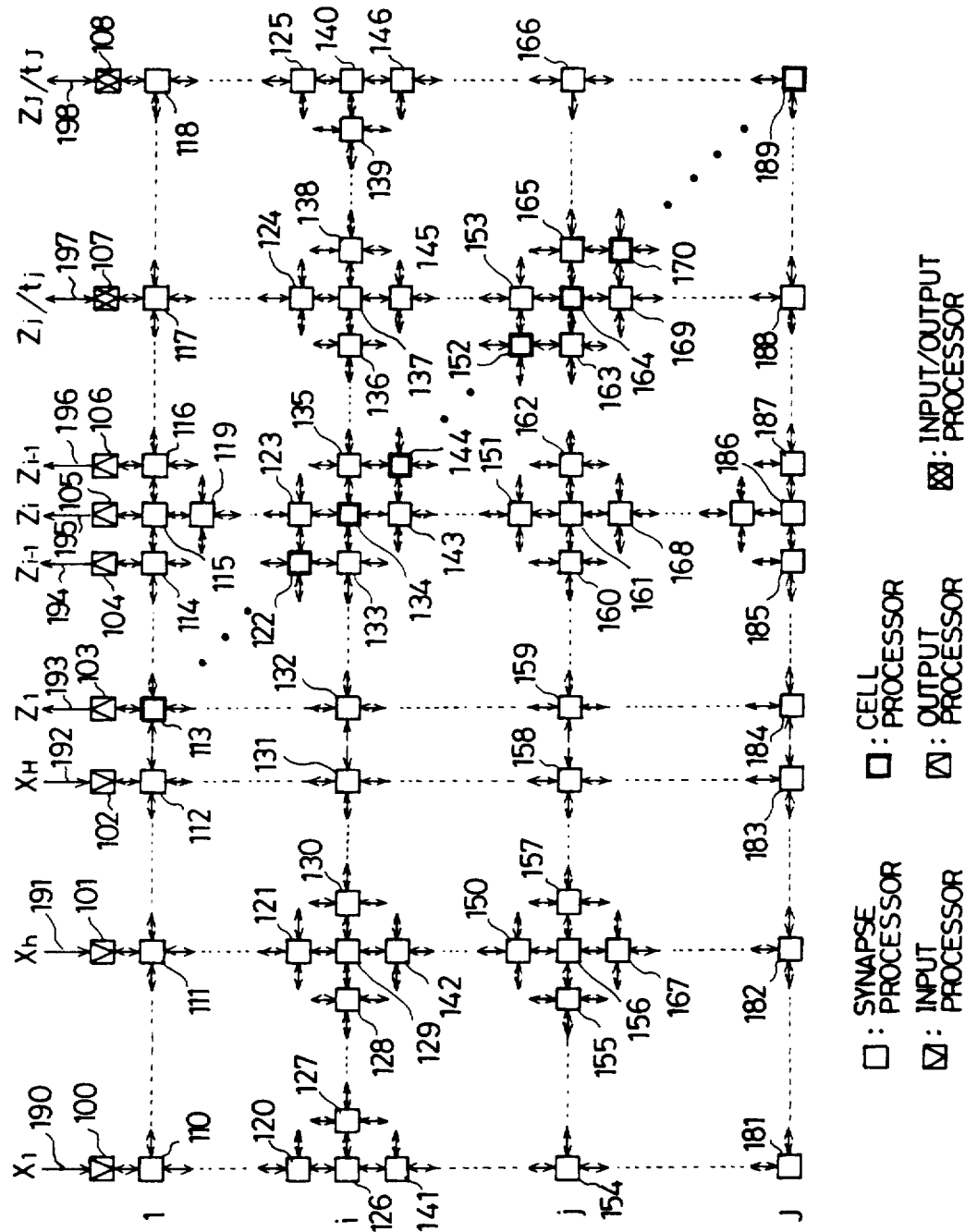
FIG. 26 is a view which illustrates the structure of a second embodiment of the present invention, where a rectangular lattice architecture comprising a synapse processor, a cell processor, an input processor, an output processor, and an input/output processor is shown.

A view which illustrates the architecture of the parallel processing system of the second embodiment constituting of five types of processors: synapse processor, cell processor, input processor, output processor, and input/output processor are shown in FIG. 26 where ⊡ represents the synapse processor, ☐ represents the cell processor,  represents the input processor,  represents the output processor, and  represents the input/output processor respectively.

In the 0-th line there are arranged the number of H input processors 100 to 102, the number of I output processors 103 to 106, and the number of (J-I) input/output processors 107 to 108. From the first row to the J-th row, (H+J−1) synapse processors 110 to 112, 114 to 121, 123 to 133, 135 to 143, 145 to 146, 150 to 151, 153 to 163, 165 to 169 and 180 to 188 and one cell processor 113, 122, 134, 144, 152, 164, 178 and 189 are placed. The cell processors are placed on a diagonal line from the first row, the (H+1)-th column to the J-th row, the (H+J)-th column.

Each of the synapse processors and the cell processors are connected to the upper, the lower, the right and the left synapse processors or cell processors by bi-directional channel in the form of a rectangular lattice. There is no connection at the left side of the left-most processors, the right side of the right-most processors and the lower side of the bottom processors.

The input processors 103 to 106, and the input/output processors 107 to 108 on the top row are respectively connected to an external processor by signal lines 190 to 198. As a result of the established connections, the synapse processors, the cell processors, the output processors, and the input/output processors form the rectangular lattice plane.

A manner with which the learning processing of the multi-layer perceptron shown in FIG. 5 is performed by the processor groups connected in the rectangular lattice shape shown in FIG. 26 will be described.

S1 Initialization of weights

The weight $w_{ij}(n)$ stored by the synapse processors whose coefficients of the connection are $F_{ij}=1$ in the synapse processors 110 to 112, 114 to 121, 123 to 133, 135 to 143, 145 to 146, 150 to 151, 153 to 163, 165 to 169, and 180 to 188 are initialized by random number.

S2 Feeding of the training data

In the feeding of the training data, the input processors receive training data $X_h(n)$ from an external processor, hold as $V_h(n,m)$ and transmit to lower adjacent processors as well as the first embodiment.

S3 Processing of the basic mode

In the processing of the basic mode, all of the output values $z_j(n,0)$ of the cell processors 113, 122, 134, 144, 152, 164, 170 and 189 are set zero by Equations (23) to (25). Each of the synapse processors and the cell processors perform the following calculations, where the calculation processing in the case of the 1-th column, the i-th row synapse processor 126, the i-th row, the h column synapse processor 129, the i-th row, the (H+j)-th column synapse processor 137, the i-th row, the (H+J)-th column synapse processor 140, and the i-th row, the (H+i)-th column cell processor 134 will be described as the representative example:

Synapse processor 126 at the i-th row, the 1-st column (1) It receives the signal $v_1(n,m)$ transmitted from the upper adjacent synapse processor 120 and transmits it to the lower adjacent synapse processor 141.

(2) If the connection flag = "1", the product of the signal $v_1(n,m)$ and the stored weight $w_{ij}(n)$ is transmitted, as an initial value of the partial sum $y_i^1(n,m)$, to the right adjacent synapse processor 127 as shown by Equation (58). If the connection flag = "0", the initial partial sum $y_i^1(n,m) = 0$ is transmitted to the right synapse processor 127.

Synapse processor 129 at the i-th row, the h-th column (1) It receives the signal $v_h(n,m)$ transmitted from the upper adjacent synapse processor 121 and transmits it to the lower adjacent synapse processor 142.

(2) If the connection flag = "1", the product of the signal $v_h(n)$ and the stored weight $w_{hj}(n)$ is added to the partial sum $y_i^{h-1}(n,m)$ which has been transmitted from the left adjacent synapse processor 128 as shown by Equation (59) so that a new partial sum $y_i^h(n,m)$ is then transmitted to the right synapse processor 130. If the connection flag = "0", the partial sum $y_i^{h-1}(n,m)$ which has been transmitted from the left connection synapse processor 128 is transmitted as $y_i^h(n,m)$ to the right connection synapse processor 130.

Synapse processor 137 at the i-th row, the (H+j)-th column (1) It receives the signal $v_k(n,m)$ transmitted from the upper adjacent synapse processor 124 and transmits it to the lower adjacent synapse processor 145.

(2) If the connection flag = "1", the product of the signal $v_k(n,m)$ and the stored weight $w_{kj}(n)$ is added to the partial sum $y_i^{k+1}(n,m)$ which has been transmitted from the right adjacent synapse processor 138 as shown by Equation (61) so that a new partial sum $y_i^k(n,m)$ is then transmitted to the left adjacent synapse processor 136. If the adjacent flag = "0", the partial sum $y_i^{k+1}(n,m)$ which has been transmitted from the right adjacent synapse processor 138 is transmitted as $y_i^k(n,m)$ to the left synapse processor 136.

Synapse processor 140 at the i-th row, the (k=H+J)-th column (1) It receives the signal $v_k(n,m)$ transmitted from the upper adjacent synapse processor 125 and transmits it to the lower adjacent synapse processor 146.

(2) If the connection flag = "1", the product of the signal $v_k(n,m)$ and the stored weight $w_{kj}(n)$ is transmitted, as an initial value of the partial sum $y_i^k(n,m)$, to the left adjacent synapse processor 139 as shown by Equation (60). If the connection flag = "0", the initial partial sum $y_i^k(n,m) = 0$ is transmitted to the left adjacent synapse processor 139.

The cell processor 134 at the i-th row, the (k=H+i)-th column (1) It transmits the output $z_i(n,m)$ from the cell processor as $v_g(i)(n,m) = v_{H+i}(n,m)$ to the upper adjacent synapse processor 123 and the lower adjacent synapse processor 143.

(2) If the connection flag = "1", the product of the signal $v_k(n)$ and the stored weight $w_{ki}(n)$, and furthermore a partial sum $y_i^{k+1}(n,m)$ which has been transmitted from the right adjacent synapse processor 135 are added to the partial sum $y_i^{k-1}(n,m)$ which has been transmitted from the left adjacent synapse processor 133 so that a final product-sum $y_i(n,m) = y_i^k(n,m) + y_i^{k+1}(n,m)$ is obtained. If the connection flag = "0", the partial sum $y_i^{k-1}(n,m)$ which has been transmitted from the left adjacent synapse processor 133 is added to the partial sum $y_i^{k+1}(n,m)$ which has been transmitted from the right adjacent synapse processor 135 so as to make the final product sum $y_i(n,m) = y_i^{k-1}(n,m) + y_i^{k+1}(n,m)$ (3) In accordance with Equation (24), the final product sum $y_i(n,m)$ is inserted into a sigmoid function so that the output $z_i(n,m+1)$ from the neuron cell is obtained.

As described the above, at a synapse processor located in the left of the cell processor, the calculation of the partial sum is executed from left to right, while at a synapse processor located in the right of the cell processor, the calculation of the partial sum is executed from right to left.

Since the output values are successively determined from the first intermediate layer in the above-described calculations, the output $z_i(n,M)$ from the cell processor in the output layer can be obtained by repeating as many times as the number of the intermediate layers and the output layers, that is M times.

In the basic mode, after performing the above calculations, an output $z_i(n,M)$ from each of the cell processors is transmitted to output processors, input/out processors passing through synapse processors in the upper direction, furthermore the output $z_i(n,M)$ can be transmitted to the outside equipment from the output processors, the input/output processors.

S4 Feeding of target data

In the feeding of the target data, the input/output processors, for example, 107 and 108 which correspond to the cell processors which can output the result to the external processor receive target data $t_i(n)$ from the external processor through the signal lines 197 to 198 and store the target data $t_i(n)$, then as transmit it to the lower adjacent synapse processor or the cell processor.

The cell processor 164 (output layer) at the j-th row, the (k = H + j)-th column The cell processor in the output layer receives target data $t_i(n)$ transmitted from the upper adjacent synapse processor 153 and calculates the initial value of the intermediate value $\delta_j(n,0)$ according to Equation (28).

The cell processor 134 (intermediate layer) at the i-th row, the (k = H + i)-th column In the cell processor in the intermediate layer, the initial value of the intermediate value $\delta_1(n,0)$ is set zero according to Equation (29).

S5: The processing of the learning mode 1

In the learning mode 1, for deriving the intermediate error value $\delta_i(n,L)$ of learning, the all of input processors, output processor, and input/output processors are set in the sleep conditions, and each of the synapse processors and each of the cell processors perform the following calculations according to equations (30) to (31). Here the processings of the j-th row, the h-th column synapse processor 156, the 1-st row, the (H + i)-th column synapse processor 115, the j-th row, the (H + i)-th column synapse processor 161 the J-th row, the (H + i)-th column synapse processor 186, the i-th row, the (H + j)-th column synapse processor 137, the i-th row, the (H + i)-th column cell processor 134, and the j-th row, the (H + j)-th column cell processor 164 are shown as the representative examples.

The synapse processor 156 at the j-th row, the h-th column (1) It receives signal $\delta_j(n,l)$ which has been transmitted from the right adjacent processor 157 and transmits it to the left adjacent synapse processor 155.

The synapse processor 115 at the 1-st row, the (k = H + i)-th column (1) It receives signal $\delta_i(n,l)$ which has been transmitted from the left adjacent synapse processor 114 and transmits it to the right adjacent synapse processor 116.

(2) If the connection flag = "1", the product of the signal $\delta_1(n,l)$ and the stored weight $w_{k1}(n)$ according to Equation (62) as an initial value of the partial sum $S_i^1(n,l)$ is transmitted to the lower adjacent synapse processor 119. If the adjacent flag = "0", The partial sum $S_i^1(n,l) = 0$ is transmitted to the lower adjacent synapse processor 119.

The synapse processor 137 at the i-th row, the (k = H + j)-th column (1) It receives signal $\delta_i(n,l)$ which has been transmitted from the left adjacent synapse processor 136 and transmits it to the right adjacent synapse processor 138.

(2) If the connection flag = "1", the product of the signal $\delta_i(n,l)$ and the stored weight $w_{ki}(n)$ is added to the partial sum $S_j i - 1(n,l)$ which has been transmitted from the upper adjacent synapse processor 124 as shown by Equation (63) so that a new partial sum $S_j^i(n,l)$ is then transmitted to the lower adjacent synapse processor 145. If the connection flag = "0", the partial sum $S_j^{i-1}(n,l)$ which has been transmitted from the upper adjacent synapse processor 124 is transmitted as $S_j^i(n,l)$ to the lower adjacent synapse processor 145.

The synapse processor 186 at the J-th row, the (k = H + i)-th column (1) It receives signal $\delta_j(n,l)$ which has been transmitted from the right adjacent synapse processor 187 and transmits it to the left adjacent synapse processor 185.

(2) If the connection flag = "1", the product of the signal $\delta_j(n,l)$ and the stored weight $w_{kj}(n)$ according to Equation (64) as an initial value of partial sum $S_i^J(n,l)$ is then transmitted to the upper adjacent synapse processor 180. If the connection flag = "0", the partial sum $S_i^J(n,l) = 0$ is transmitted to the upper adjacent synapse processor 180.

The synapse processor 161 at the j-th row, the (k = H + i)-th column (1) It receives signal $\delta_j(n,l)$ which has been transmitted from the right adjacent synapse processor 162 and transmits it to the left adjacent synapse processor 160.

(2) If the connection flag = "1", the product of the signal $\delta_j(n,l)$ and the stored weight $w_{kj}(n)$ is added to the partial sum $S_i^{j+1}(n,l)$ which has been transmitted from the lower adjacent synapse processor 168 as shown by Equation (65) so that a new partial sum $S_i^j(n,l)$ is then transmitted to the upper adjacent synapse processor 151. If the connection flag = "0", the partial sum $S_i^{j+1}(n,l)$ which has been transmitted from the lower adjacent synapse processor 168 is transmitted as $S_i^j(n,l)$ to the upper adjacent synapse processor 151.

The cell processor (output layer) 164 at the j-th row, the (k=H+j)-th column (1) The intermediate value $\delta_j(n,l)$ in the learning is transmitted to the left adjacent synapse processor 163 and the right adjacent synapse processor 165.

(2) In the output layer, since the intermediate value $\delta_j(n,l)$ is not changed by l according to Equation (28), it is made $\delta_j(n, l+1) = \delta_j(n,l)$.

The cell processor (intermediate layer) 134 at the i-th row, the (k=H+i)-th column (1) The intermediate error value $\delta_i(n,l)$ in the learning is transmitted to the left adjacent synapse processor 133 and the right adjacent synapse processor 135.

(2) If the connection flag="1", the product of the signal $\delta_i(n,l)$ and the stored weight $w_{ki}(n)$ and furthermore, the partial sum $S_i{}^{j+1}(n,l)$ which has been transmitted from the lower adjacent synapse processor 143 are added to the partial sum $S_i{}^{j-1}(n,l)$ which has been transmitted from the upper adjacent synapse processor 123 so that a final product-sum $S_i(n,l) = S_i{}^{j+1}(n,l)$ is obtained. If the connection flag="0", the final product sum $S_i(n,l) = S_i{}^{j-1}(n,l) + S_i{}^{j+1}(n,l)$ is obtained by adding the partial sum $S_i{}^{j-1}(n,l)$ transmitted from the upper adjacent synapse processor to the partial sum $S_i{}^{j+1}(n,l)$ transmitted from the lower adjacent synapse processor.

(3) A new intermediate error value $\delta_i(n, l+1)$ is calculated from the final product-sum $S_i(n,l)$ and the output value $z_i(n)$ according to Equation (31).

As described the above, at a synapse processor located in the upper direction of the cell processor, the calculation of the partial sum is transmitted from the upper direction to the lower direction, and at a synapse processor located in the lower direction of the cell processor, the calculation of the partial sum is transmitted from the lower direction to the upper direction. Furthermore, at a column without a cell processor, the data is transmitted only in the transverse direction (from the right to the left or vice versa), with no calculation processing in the longitudinal (i.e. parallel to columns) direction.

S6: The processing in the learning mode 2

In the learning mode 2, each of the synapse processors, the cell processors and input processors perform the following calculation processings accoring to equations (26) to (27). In this mode the weight will be updated so that all output processors and input/output processors are set in the sleep conditions. The processings of the 0-th row, the h-th column input processor 101, the j-th row, the h-th column synapse processor 156, the i-th row, the (H+j)-th column synapse processor 137, and the i-th row, the (H+i)-th column cell processor 134 are shown as the representative examples.

The input processor 101 at the 0-th row, the h-th column (1) It transmits training data signal $x_h(n)$ as $v_h(n,M)$ to the lower adjacent synapse processor 111.

The synapse processor 156 at the j-th row, the h-th column (1) It receives the intermediate error value $\delta_j(n,L)$ of the learning which has been transmitted from the right adjacent synapse processor 157 and transmits it to the left adjacent synapse processor 155. In the case of h=1, this transmition is not done.

(2) It receives the intermediate error value $V_h(n)$ of the learning which has been transmitted from the upper adjacent synapse processor 150 and transmits it to the lower adjacent synapse processor 167. In the case of j=J, this transmition is not done.

(3) If the connection flag="1", the quantity of change $\Delta w_{hj}(n)$ of the weight $w_{hj}(n)$ is calculated from the intermediate error value $\delta_j(n,L)$ of the learning transmitted from the right adjacent synapse processor 157 and the signal $v_h(n,m)$ transmitted from the upper adjacent synapse processor 150 according to Equation (26). Then, the weight $w_{hj}(n)$ is updated according to Equation (27). If the connection flag "0", no processing is executed.

The synapse processor 137 at the i-th row, the (k=H+j)-th column (1) It receives the intermediate error value $\delta_i(n,L)$ of the learning transmitted from the left adjacent synapse processor 136 and transmits it to the right adjacent synapse processor 138.

(2) It receives the signal $v_{g(j)}(n,M) = V_k(n,M)$ transmitted from the lower adjacent synapse processor 145, and transmits it to the upper adjacent synapse processor 124.

(3) If the connection flag="1", the quantity of change $\Delta w_{ki}(n)$ of the weight $w_{ki}(n)$ is calculated from the intermediate error value $\delta_i(n,L)$ of the learning transmitted from the right adjacent synapse processor the signal $v_k(n,M)$ transmitted from the lower synapse processor 145 in accordance with Equation (26). Then, the weight $w_{ki}(n)$ is updated to $w_{ki}(n+1)$ according to Equation (27). If the connection flag="0", no processing is executed.

The cell processor 164 at the j-th row, the (k=H+j)-th column (1) It transmits the intermediate error value $\delta_j(n,L)$ of the learning of the cell processor to the left adjacent synapse processor 163 and the right adjacent synapse processor 165.

(2) The output $z_j(n,M)$ of the cell processor is transmitted to the upper synapse processor 153 and the lower synapse processor 169 as $V_g(j)$ $(n,M) = V_k(n,M)$.

(3) If the connection flag="1", the quantity of change $\Delta w_{kj}(n)$ of the weight $w_{kj}(n)$ is calculated from the intermediate error value $\delta_j(n,L)$ of the learning contained by the cell processor and the output signal $V_k(n,M)$ according to Equation (26). Then, the weight $w_{kj}(n)$ is updated according to Equation (27). If the connection flag="0", no processing is executed.

S7: Testing of the learning convergence

In the testing of the learning convergence, it is tested whether or not the average value or the maximum value of error $\xi_j = (t_j(n) - z_j(n))^2$ between the output signal from the cell processor in the output layer and the target data is larger than a predetermined value. Thus, the fact whether or not the learning has been completed is determined. If the error is smaller than the predetermined value, the learning is completed. On the other hand, if the error is larger than the predetermined value, the process returns to S2 in which the learning is continued by repeatedly supplying the training data and target data.

As described above, the architecture of the neurocomputer capable of parallel processing the simulation of the above-described multi-layer perceptron as an example of the neural networks is given.

However, in the neuro computer including the processor groups connected to each other to form the rectangular lattice which is adapted to be formed on a flat substrate, an extremely large number of the processor (J+1)×(H+J) pieces is necessary to be provided if the scale of the neural networks becomes enlarged. Therefore, it cannot be preferably used in terms of the practical use. Accordingly, the present invention further discloses means capable of simulating large-scale neural networks with the feasible number of the processors, the means being arranged on the basis of the above-described rectangular lattice connection.

Figure 27:
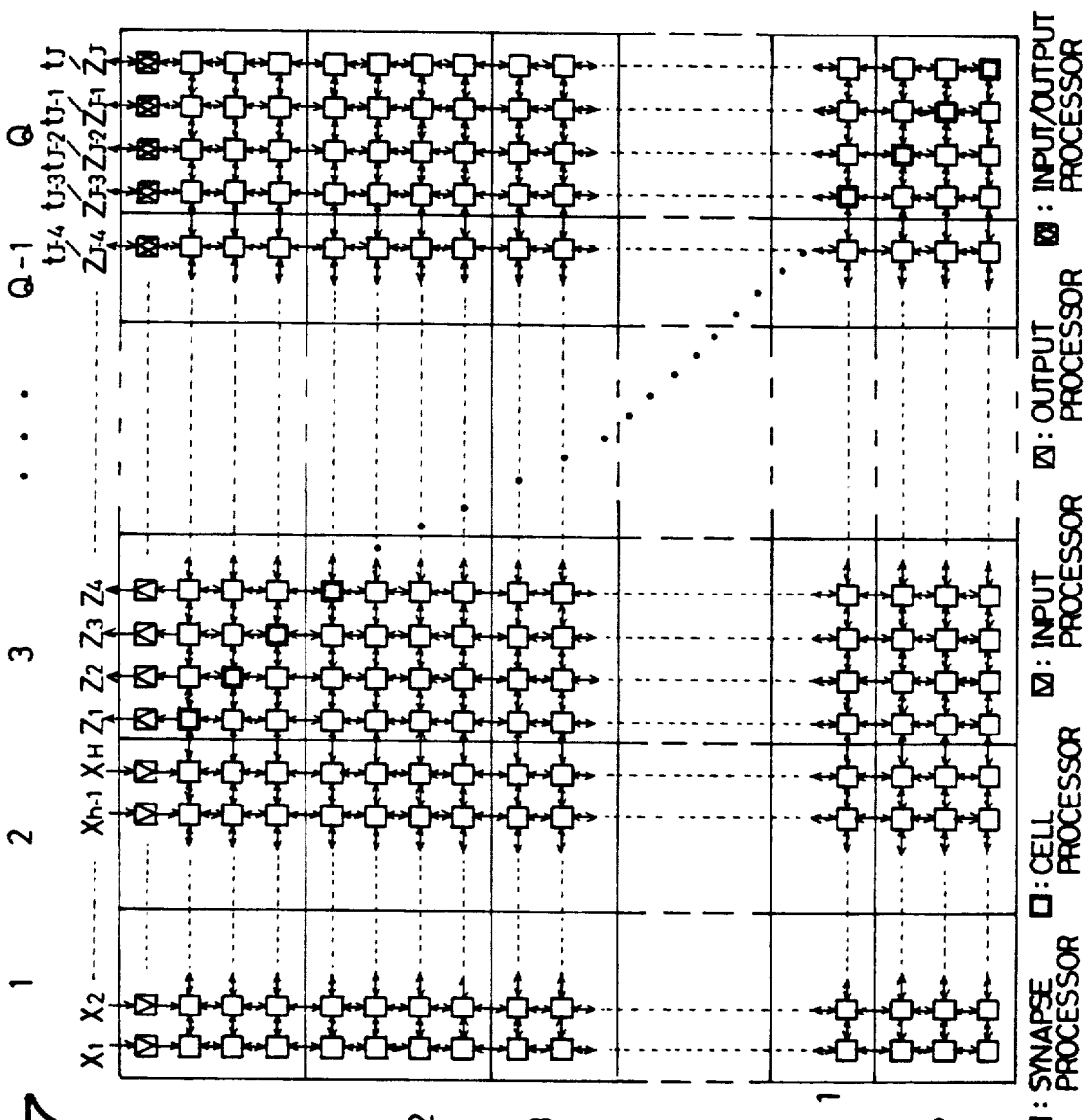
FIG. 27 is a view which illustrates the manner of dividing the virtual processor groups into rectangular regions according to the present invention.

Provided that all of the above-described synapse processors, cell processors, input processors, output processors, and input/output processors are the virtual processors, the virtual processor groups arranged to form a lattice of J+1 rows, H+J columns are divided into P(P<J+1) pieces in the direction of the row, and into Q(Q<H+J) pieces in the direction of the column as shown in FIG. 27.

Figure 28A:
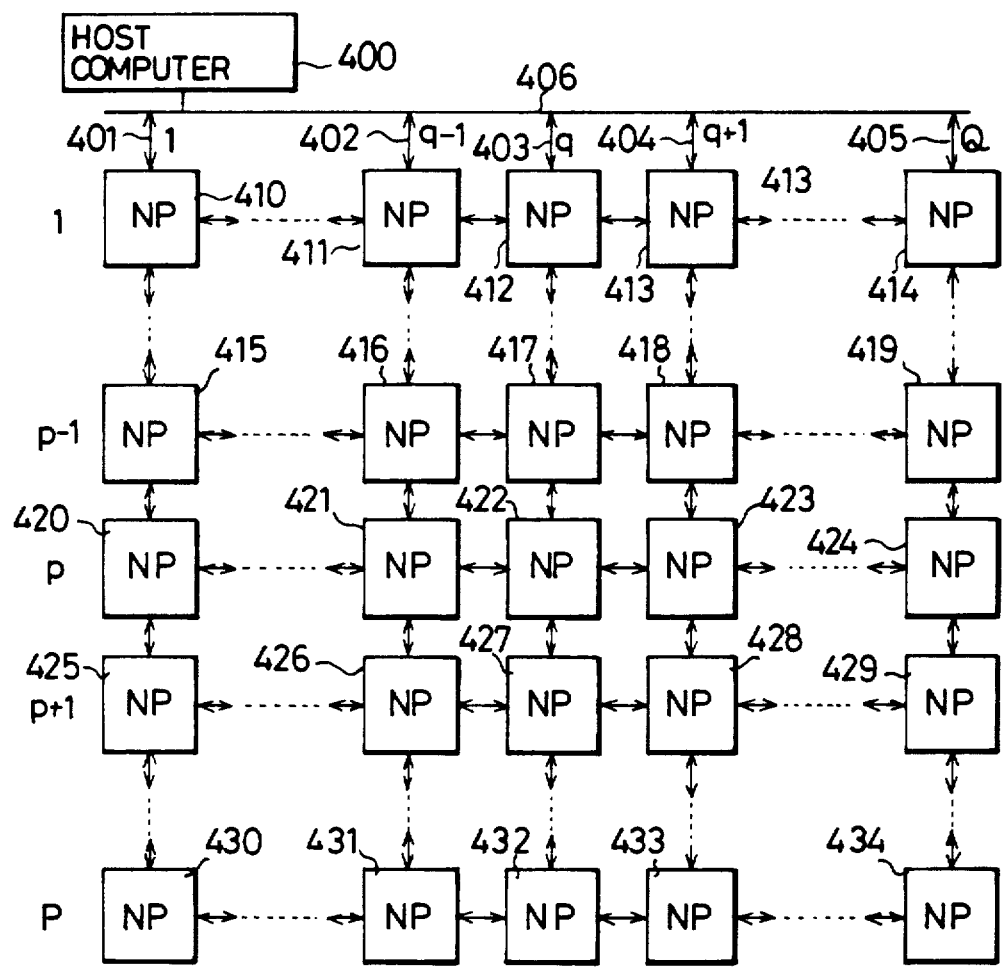
FIGS. 28A, 28B, and 28C are views each of which illustrates the architecture of the neuro-computer system consisting of node processors connected in the form of a rectangular lattice shape and the virtual processors assigned to each of the node processor.

As shown in FIG. 28A, physical processors 410 to 434 is respectively assigned to a rectangular region which has been formed by the division. As a result, the arrangement of the physical processors of P-rows and Q-columns is formed.

Each of the physical processors is connected in a lattice manner to the upper, lower, left, and right adjacent physical processors by four bi-directional channels.

However, the right-most physical processors 414, 419, 424, 429, and 434 have not connected to the right part. The left-most physical processors 410, 415, 420, 425, and 430 have not connected to the left part. The lower-most physical processors 430 to 434 have not connected to the lower part. In order to cause at least one of the physical processors 410 to 414 on each of the columns to have an input/output function, it is connected to a bus line 406 of a host computer 400 via the signal lines 401 to 405.

Figure 28B:
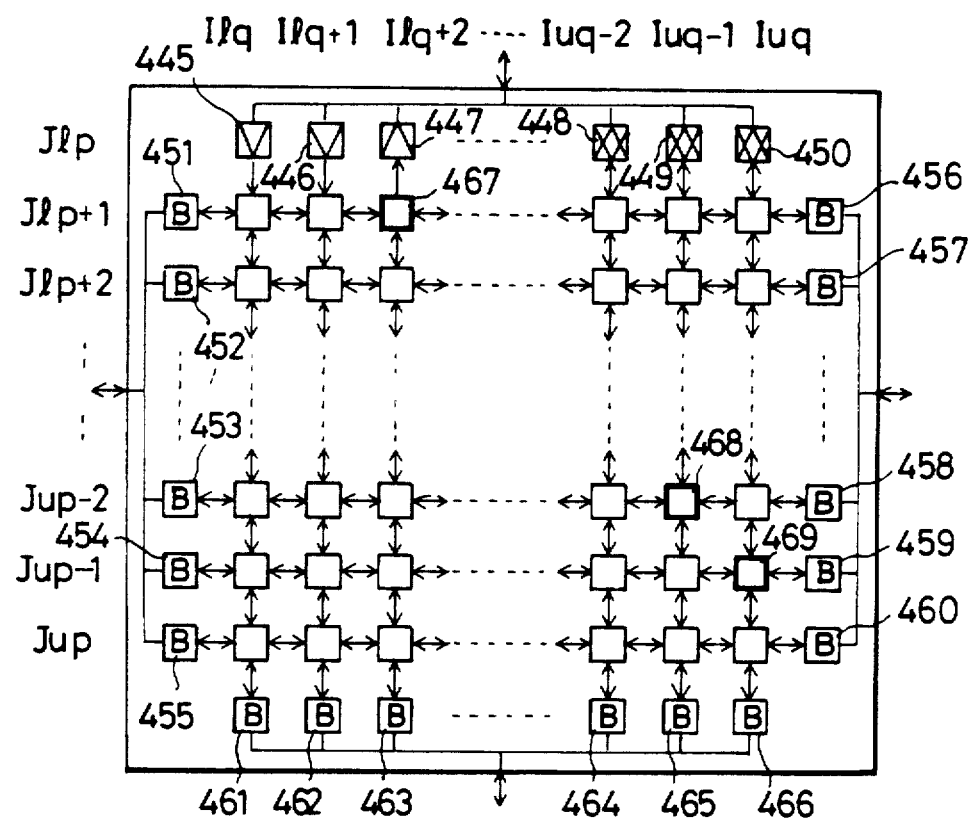
Figure 28C:
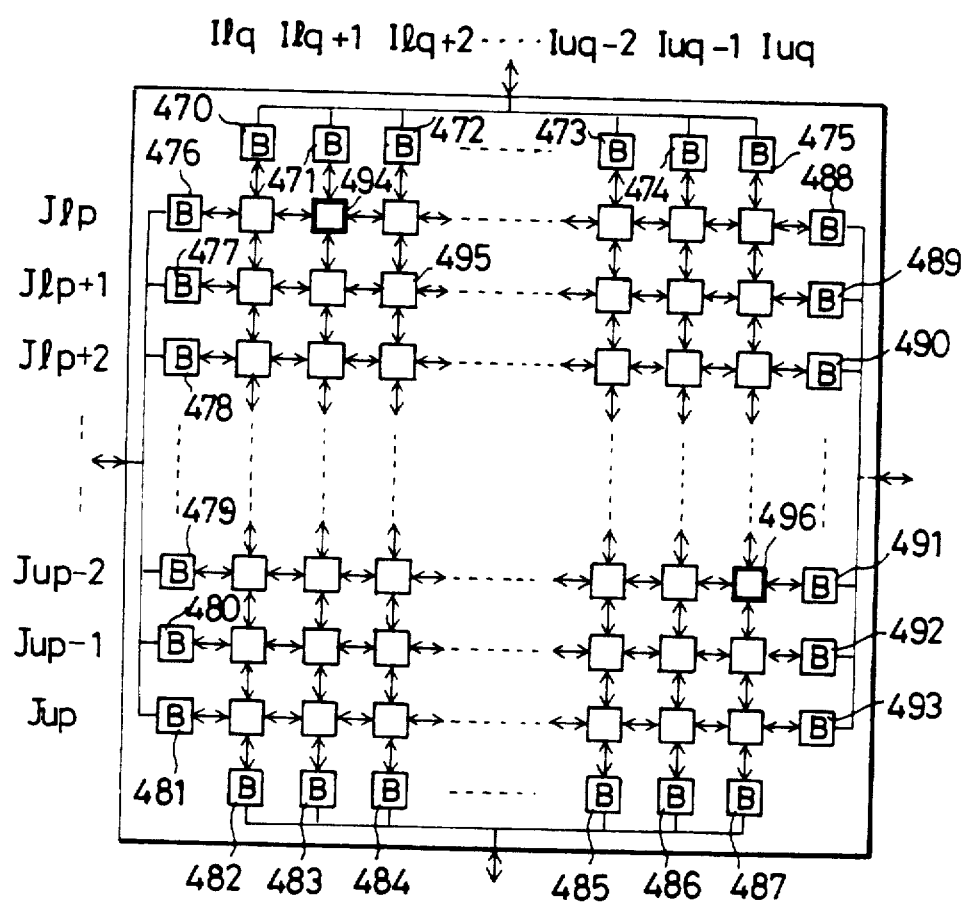

As shown in FIG. 28B, the physical processor thus having the input/output function performs the calculation operation and the storage operation of the input processors, the output processors, the input/output processors, the synapse processors, and the cell processors included in the assigned rectangular region. As shown in FIG. 28C, the other physical processors performs the calculation operation and the storage operation of the synapse processors and the cell processors included in the assigned rectangular regions.

Thus, a neuro-computer capable of parallel calculating large-scale neural networks with the feasible number of the processors can be realized by using the node processor groups connected to form a rectangular lattice shape with P and Q determined properly. Each of the node processors performs the sequential processing, in which P×Q node processers perform the parallel processing. In particular, as for the product-sum operation which takes an excessively long time, the calculations of the partial sums which have been individually performed by the synapse processors can be processed by each of the node processors individually as the calculations of the partial sums in the rectangular region which corresponds to each of the node processors.

The product-sum operations as expressed by the equations (59) to (62), in the case of a node processor including a cell processor placed at the j-th row is located in the U(j)-th row, the R(j)-th column, can be recomposed into Equations (67) and (71):

$$B_j^q(n, m) = \sum_{i=Ilq}^{Iuq} W_{ij}(n) \cdot y_i(n, m) \cdot F_{ij} \quad (67)$$

$$y_j(n, m) = B_j^1(n, m) \quad (68)$$

$$y_j^q(n, m) = y_j^{q-1}(n, m) + B_j^q(n, m) \quad (69)$$
$$[q = 2, \ldots, R(j)]$$

$$y_j^Q(n, m) = B_j^Q(n, m) \quad (70)$$

$$y_j^q(n, m) = y_j^{q+1}(n, m) + B_j^q(n, m) \quad (71)$$
$$[q = R(j) + 1, \ldots, Q - 1]$$

where Iuq represents the column number at the right end of the rectangular region, while Ilq represents the column number at the left end of the same.

In accordance with the above equations (67)–(71), a node processor placed in the left side of the node processor including a cell processor is adapted to execute the calculation of the partial sum from the left to the right direction, and a node processor placed in the right direction, and a node processor placed in the right side of the node processor including a cell processor is adapted to execute the calculation of the partial sum from the right to the left directions.

The product-sum operations as expressed by the equations (63) to (66), in the case of a node processor including a cell processor placed at the j-th row is located in the U(j)-th row, the R(j)-th column, can be recomposed into Equations (72) and (76):

$$D_j^p(n, l) = \sum_{k=J_{lp}}^{J_{up}} \delta_k(n, l) \cdot w_{jk}(n) \cdot F_{jk} \quad (72)$$

$$S_j^1(n, l) = D_j^1(n, l) \quad (73)$$
$$S_j^p(n, l) = S_j^{p-1}(n, l) + D_j^p(n, l) \quad (74)$$
$$[p = 2, \ldots, U(j)]$$
$$S_j^P(n, l) = D_j^P(n, l) \quad (75)$$
$$S_j^p(n, l) = S_j^{p+1}(n, l) + D_j^p(n, l) \quad (76)$$
$$[p = U(j) + 1, \ldots, P - 1]$$

where $J_{up}$ represents the lowermost line number in the rectangular region, while $J_{lp}$ represents the uppermost line number.

In accordance with the above equations (72)–(76), a node processor placed in the upper side of the node processor including a cell processor is adapted to execute the calculation of the partial sum from the upper to the lower direction, and a node processor placed in the lower side of the node processor including a cell processor is adapted to execute the calculation of the partial sum from the lower to the upper directions.

However, the columns having no cell processor, the signals are transmitted only from the right to the left directions or vice versa, and no calculations as expressed by equations (72)–(76) are performed.

Therefore, Equations (67) and (72) are parallel calculated by each of the node processors, while Equations (69), (71) and (73), (76) are successively calculated during the passage of the partial sum $y_j^q(n,m)$ and $S_j^p(n,l)$ through the node processor series.

Referring to FIGS. 28B and 28C, mark represents a buffer memory.

Under the conditions thus prepared as described above, the parallel operation of the rectangular lattice neuro-computer will be described with reference to FIGS. 28A, 28B, and 28C in accordance with a flow chart shown in FIG. 5 for the simulation of the multilayer perceptron.

S1: Initialization of the weight

Each of the node processors successively initializes the coefficient of the weight stored by the corresponding synapse processor by using a random number. Each of the node processors initializes the coefficients of the weight in parallel.

S2: Feeding of training data

Each of the node processors 410 to 414 having the Input/Output function successively receives training data from the host computer, the training data corresponding to the input processors. The received training data is held in buffers 445 and 446.

S3: Processing of the basic mode

In the processing of the basic mode, each of the node processors including the cell processors successively set output value $z_i(n,0) = v_{g(i)}(n,0)$ of the cell processor zero as an initial value in accordance with Equation (22).

Then, the following processing is repeated where m=0. Although the processing of the synapse processors and the cell processors on the node processor 412 at the 1-st row, the q-th column, the mode processor 420 at the p-th row the 1-st column, the mode processor 424 at the p-th row, the Q-th column, and the node processor 422 at the p-th row, the q-th column, will be descrived as examples, the processing are parallel and simultaneously performed by each of the node processors.

Node processor 412 (FIG. 28A) at the 1st-row, the q-th column (1) If there is column $k = g(i)$ in which a cell processor is present in a rectangular region to which the node processor 412 at the 1-st row, the q-th column is assigned, the value $v_k(n,m) = Z_i(n,m)$, $v_k(n,m)$ is successively transmitted together with column number k to the lower adjacent node processor. If there is column h in which the input processor is present, this node processor receives an training data transmitted from the host computer, set $v_h(n,m) = x_h(n)$, store $v_h(n,m)$ in the input processor, and simultaneously successively transmit $v_h(n,m)$ together with column number h to the lower node processor. As for the columns in which no cell processor and no input processor is present, signals $v_i(n)$ [i∈{Ilp, Ilp+1, ..., Iup−1, Iup}] which have been transmitted from the lower adjacent node processor are successively received and retained in the buffer.

(2) The partial sum $B_j{}^q(n,m)$ in the rectangular region to which the node processor 412 at the 1-st row, the q-th column is assigned is calculated according to Equation (67) for each row. The result of the calculation is stored in the buffers 456 to 460.

(3) When the partial sum $y_j{}^{q-1}(n,m)$ has been transmitted together with the row number j from the left adjacent node processor, it is tested whether or not the calculation of the partial sum $B_j{}^q(n,m)$ in the rectangular region has been completed. If it has been completed, a new partial sum $y_j{}^q(n,m)$ is calculated according to Equation (69). If the calculation of the partial sum in the rectangular region has not been completed, the partial sum $y_j{}^{q-1}(n,m)$ is temporarily stored together with the row number j in the buffers 456 to 460 in which the completion of the calculation of the partial sum $B_j{}^q(n,m)$ is waited for. When the partial sum $B_j{}^q(n,m)$ in the rectangular region has been completed, a new partial sum $y_j{}^q(n,m)$ is immediately calculated in accordance with Equation (69). At this time, whether or not the cell processor is contained in the j-th row is tested. If it is not contained, the new partial sum $y_j{}^q(n,m)$ is transmitted together with the row number j to the right adjacent node processor. If it is contained then $y_j{}^{q+1}(n,m)$ transmitted from the right node processor is added to a new partial sum $y_j{}^q(n,m)$, and the result $y_j(n,m) = y_j{}^q(n,m-) + y_j{}^{q+1}(n,m)$ is set as the result of the product-sum.

In the case of the partial sum $y_j{}^{q+1}(n,m)$ is transmitted together with the row number j, the new partial sum $y_j{}^q(n,m)$ is calculated in accordance with the equation (71) in the similar manner for the left node processor.

Here the presence of a cell processor in the j-th row in the rectangular region is tested, and if there is no cell processor, the new partial sum $y_j{}^q(n,m)$ is transmitted to the right node processor together with the row number j. If there is a cell processor, the $y_j{}^{q-1}(n,m)$ transmitted from the left node processor is added to a new partial sum $y_j{}^q(n,m)$ to form $y_j(n,m) = y_j{}^q(n,m) + y_j{}^{q-1}(n,m)$ as the result of the product-sum.

(4) As for the rows containing the cell processor, when the calculation of the result $y_j(n,m)$ of the product-sum operation has been completed, the result $y_j(n,m)$ is converted to the output $z_j(n,m+1)$ of the neural cell by a sigmoid function in accordance with Equation (24), the result being then stored in the memory area which correspond to the cell processors 467 to 469.

The node processor 420 (FIG. 28A) at the p-th row, the 1-st column (1) If there is column $k = g(i)$ in which a cell processor is present in a rectangular region to which the node processor 420 at the p-th row, the 1-st column is assigned, the value $v_k(n,m) = z_i(n,m)$, $v_k(n,m)$ is successively transmitted together with column number k to the upper adjacent node processor 415 the lower adjacent node processor 425. As for the columns in which no cell processor is present, signals $v_i(n)$ [i∈{Ilp, Ilp+1, ..., Iup−1, Iup}] which have been transmitted from the upper adjacent node processor 415 are successively received and retained in the buffers 470, 473, and 474 for each of the columns. Simultaneously, the signals are successively transmitted together with column number i to the lower node processor 425. In the case where p=P, no transmission is done to the lower direction. Signals $V_i(n)$ [i∈{Ilp, Ilp+1, ..., Iup−1, Iup}] transmitted from the lower adjacent node processor 425 are successively received and stored in the buffers 470, 473, and 474. Simultaneously, the signals $v_i(n)$ are successively transmitted together with column number i to the upper adjacent node processor 415. However in the case of p=1, no transmission is down to the upper direction.

(2) The partial sum $B_j{}^1(n,m)$ in the rectangular region to which the node processor 420 at the p-th row, the 1-st column is assigned is calculated according to Equation (67) for each column. The result of the calculation is stored in the buffers 488 to 493.

(3) At this time, whether or not the cell processor is contained in the j-th row is tested. If it is not contained, an initial value of the partial sum is set as $y_j{}^1(n,m) = B_j{}^1(n,m)$, and is transmitted together with the row number j to the right node processor.

(4) If a cell processor is contained in the j-th row, when the partial sum $y_j{}^2(n,m)$ has been transmitted together with the row number j from the right node processor, it is tested whether or not the calculation of the partial sum $B_j{}^1(n,m)$ in the rectangular region has been completed. If it has been completed, a new partial sum $y_j{}^1(n,m)$ is calculated in accordance with Equation (71). If the calculation of the partial sum in the rectangular region has not been completed, the partial sum $y_j^2(n,m)$ is temporarily stored together with the row number j in the buffers 488 to 493 in order to wait the completion of the calculation of the partial sum $B_j^1(n,m)$. When the partial sum $B_j^1(n,m)$ in the rectangular region has been completed, a new partial sum $y_j^1(n,m)$ is immediately calculated in accordance with Equation (71) and the new partial sum $y_j^1(n,m)$ is stored in the memory area for the cell processor as the result $y_i(n,m)$ of the product-sum operation.

The node processor 424 (FIG. 2) at the p-th row, the Q-th column (1) If there is column $k=g(i)$ in which a cell processor is present in a rectangular region to which the node processor 424 at the p-th row, the Q-th column is assigned, the value $v_k(n,m)=Z_i(n,m)$, $v_k(n,m)$ is successively transmitted together with column number k to the upper adjacent node processor 419 and the lower adjacent node processor 429. As for the columns in which no cell processor is present, signals $V_i(n)$ [i∈{Ilp, Ilp+1, ..., Iup−1, Iup}] which have been transmitted from the upper adjacent node processor 419 are successively received and stored in the buffers 470, 473, and 474 for each of the columns. Simultaneously, the signals $V_i(n,m)$ are successively transmitted together with column number i to the lower adjacent node processor 429. In the case where $p=P$, no transmission is done to the lower direction. Signals $V_i(n)$ [i∈{Ilp, Ilp+1, ..., Iup−1, Iup}] transmitted from the lower adjacent node processor 429 are successively received and stored in the buffers 470, 473 and 474. Simultaneously, the signals $V_i(n)$ are successively transmitted together with column number i to the upper adjacent node processor 419. However in the case of $p=1$, no transmission is done to the upper direction.

(2) The partial sum $B_j^Q(n,m)$ in the rectangular region to which the node processor 424 at the p-th row, the Q-th column is assigned is calculated in accordance with Equation (67). The result of the calculation is stored in the buffers 488 to 493.

(3) At this time, whether or not the cell processor is contained in the j-th row is tested. If it is not contained, an initial value of the partial sum is set as $y_j^Q(n,m)=B_j^Q(n,m)$ is transmitted together with the row number j to the left node processor.

(4) When the partial sum $y_j^{Q-1}(n,m)$ has been transmitted together with the row number j from the left node processor, it is tested whether or not the calculation of the partial sum $B_j^1(n,m)$ in the rectangular region has been completed. If it has been completed, a new partial sum $y_j^Q(n,m)$ is calculated in accordance with Equation (71). If the calculation of the partial sum in the rectangular region has not been completed, the partial sum $y_j^{Q-1}(n,m)$ is temporarily stored together with the line number j in the buffers 488 to 492 in order to wait the completion of the calculation of the partial sum $B_j^Q(n,m)$. When the partial sum $B_j^Q(n,m)$ in the rectangular region has been completed, a new partial sum $y_j^Q(n,m)$ is immediately calculated in accordance with Equation (69).

(5) As for the rows containing the cell processor, when the calculation of the result $y_i(n,m)$ of the product sum operation has been completed, the result $y_i(n,m)$ is converted to the output $z_i(n, m+1)$ of the neural cell by the sigmoid function in accordance with Equation (24), the result being then stored in the memory areas which are assigned to the cell processors 493 to 496.

The node processor 422 at the p-th row, the q-th column (1) If there is column $k=g(i)$ in which a cell processor is present in a rectangular region to which the node processor 422 at the p-th row, the q-th column is assigned, the values $v_k(n,m)=Z_i(n,m)$, $v_k(n,m)$ are successively transmitted together with column number k to the upper adjacent node processor 417 the lower adjacent node processor 427. As for the columns in which no cell processor and no input processor is present, signals $v_i(n)$ [i∈{Ilp, Ilp+1, ..., Iup−1, Iup}] which have been transmitted from the upper adjacent node processor 417 are successively received and stored in the buffers 470, 473 and 474 for each of the columns. Simultaneously, the signals are successively transmitted together with column number i to the lower adjacent node processor 427. In the case where $p=P$, no transmission is done to the lower direction. Signals $v_i(n)$ [i∈{Ilp, Ilp+1, ..., Iup−1, Iup}] transmitted from the lower adjacent node processor 427 are successively received and stored in the buffer 470, 473 and 474. Simultaneously, the signals $v_i(n)$ are successively transmitted together with column number i to the upper adjacent node processor 417. However in the case of $p=1$, no transmission is done to the upper direction.

(2) The partial sum $B_j^q(n,m)$ in the rectangular region to which the node processor 422 at the p-th row, the q-th column is assigned is calculated in accordance with Equation (67). The result of the calculation is stored in the buffers 488 to 493.

(3) When the partial sum $y_j^{q-1}(n,m)$ has been transmitted together with the row number j from the left adjacent node processor 421, it is tested whether or not the calculation of the partial sum $B_j^q(n,m)$ in the rectangular region has been complted. If it has been completed, a new partial sum $y_j^q(n,m)$ is calculated in accordance with Equation (68). If the calculation of the partial sum in the rectangular region has not been completed, the partial sum $y_j^{q-1}(n,m)$ is temporarily stored together with the row number j in the buffers 488 to 493 in order to wait the completion of the calculation of the partial sum $B_j^q(n,m)$. When the calculation of the partial sum $B_j^q(n,m)$ in the rectangular region has been completed, a new partial sum $y_j^q(n,m)$ is immediately calculated in accordance with Equation (69). At this time, whether or not the cell processor is contained in the j-th row is tested. If it is not contained, the new partial sum $y_j^q(n,m)$ is transmitted together with the row number j to the right adjacent node processor 423.

If there is a cell processor, then $y_j^{q+1}(n,m)$ transmitted from the right node processor 423 together with the row number j is added to a new partial sum $y_j^q(n,m)$ to form $y_i(n,m)=y_j^q(n,m)+ y_j^{q+1}(n,m)$ as a result of the product-sum.

Furthermore, when $y_j^{q+1}(n,m)$ is transmitted from the right adjacent node processor 423 together with the row number j, then it is tested whether or not the calculation of the partial sum $B_j^q(n,m)$ in the rectangular region has been completed. If it has been completed, a new partial sum $y_j^q(n,m)$ is calculated in accordance with Equation (71). If the calculation of the partial sum in the rectangular region has not been completed, the partial sum $y_j^{q+1}(n,m)$ is temporarily stored together with the row number j in the buffers 476 to 481 in order to wait the completion of the calculation of the partial sum $B_j^q(n,m)$. When the partial sum $B_j^q(n,m)$ in the rectangular region has been completed, a new partial sum $y_j^q(n,m)$ is immediately calculated in accordance with Equation (71). At this time, whether or not the cell processor is contained in the j-th row is tested. If it is not contained, the new partial sum $y_j^q(n,m)$ is transmitted together with the row number j to the left adjacent node processor 421. If it is contained, then $y_j^{q-1}(n,m)$ transmitted from the left adjacent node processor 421 together with the row number j is added to a new partial sum $y_j^q(n,m)$ to form $y_j(n,m) = y_j^{q-1}(n,m) + y_j^q(n,m)$ as a result of the product sum. If it is contained, the new partial sum $y_j^q(n,m)$ is stored in memory area for the cell processor as the result $y_j(n,m)$ of the product-sum operation.

(4) As for the rows containing the cell processor, when the calculation of the result $y_j(n,m)$ of the product-sum operation has been completed, the result $y_j(n.m)$ is converted to the output $z_j(n,m+1)$ of the neural cell by the sigmoid function in accordance with Equation (24), the result being then stored in the memory area which is assigned to the cell processors 494 to 496.

The above calculations can be performed in such a manner that a node processor placed in the left side of the node processor including a cell processor is adapted to execute the calculation of the partial sum from the left to the right direction, and a node processor placed in the right side of the node processor including a cell processor is adapted to execute the calculation of the partial sum from the right to the left directions for each row.

Since the output values are successively determined from the first intermediate layer in the above-described calculations, the output $z_j(n,M)$ from the cell processor in the output layer can be obtained by repeating the calculations as many times as the number of the intermediate layers, and the output layers, that is, by M times.

S4 Feeding of target data

In the feeding of target data, the node processors 410 to 414 having the Input/Output processors disposed in each of columns on which the cell processors in the output layer are positioned receives target data $t_j(n)$ together with the column number j from the host computer via the signal bus 406, then transmitted to the lower adjacent node processor. The each of the node processors receives the target data from the upper adjacent node processor and then transmits the target data to the lower adjacent node processor.

S5 The processing of the learning mode 1

In the learning mode 1, each of the node processors repeats the following processing with the initial value $l=0$. Although the processing of the synapse processors and the cell processors on the node processor 412 at the 1-st row the q-th column, the node processor 432 at the P-th row the q-th column, and the node processor 422 at the p-th row, the q-th column, will be descrived as examples, the processing are parallel and simultaneously performed by each of the node processors.

The node processor 412 (FIG. 28a) at the 1-st row the q-th column (1) If there is a row j containing the cell processor in the rectangular region to which the node processor 412 at the 1-st row, the q-th column is assigned, the intermediate error value $\delta_j(n,l)$ of the learning is transmitted together with row number j to the left adjacent node processor 411 and the right adjacent node processor 413. As for the row in which no cell processor is included, the intermediate values $\delta_k(n,l)$ [k∈{Jlq+1, ..., Juq−1, Juq}] of the learning transmitted from the left node processor 411 are successively received so as to be stored in the buffers 452, 455 for each row. Simultaneously, the intermediate error value $\delta_k(n,l)$ of the learning is transmitted together with row number k to the right adjacent node processor 413. In the case where q=Q, no transmission is done to the right direction. The intermediate error values $\delta_k(n,l)$ [k∈{Jlq, Jlq+1, ..., Juq−1, Juq}] of the learning transmitted from the right adjacent node processor are successively received so as to stored in the buffers 457, 460 for each row. Simultaneously, the intermediate error value $\delta_k(n,l)$ of the learning is transmitted together with row number k to the left adjacent node processor 411. In the case where q=Q, no transmission is done to the right direction.

(2) The partial sum $D_j^1(n,l)$ in the rectangular region to which the node processor 412 at the 1-st row, q-th column is assigned is calculated for each of the rows in accordance with Equation (72). When the calculation has been completed, the result is stored in the buffers 461 to 466.

(3) If no cell processor is included in the rectangular region to which the node processor 412 at the 1-st row, the q-th column is assigned, the initial value $S_j^1(n,l) = D_j^1(n,l)$ of the partial sum is transmitted together with the column number j to the lower adjacent node processor.

(4) When a cell processor is included in the j-th row of the rectangular region and in the case of the partial sum $S_j^2(n,l)$ has been transmitted together with the column number j from the lower adjacent node processor, a fact whether or not the calculation of the partial sum $D_j^1(n,l)$ in the rectangular region has been completed is tested. If it has been completed, a new partial sum $S_j^1(n,l)$ is calculated in accordance with Equation (76). If the calculation of the partial sum in the rectangular region has not been completed, the partial sum $S_j^2(n,l)$ is temporarilyy stored together with the row number j in the buffers 461 to 466 in order to wait the completion of the calculation of the partial sum $D_j^1(n,l)$ in the rectangular region. When the calculation of the partial sum $D_j^1(n,l)$ in the rectangular region has been completed, the new partial sum $S_j^1(n,l)$ is immediately calculated in accordance with Equation (76). The new partial sum $S_j^1(n,l)$ is stored in the memory area for the cell processor as the result of the product-sum operation $S_j(n,l)$.

(5) As for the column including the cell processor, when the calculation of the final product-sum $S_j(n,l)$ has been completed, $\delta_j(n, l+1)$ is calculated from the result $S_j(n,l)$ so as to store it in the memory area which is assigned to the cell processor.

The node processor 432 at the B-th row, the q-th column (1) If there is a row j containing the cell processor in the rectangular region to which the node processor 432 at the P-th row, the q-th column is assigned, the intermediate error value $\delta_j(n,l)$ of the learning is transmitted together with row number j to the left adjacent node processor 431 and the right adjacent node processor 433. As for the row in which no cell processor is included, the intermediate error values $\delta_k(n,l)$ [k∈{Jlq, Jlq+1, ..., Juq−1, Juq}] of the learning transmitted from the left adjacent node processor 431 are successively received so as to be stored in the buffers 478, 480, and 481 for each row. Simultaneously, the intermediate error value $\delta_k(n,l)$ of the learning is transmitted together with row number k to the right node processor

433. In the case where q=Q, no transmission is done to the right direction. The intermediate value $\delta_k(n,l)$ [k∈{Jlq, Jlq+1, . . . , Juq−1, Juq}] of the learning transmitted from the right adjacent node processor are successively received so as to be stored in the buffers 490, 492, 493 for each row. Simultaneously, the intermediate error value $\delta_k(n,l)$ of the learning is transmitted together with row number k to the left adjacent node processor 431. In the case where q=Q, no transmission is done to the right direction.

(2) The partial sum $D_j^P(n,l)$ in the rectangular region for to which the node processor 432 at the P-th row, q-th column is assigned is calculated for each of the rows in accordance with Equation (72). When the calculation has been completed, the result is stored in the buffers 470 to 475.

(3) If no cell processor is included in the rectangular region to which the node processor 432 at the P-th row, the q-th column is assigned, the initial value $S_j^P(n,l) = D_j^P(n,l)$ of the partial sum is transmitted together with column number j to the lower adjacent node processor.

(4) When a cell processor is included in the j-th row of the rectangular region, and in the case of the partial sum $S_j^{P-1}(n,l)$ has been transmitted together with the column number j from the lower adjacent node processor, a fact whether or not the calculation of the partial sum $D_j^P(n,l)$ in the rectangular region has been completed is tested. If it has been completed, a new partial sum $S_j^P(n,l)$ is calculated in accordance with Equation (74). If the calculation of the partial sum in the rectangular region has not been completed, the partial sum $S_j^{P-1}(n,l)$ is temperarily stored together with the row number j in the buffers 461 to 466 in order to wait the completion of the calculation of the partial sum $D_j^P(n,l)$ in the rectangular region. When the calculation of the partial sum $D_j^P(n,l)$ in the rectangular region has been completed, the new partial sum $S_j^P(n,l)$ is immediately calculated in accordance with Equation (76). The new partial sum $S_j^P(n,l)$ is stored in the memory area for the all processor as the result of the product-sum operation $S_j(n,l)$.

(5) As for the column including the cell processor, when the calculation of the final product-sum $S_j(n,l)$ has been completed, $\delta_j(n, l+1)$ is calculated from the result $S_j(n,l)$ so as to store it in the memory area which is assigned to the cell processors 493 to 495.

The node processor 422 at the p-th row, the q-th column (1) If there is a row j containing the cell processor in the rectangular region to which the node processor 422 at the p-th row, the q-th column is assigned, the intermediate error value $\delta_j(n,l)$ of the learning is transmitted together with row number j to the left adjacent node processor 421 and the right adjacent node processor 423. As for the row in which no cell processor is included, the intermediate error values $\delta_k(n,l)$ [k∈{Jlq, Jlq+1, . . . , Juq−1, Juq}] of the learning transmitted from the left adjacent node processor 421 are successively received so as to be stored in the buffers 478, 480, and 481 for each row. Simultaneously, the intermediate value $\delta_k(n,l)$ of the learning is transmitted together with row number k to the right adjacent node processor 423. In the case where q=Q, no transmission is done to the right direction. The intermediate error values $\delta_k(n,l)$ [k∈{Jlq, Jlq+1, . . . , Juq−1, Juq}] of the learning transmitted from the right adjacent node processor 423 are successively received so as to be stored in the buffers 490, 492, 493 for each row. Simultaneously, the intermediate value $\delta_k(n,l)$ of the learning is transmitted together with row number k to the left adjacent node processor 421. In the case where q=Q, no transmission is done to the right direction.

(2) The partial sum $D_j^p(n,l)$ in the rectangular region to which the node processor 422 at the p-th row, q-th column is assigned is calculated for each of the rows in accordance with Equation (72). When the calculation has been completed, the result is stored in the buffers 482 to 487.

(3) When the partial sum $S_j^{p-1}(n,l)$ has been transmitted together with the column number k from the upper adjacent node processor 417, a fact whether or not the calculation of the partial sum $D_j^p(n,l)$ in the rectangular region has been completed is tested. If it has been completed, a new partial sum $S_j^p(n,l)$ is calculated in accordance with Equation (74). If the calculation of the partial sum in the rectangular region has not been completed, the partial sum $S_j^{p-1}(n,l)$ is temporarily stored together with the row number j in the buffers 482 to 487 in order to wait the completion of the calculation of the partial sum $D_j^p(n,l)$ in the rectangular region. When the calculation of the partial sum $D_j^p(n,l)$ in the rectangular region has been completed, the new partial sum $S_j^p(n,l)$ is immediately calculated in accordance with Equation (74). At this time, a fact whether or not the cell processor is included in the j-th column in the rectangular region is tested. If it is included there, the new partial sum $S_j^p(n,l)$ is transmitted together with the row number j to the lower adjacent node processor 427. If it is included, then the partial sum $S_j^{p+1}(n,m)$ transmitted from the lower adjacent node processor 427 is added to a new partial sum $S_j^p(n,m)$, and the result $S_j(n,m) = S_j^p(n,m) + S_j^{p+1}(n,m)$ is stored in the memory area for the cellprocessor as the result of the product-sum.

When the partial sum $S_j^{p+1}(n,l)$ has been transmitted together with the column number j from the lower adjacent node processor 427, a fact whether or not the calculation of the partial sum $D_j^p(n,l)$ in the rectangular region has been completed is tested. If it has been completed, a new partial sum $S_j^p(n,l)$ is calculated in accordance with Equation (76). If the calculation of the partial sum in the rectangular region has not been completed, the partial sum $S_j^{p+1}(n,l)$ is temporarily stored together with the row number j in the buffers 470 to 475 in order to wait the completion of the calculation of the partial sum $D_j^p(n,l)$ in the rectangular region. When the calculation of the partial sum $D_j^p(n,l)$ in the rectangular region has been completed, the new partial sum $S_j^p(n,l)$ is immediately calculated in accordance with Equation (76). At this time, a fact whether or not the cell processor is included in the j-th column in the rectangular region is tested. If it is included there, the new partial sum $S_j^p(n,l)$ is transmitted together with the row number j to the lower adjacent node processor 427. If it is included, the partial sum $S_j^{p-1}(n,l)$ transmitted together with the row number j from the upper adjacent node processor 417 is added to the new partial sum $S_j^p(n,l)$ to form $S_j(n,l) = S_j^p(n,l) + S_j^{p-1}(n,l)$ as the result of the product-sum.

(4) As for the column including the cell processor, when the calculation of the final product-sum $S_j(n,l)$ has been completed, $\delta_j(n, l+1)$ is calculated from the result $S_j(n,l)$ in accordance with equation (31) so as to store it in the storage region which is assigned to the cell processor.

The above calculation can be performed in a manner that for a node processor placed in the upper side of the node processor including a cell processor, the calculation is performed from the upper to the lower direction, and for a node processor placed in the lower side of the node processor including a cell processor, the calculation is performed from the lower to the upper direction.

In the learning mode 1, since the calculations are successively performed from the output layer to the input layer for each layer as well as the basic mode, the intermediate error value $\delta_j(n,l)$ of the learning can be obtained by repeating the calculations as many times as the number of the intermediate layers, that is, by $L = M - 1$ times.

S6: The processing of the learning mode 2

In the learning mode 2, each of the node processors performs the following processings. Although the processing of the synapse processors and the cell processors on the node processor 417 at the 1-st row, the q-th column and the node processor 422 at the p-th row, the q-th column will be described as examples, the processing are parallel and simultaneously executed by each of the node processors.

The node processor 412 at the 1-st row, the q-th column (1) If the cell processor is included at the j-th row, the g(j) column in the rectangular region to which the node processor 412 at the 1-st row, the q-th column is assigned, the intermediate error value $\delta_j(n,L)$ of the learning is transmitted together with the row number g(j) to the left adjacent node processor 411 and the right adjacent node processor 413. Simultaneously, the output $z_j(n)$ of the cell processor is, as $v_{g(j)}(n) = z_j(n)$, transmitted together with the column number g(j) to the lower adjacent node processor. If there is a column h including the input processor in the virtual processors to which the node processor 412 at the 1-st row, the q-th column is assigned, the input signal $x_h(n)$ is, as $v_h(n) = x_h(n)$, transmitted together with the column number h to the lower adjacent node processor. As for the rows in which no cell processor and no input processor are present, the intermediate error values $\delta_k(n,L)$ [k∈{Jlp, Jlp+1, ..., JuP−1, Jup}] of the learning transmitted from the left adjacent node processor 411 are successively received so as to be stored in the buffers 452, 455 for each row. Simultaneously, the intermediate error value $\delta_k(n,L)$ of the learning is transmitted together with the row number k to the right adjacent node processor 413. The intermediate error values $\delta_k(n,L)$ [k∈{Jlp, Jlp+1, ..., Jup−1, Jup}] of the learning transmitted from the right adjacent node processor 413 are successively received so as to be stored in the buffers 457, 460 for each row. Simultaneously, the intermediate error value $\delta_k(n,L)$ of the learning is transmitted together with the row number k to the left adjacent node processor 411.

On the other hand, as for the columns not including a cell processor and an input processor, the node processor receives $v_i(n)$ transmitted together with the column number i from the lower adjacent node processor, and then store them to the buffer 464 assigned to the columns.

(2) As for each of the synapse processors in the rectangular regions to which the node processor 412 at the 1-st row, the q-th column is assigned, if the connection flag = "1", the change quantity $\Delta w_{ij}(n)$ of the weight coefficient $w_{ij}(n)$ is calculated from the intermediate error value $\delta_j(n,L)$ of the learning transmitted from either the left adjacent node processor 411 or the right adjacent node processor 413 and the signal $v_i(n)$ transmitted from the lower adjacent node processor in accordance with Equation (26). Then, the weight coefficient $w_{ij}(n)$ is updated in accordance with Equation (27). If the connection flag = "0", no processing is performed.

The node processor 422 at the p-th row, the q-th column (1) If the cell processor is included at the j-th row, the g(j) column in the rectangular region to which the node processor 422 at the p-th row, the q-th column is assigned, the intermediate error value $\delta_j(n,L)$ of the learning is transmitted together with the row number j to the left adjacent node processor 421 and the right adjacent node processor 423. Simultaneously, the output $z_j(n)$ from the cell processor is, as $v_j(n) = z_j(n)$, transmitted together with the column number q(j) to the upper adjacent node processor 417 and the lower adjacent node processor 427. As for the rows in which no cell processor and no input processor are present, the intermediate error values $\delta_k(n,L)$ [k∈{Jlp, Jlp+1, ..., Jup−1, Jup}] of the learning transmitted from the left node processor 421 are successively received so as to be stored in the buffers 478, 480, and 481 for each row. Simultaneously, the intermediate error value $\delta_k(n,L)$ of the learning is transmitted together with the row number k to the right adjacent node processor 423. The intermediate error values $\delta_k(n,L)$ [k∈{Jlp, Jlp+1, ..., Jup−1, Jup}] of the learning transmitted from the right node processor 423 are successively received so as to be stored in the buffers 490, 492, 493 for each row. Simultaneously, the intermediate error value $\delta_k(n,L)$ of the learning is transmitted together with the row number k to the left adjacent node processor 421.

On the other hand, for the columns not including a cell processor, the node processor receives $v_i(n)$ transmitted together with the column number i from the upper adjacent node processor, and then store then to the buffers 470, 473, and 474 assigned to each of the columns. Simultaneously, $v_i(n)$ together with the row number i are transmitted to the lower adjacent node processor 427.

If the $v_i(n)$ together with the row number i are transmitted from the lower adjacent node processor, then they will be received and are stored to the buffers 482, 485, 486. Simultaneously, $v_i(n)$ together with the row number i are transmitted to the upper adjacent node processor 417.

(2) As for each of the synapse processors in the rectangular regions to which the node processor 422 at the p-th row, the q-th column is assigned, if the connection flag = "1", the change quantity $\Delta w_{ij}(n)$ of the weight coefficient $w_{ij}(n)$ is calculated from the intermediate error value $\delta_j(n,L)$ of the learning transmitted from either the left adjacent node processor 421 or the right adjacent node processor 423 and the signal $v_i(n)$ transmitted either from the upper adjacent node processor 417 or the lower adjacent node processor 427 in accordance with Equation (26). Then, the weight coefficient $w_{ij}(n)$ is updated in accordance with Equation (27). If the connection flag = "0", no processing is performed.

S7 The testing of the learning convergence

In the testing of the learning convergence; the node processor including the cell processor in the output layer tests whether or not the average value or the maximum value of the error $\xi_j=(t_j(n)-z_j(n))^2$ between the output signal and the target data is smaller than a predetermined value. Thus, the completion of the learning is determined. If the error is smaller than the predetermined value, the learning is completed. If the error is larger than the predetermined value, the training data and target data is repeatedly supplied and the learning is repeated from the processing in S2.

As described above, parallel processing for the simulation of the neural networks can be performed by the node processors connected to form a rectangular lattice shape.

Figure 29A:
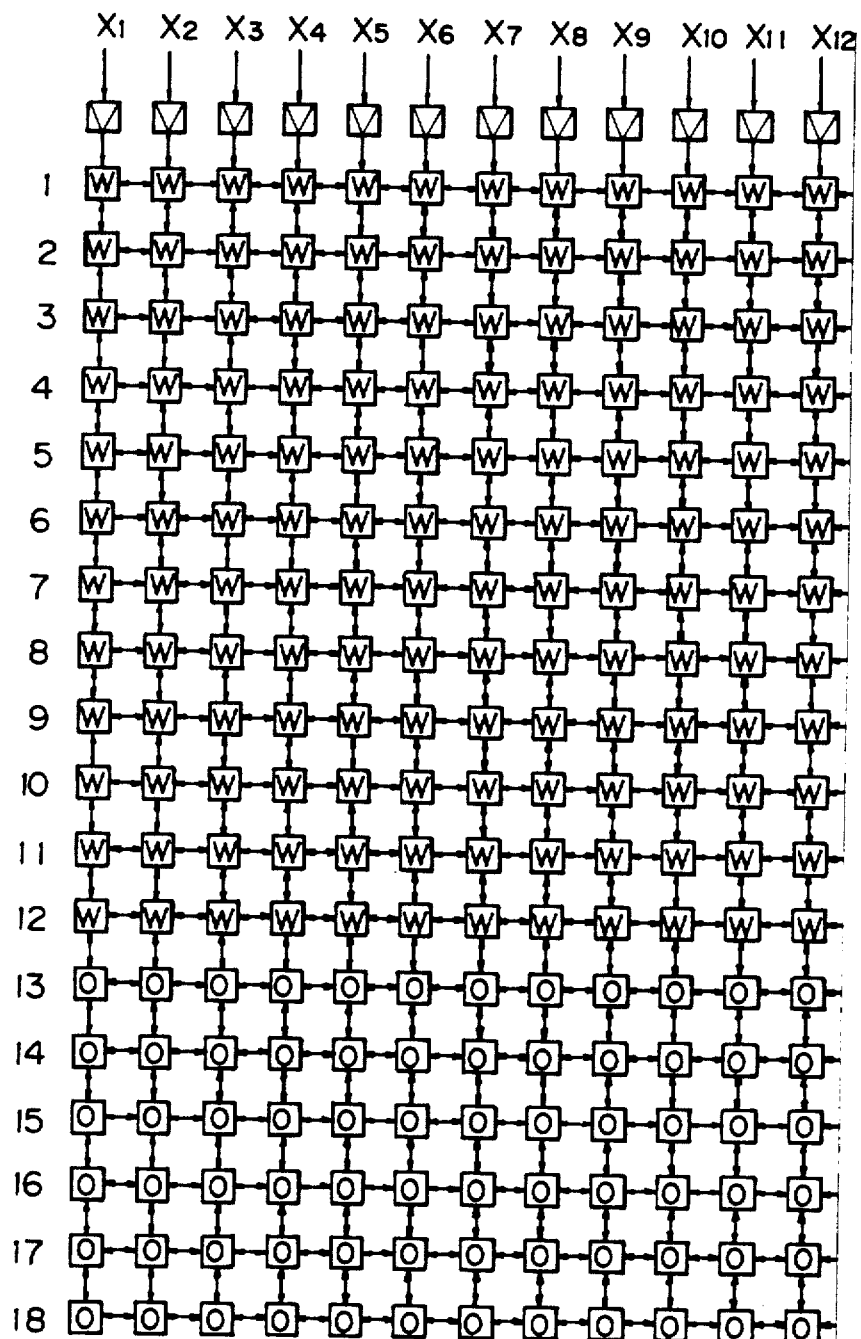
FIGS. 29A, 29B, and 29C illustrate the arrangement of a rectangular lattice comprising a synapse processor, a cell processor, an input processor, an output processor, and an input/output processor for simulating the three-layered perceptron shown in FIG. 5.
Figure 29B:
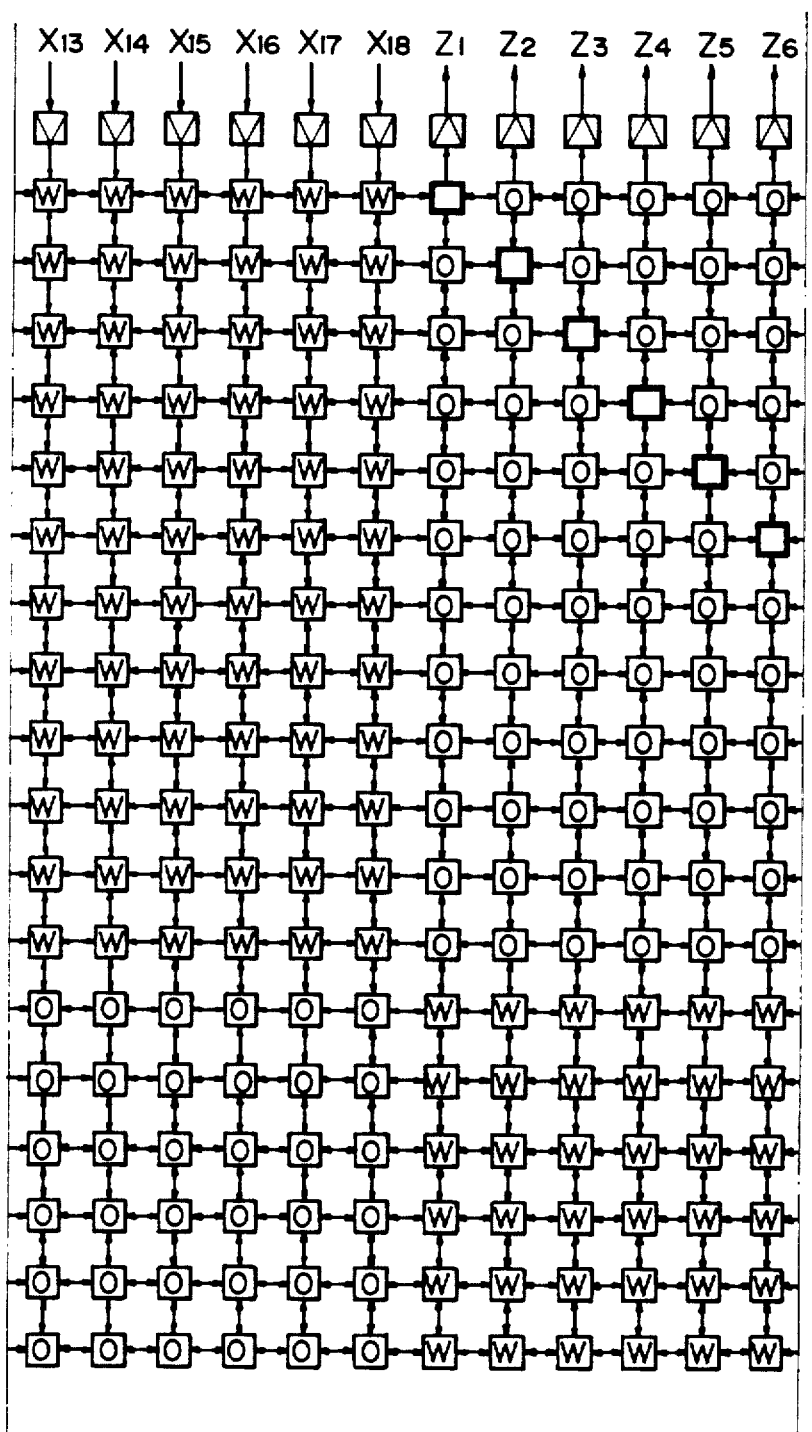
Figure 29C:
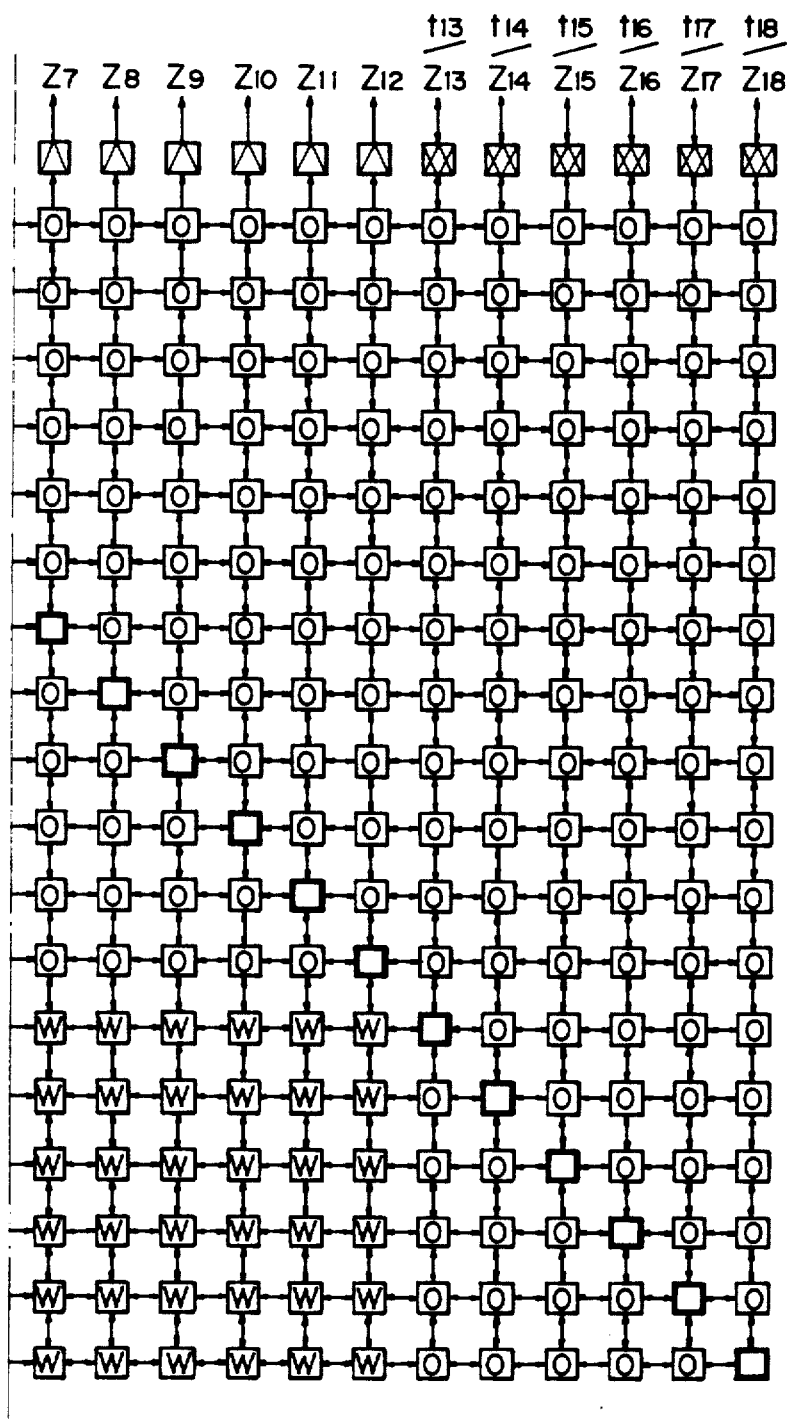

The arrangement of the virtual processor for simulating the three layer perceptron shown in FIG. 8 is as shown in FIG. 29. Referring to FIG. 29, mark ● represents the synapse processor where the connection flag Fij=1, mark ○ represents the synapse processor, where the connection flag Fij=0. It is not necessary for the synapse processor whose connection flag Fij=0 to execute product-sum operation for the partial-sum, while only the synapse processor whose connection flag Fij=1 is necessary to execute product-sum operation for the partial-sum. Although the number of the cell processor is small, the processings of the cell processor are complicated. Therefore, the load of the cell processor becomes 10 times or more than the load of the synapse processor even though it depends on the neuron model.

Figure 30A:
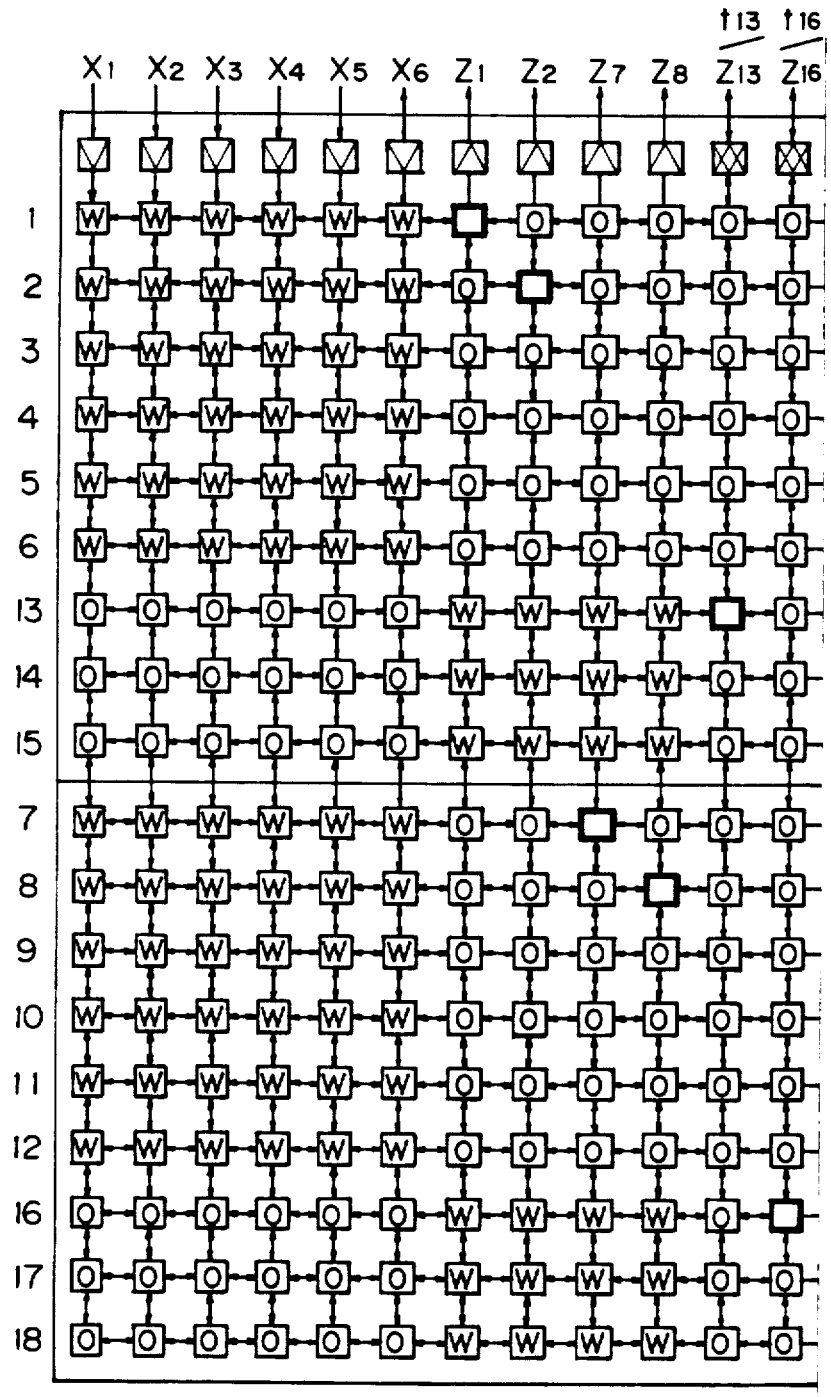
FIGS. 30A, 30B, and 30C illustrate the rearrangement of a rectangular lattice comprising a synapse processor, a cell processor, an input processor, an output processor, and an input/output processor after balancing the load of node processors.
Figure 30B:
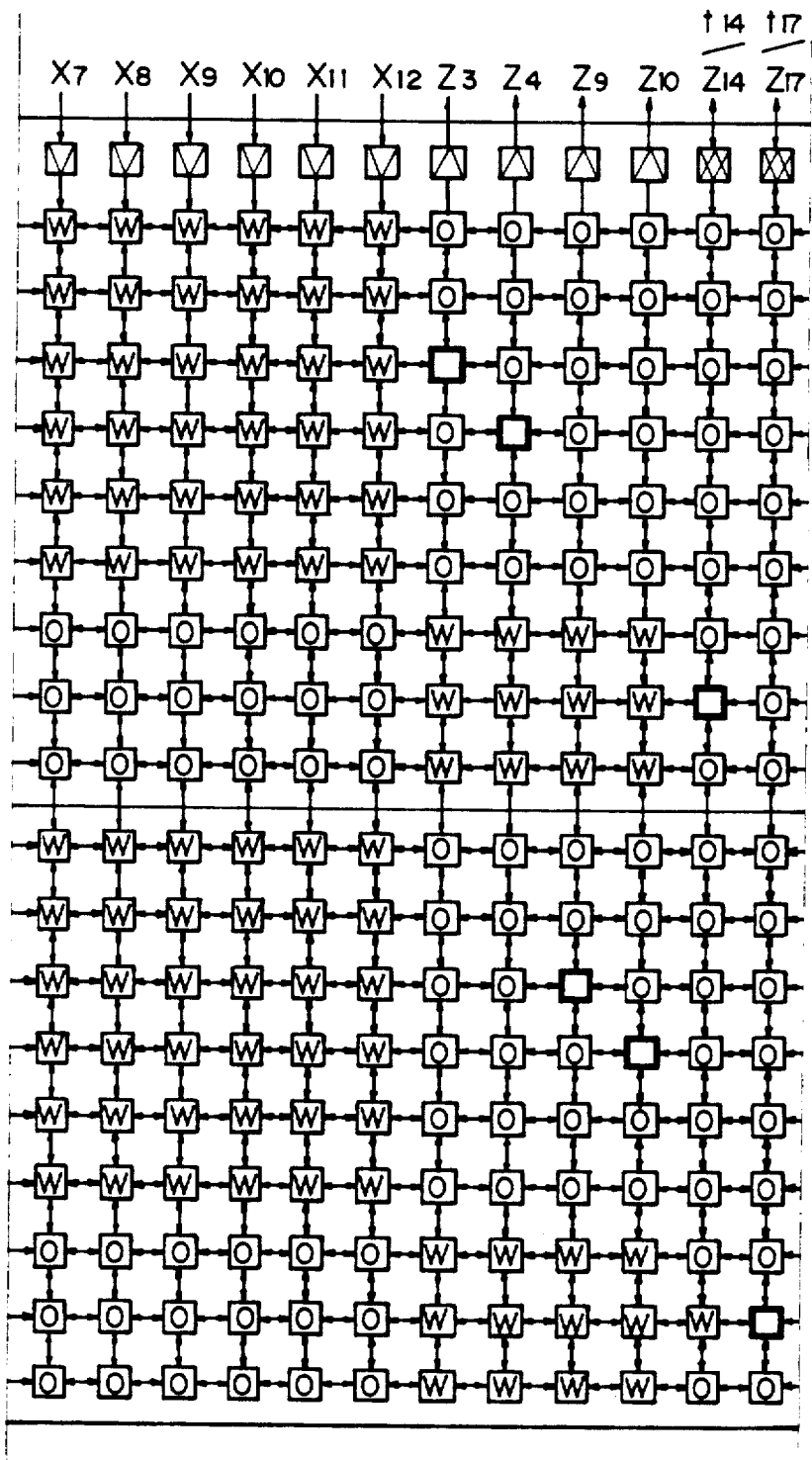
Figure 30C:
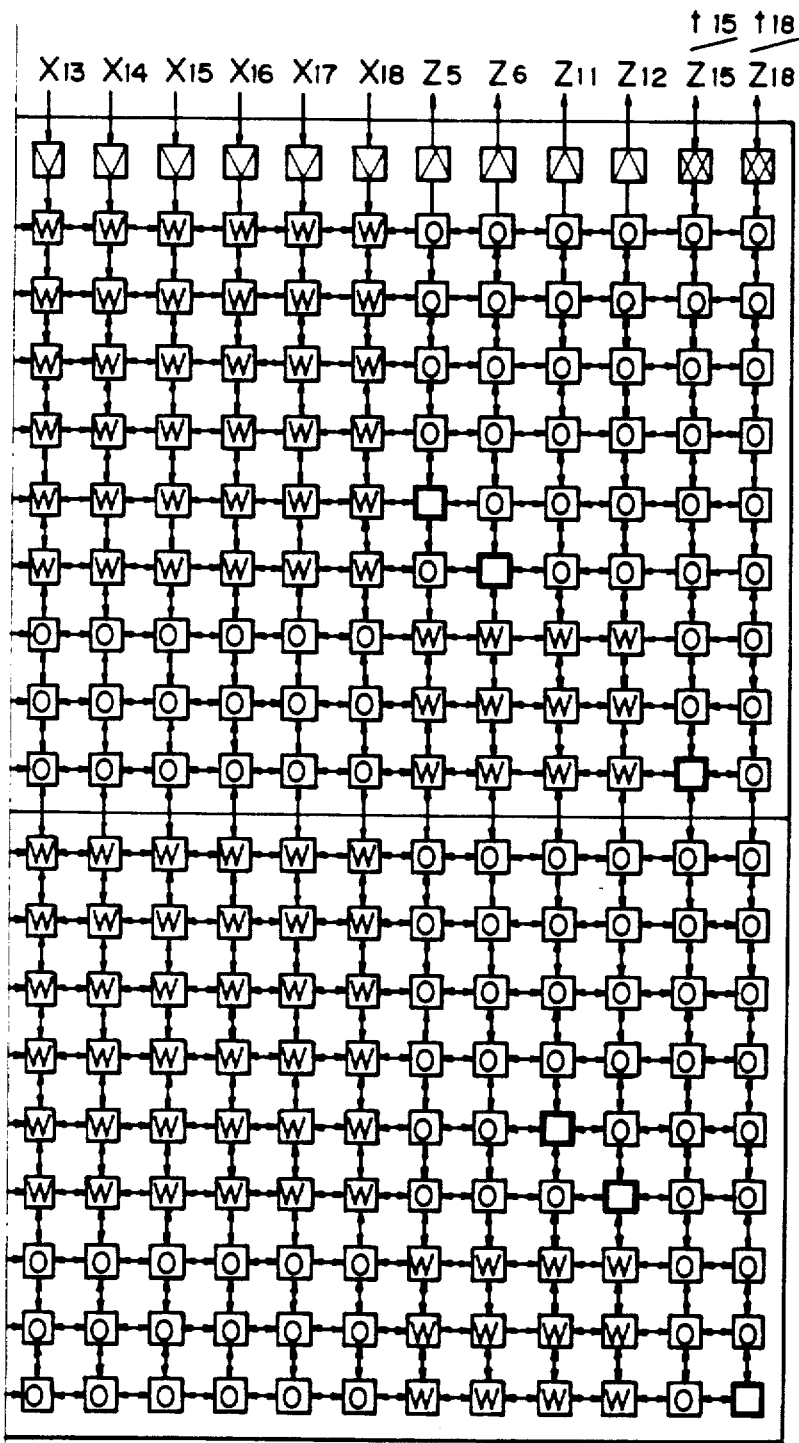
Figure 31:
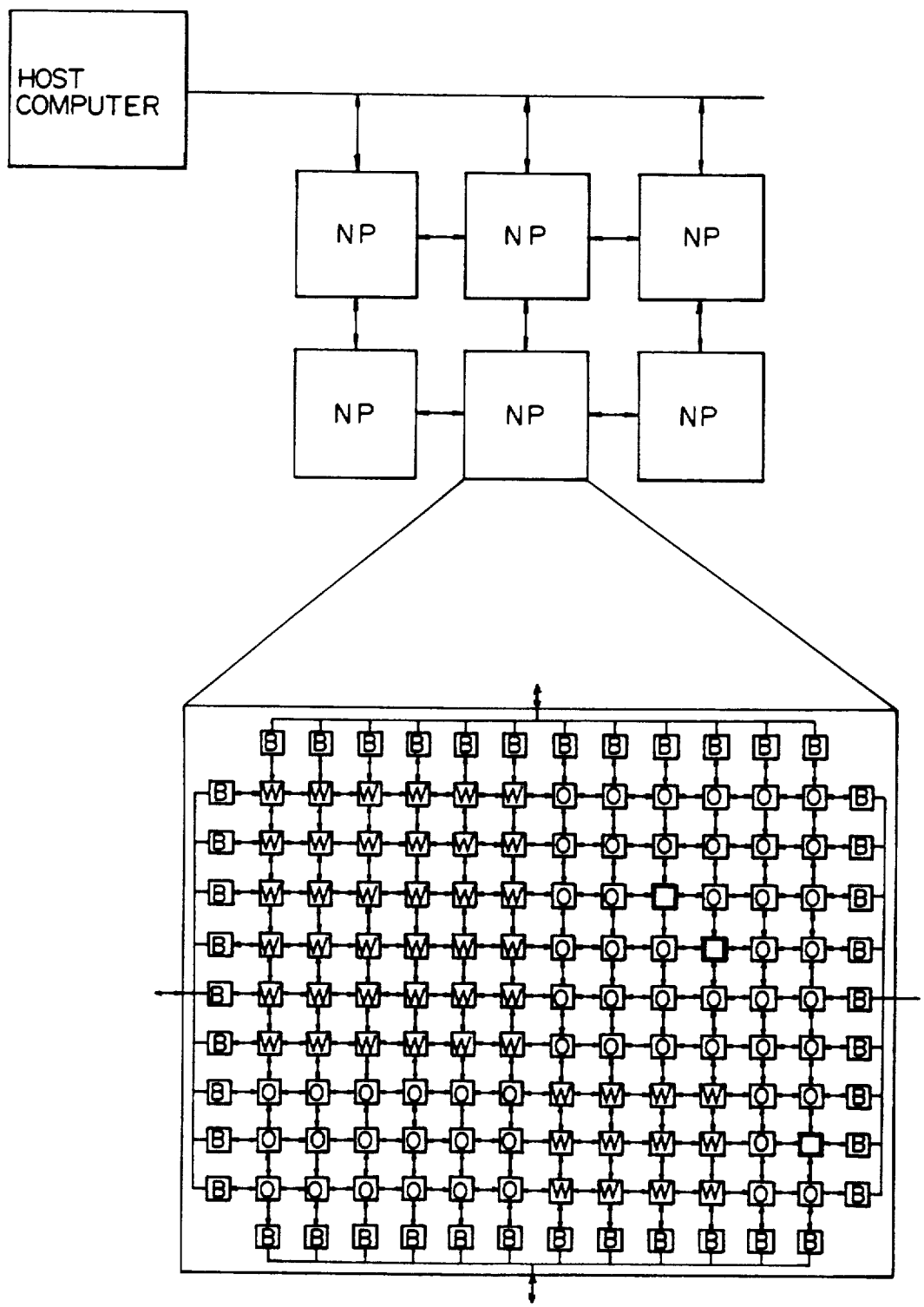
FIG. 31 is a view which illustrates the neuro-computer consisting of the node processors connected in the form of a rectangular lattice shape of two lines and three columns.

FIG. 30 is a view which illustrates the rearrangement and the division of the rectangular lattice including the synapse processors, cell processors, input processors, output processors, and input/output processors after the loads among node processors have been balanced by the permutation. FIG. 31 is a view which illustrates the architecture of the neuro-computer consist of the node processors connected to form a rectangular lattice and the virtual processors assigned to the node processors of the 2nd row and the 2nd column.

Many widely different embodiments of the present invention may be constructed without departing from the spirit and scope of the present invention. It should be understood that the present invention is not limited to the specific embodiments described in this specification, except as defined in the appended claims.

What is claimed is:

1. A neuro-computer connected to a host computer and having a plurality of different kinds of processing elements placed at each node of a lattice and connected with adjacent processing elements, said lattice of processing elements having first rectangular regions of processing elements, and said plurality of processing elements being divided into two groups, a first group of said two groups composed of said processing elements capable of receiving and transmitting data from and to said host computer and capable of receiving and transmitting data from and to each of said processing elements located adjacent in a second group of said two groups, and said second group composed of said processing elements capable of receiving and transmitting data from and to each of said processing elements located adjacent either in said first group or in said second group thereof, said neuro-computer comprising:

a plurality of physical processors, each of said physical processors being connected with said physical processors located adjacent thereof and a partial group of said physical processors being capable of receiving and outputting to and from said host computer;

a plurality of second rectangular regions of said lattice of processing elements, each of said second rectangular regions corresponding to each of said physical processors and including a plurality of different kinds of processing elements so that a plurality of said processing elements are mapped onto each of said physical processors, respectively; and means for distributing one section or a plurality of divided sections formed in said plurality of first rectangular regions of processing elements to said plurality of physical processors in such a manner that each of said plurality of divided sections being equally or almost equally embedded to each of said second rectangular regions which are assigned to each of said physical processors so as to make a balance of loads among said physical processors on said processing elements assigned to each of said physical processors.

2. A neuro-computer according to claim 1, wherein said distributing means is capable of distributing one section or a plurality of divided sections formed in a plurality of first rectangular regions of processing elements to said physical processors in such a manner that the number of columns of said processing elements in each of said first rectangular regions is equally or almost equally divided into a plurality of sections by the number of all of said physical processors or by the number of said physical processors in a column, and the number of rows of said processing elements in each of said first rectangular regions is equally or almost equally divided into a plurality of sections by the number of all of said physical processors or by the number of physical processors in a row, and one or a plurality of said divided sections in each of said first rectangular regions are equally or almost equally assigned to each of said second rectangular region by permutation of columns and rows in said lattice of processing elements so as to make a balance of loads among physical processors on said plurality of processing elements in each of said second rectangular regions assigned to each of said physical processors.

3. A neuro-computer according to claim 2, wherein one or a plurality of said divided sections in each of said first rectangular regions are assigned to each of said second rectangular regions by permutation of columns and rows in said lattice of processing elements in such a manner that each of said second rectangular regions includes said divided sections in each of said first rectangular regions, each of which has the same residue number generated by subtracting one from the column number of each of said sections in said first rectangular region and dividing the result by the number of said physical processors in a column as the column number minus one of said physical processor correspond to said second rectangular region and the same residue generated by subtracting one from the row number of each of said sections in said first rectangular region and dividing the result by the number of said physical processors in a row as the row number minus one of said physical processor correspond to said second rectangular region.

4. A neuro-computer according to claim 2, wherein said first rectangular regions are equally divided with residues generated during a formation of said divided sections thereof, all of said generated residues of rows and columns are individually stored in each of a plurality of residue arrays for rows and columns, respectively.

5. A neuro-computer according to claim 4, wherein said residues of rows and columns in said plurality of residue arrays are successively assigned to each of rows and columns of said physical processors by permutations of columns and rows in said lattice of processing elements so that each of second rectangular regions corresponding to each of said physical processors has differences being restricted within one row or one column in numbers of said rows and columns of said second rectangular region to be assigned to each of said physical processors.

6. A neuro-computer according to claim 1, wherein said processing elements in said first one of two groups include a plurality of input processors, output processors and input/output processors.

7. A neuro-computer according to claim 1, wherein said processing elements in said second group are divided into two types, said processing elements in one type of said two types being capable of product-sum functions and weight updating functions corresponding to functions of synapse, said processing elements in the other type of said two types being capable of threshold functions and neuro-dynamic functions corresponding to active functions of a neuron cell body.

8. A neuro-computer according to claim 7, wherein said processing elements in said second group include a plurality of synapse processors and cell processors.

9. A neuro-computer according to claim 1, wherein said lattice of processing elements is a toroidal lattice, and a configuration of said physical processor connections is a toroidal lattice.

10. A neuro-computer according to claim 1, wherein said lattice of processing elements is a rectangular lattice, and a configuration of said physical processor connections is a rectangular lattice.

11. A neuro-computer according to claim 1, wherein said first rectangular regions include methodical rectangular regions and/or homogeneous rectangular regions.

12. A neuro-computer connected to a host computer and having a plurality of different kinds of processing elements placed at each node of a lattice and connected with adjacent processing elements, said lattice of processing elements having first rectangular regions of processing elements, and said plurality of processing elements being divided into first and second groups, said first group composed of said processing elements capable of receiving and transmitting data from and to said host computer and from and to each of said adjacent processing elements in a second group of said two groups, and said second group composed of said processing elements capable of receiving and transmitting data from and to each of said adjacent processing elements in either said first group or said second group thereof, said neuro-computer comprising:

a plurality of second rectangular regions of said lattice of processing elements, each of said second rectangular regions corresponding to each of said physical processors and including a plurality of different kinds of processing elements so that a plurality of said processing elements are mapped onto each of said physical processors, respectively;

a plurality of physical processors, each of said physical processors being connected with said physical processors located adjacent thereof and a partial group of said physical processors being capable of receiving and outputting to and from said host computer; and means for distributing one section or a plurality of divided sections formed in said plurality of first rectangular regions of processing elements to said plurality of physical processors in such a manner that each of said plurality of divided sections being equally or almost equally embedded to each of said second rectangular regions which are assigned to each of said physical processors so as to make a balance of loads among said physical processors on said processing elements assigned to each of said physical processors, said distributing means capable of distributing one section or a plurality of divided sections formed in said plurality of first rectangular regions of processing elements to said physical processors in such a manner that the number of columns of said processing elements in each of said first rectangular regions is equally or almost equally divided into a plurality of sections by the number of all of said physical processors or by the number of said physical processors in a column, and the number of rows of said processing elements in each of said first rectangular regions is equally or almost equally divided into a plurality of sections by the number of all of said physical processors or by the number of physical processors in a row, and one or a plurality of said divided sections in each of said first rectangular regions are equally or almost equally assigned to each of said physical processors by permutation of columns and rows in said lattice of processing elements so as to make a balance of loads among physical processors on said plurality of processing elements assigned to each of said physical processors.

13. A neuro-computer according to claim 12, wherein one or a plurality of said divided sections in each of said first rectangular regions are assigned to each of said second rectangular regions by permutation of columns and rows in said lattice of processing elements in such a manner that each of said second rectangular regions includes said divided sections in each of said first rectangular regions, each of which has the same residue number generated by subtracting one from the column number of each of said sections in said first rectangular region and dividing the result by the number of said physical processors in a column as the column number minus one of said physical processor correspond to said second rectangular region and the same residue generated by subtracting one from the row number of each of said sections in said first rectangular region and dividing the result by the number of said physical processors in a row as the row number minus one of said physical processor correspond to said second rectangular region.

14. A neuro-computer according to claim 12, wherein said first rectangular regions are equally divided with residues generated during a formation of said divided sections thereof, all of said generated residues of rows and columns are individually said general stored in each of a plurality of residue arrays for rows and columns, respectively.

15. A neuro-computer according to claim 14, wherein said residues of rows and columns in said plurality of residue arrays are successively assigned to each of rows and columns of said physical processors by permutations of columns and rows in said lattice of processing elements so that each of said second rectangular regions corresponding to each of said physical processors has differences being restricted within one row or one column in numbers of said rows and columns of said second rectangular region to be assigned to each of said physical processors.

16. A neuro-computer according to claim 12, wherein said processing elements in said first one of two groups include a plurality of input processors, output processors, and input/output processors.

17. A neuro-computer according to claim 12, wherein said processing elements in said second group are divided into two types, said processing elements in one type of said two types being capable of product-sum functions and weight updating functions corresponding to functions of synapse, said processing elements in the other type of said two types being capable of threshold functions and neuro-dynamic functions corresponding to activation functions of a neuro cell body.

18. A neuro-computer according to claim 17, wherein said processing elements in said second group include a plurality of synapse processors and cell processors.

19. A neuro-computer according to claim 12, wherein said lattice of processing elements is a toroidal lattice, and a configuration of said physical processor connections is a toroidal lattice.

20. A neuro-computer according to claim 12, wherein said lattice of processing elements is a rectangular lattice, and a configuration of said physical processor connections is a rectangular lattice.

21. A neuro-computer according to claim 12, wherein said first rectangular regions include methodical rectangular regions and/or homogeneous rectangular regions.

22. A neuo-computer connected to a host computer and having a plurality of different kinds of processing elements placed at each node of a lattice and connected with adjacent processing elements, said lattice of processing elements having first rectangular regions of processing elements, and said plurality of processing elements being divided into two groups, a first group of said two groups composed of said processing elements capable of receiving and transmitting data from and to said host computer and capable of receiving and transmitting data from and to each of said processing elements located adjacent in a second group of said two groups thereof, and said second group composed of said processing elements capable of receiving and transmitting data from and to each of said processing elements located adjacent either in said first group or in said second group thereof, said neuro-computer comprising:

a plurality of physical processors, each of said physical processors being connected with said physical processors located adjacent thereof and a partial group of said physical processors being capable of receiving and outputting to and from said host computer;

a plurality of second rectangular regions of said lattice a plurality of processing elements, each of said second rectangular regions corresponding to each of said physical processors and including a plurality of two groups of processing elements so that a plurality of said processing elements are mapped onto each of said physical processors, respectively, said processing elements in said first one of two groups including a plurality of input processors, output processors, and input/output processors, said processing elements in said second group being divided into two types, said processing elements in one type of said two types being synapse processors capable of product-sum functions and weight updating functions corresponding to functions of synapse, said processing elements in the other type of said two types being cell processors capable of threshold functions and neuro-dynamic functions corresponding to activation functions of a neuron cell body; and means for distributing one section or a plurality of divided sections formed in said plurality of first rectangular regions of processing elements to said plurality of physical processors in such a manner that each of said plurality of divided sections being equally or almost equally embedded to each of said second rectangular regions which are assigned to each of said physical processors so as to make a balance of loads among said physical processors on said processing elements assigned to each of said physical processors.

23. A neuro-computer according to claim 22, wherein said distributing means is capable of distributing one section or a plurality of divided sections formed in said plurality of first rectangular regions of processing elements to said physical processors in such a manner that the number of columns of said processing elements in each of said first rectangular regions is equally or almost equally divided into a plurality of sections by the number of all of said physical processors or by the number of said physical processors in a column, and the number of rows of said processing elements in each of said number of rows first rectangular regions is equally or almost equally divided into a plurality of sections by the number of all said physical processors or by the number of physical processors in a row, and one or a plurality of said divided sections in each of said first rectangular regions being equally or almost equally assigned to each of said physical processors by permutation of columns and rows in said lattice of processing elements so as to make a balance of loads among said physical processors on said plurality of processing elements assigned to each of said physical processors.

24. A neuro-computer according to claim 23, wherein one or a plurality of said divided sections in each of said first rectangular regions are assigned to each of said second rectangular regions by permutation of columns and rows in said lattice of processing elements in such a manner that each of said second rectangular regions includes said divided sections in each of said first rectangular regions, each of which has the same residue number generated by subtracting one from the column number of each of said sections in said first rectangular region and dividing the result by the number of said physical processors in a column as the column number minus one of said physical processor correspond to said second rectangular region and the same residue generated by subtracting one from the row number of each of said sections in said first rectangular region and dividing the result by the number of said physical processors in a row as the row number minus one of said physical processor correspond to said second rectangular region.

25. A neuro-computer according to claim 23, wherein said first rectangular regions are equally divided with residues generated during a formation of said divided sections thereof, all of generated residues of rows and columns are individually stored in each of a plurality of residue arrays for rows and columns, respectively.

26. An neuro-computer according to claim 25, wherein said residues of rows and columns in said plurality of residual arrays are successively assigned to each of rows and columns of said physical processors by permutations of columns and rows in said lattice of processing elements so that each of second rectangular regions corresponding to each of said physical processors has differences being restricted within one row or one column in numbers of said rows and columns of said second rectangular region to be assigned to each of said physical processors.

27. A neuro-computer according to claim 22, wherein said lattice of processing elements is a toroidal lattice, and a configuration of said physical processor connections is a toroidal lattice.

28. A neuro-computer according to claim 22, wherein said lattice of processing elements is a rectangular lattice, and a configuration of said physical processor connections is a rectangular lattice.

29. A neuro-computer connected to a host computer and having a plurality of different kinds of processing elements placed at each node of a lattice and connected with adjacent processing elements, and said plurality of processing elements being divided into two groups, a first group of said two groups composed of said processing elements capable of receiving and transmitting data from and to said host computer and capable of receiving and transmitting data from and to each of said processing elements located adjacent in a second group of said two groups, and said second group of said two groups composed of said processing elements capable of receiving and transmitting data from and to each of said processing elements located adjacent either in said first group or in said second group thereof, said neuro-computer comprising:

said plurality of processing elements in said first group being arranged in a third rectangular region consisting of a row in said lattice and including a plurality of input processors, output processors, and input/output processors, said input processors being connected with said host computer and capable of receiving data from said host computer and receiving and transmitting data from and to each of said processing elements adjacently connected in a second group, said output processors being connected with said host computer and capable of transmitting data to said host computer and receiving and transmitting data from and to each of said processing elements adjacently connected in a second group, said input/output processors being connected with said host computer and capable of receiving and transmitting data from and to said host computer and receiving and transmitting data from and to each of said processing elements adjacently connected in a second group; and said plurality of processing elements in said second group being arranged in a fourth rectangular region consisting of rows in said lattice except the said row on which processing elements of said first group are arranged and including a plurality of synapse processors and cell processors, each of said cell processors being arranged on each row of said fourth rectangular region in such a manner that just one cell processor is placed in a row and at most one cell processor is placed in a column and connected with adjacent synapse processors and each of said synapse processors being arranged on the other nodes of said fourth rectangular region and connected with adjacent cell processors and synapse processors.

30. A neuro-computer according to claim 29, wherein each of said synapse processors has memories for data of weights and is capable of receiving data from a right or left adjacent processing element and transferring said data to a left or right adjacent processing element, respectively, and capable of receiving data from an upper or lower adjacent processing element, and transferring said data to a lower or upper adjacent processing element, respectively, and capable of calculating a product of a said weight datum and a datum receiving from an upper or lower adjacent processing element and capable of adding said product to a datum receiving from a right or left adjacent processing element and transmitting said sum to a left or right adjacent processing element, respectively, and capable of calculating a product of said weight datum and a datum receiving from a right or left adjacent processing element and capable of adding said product to a datum receiving from an upper or lower adjacent processing element, and transmitting said sum to a lower or upper adjacent processing element, respectively, and capable of updating said weight datum according to data receiving from an upper or lower adjacent processing element and from a right and left adjacent processing element corresponding to functions of synapse.

31. A neuro-computer according to claim 29, wherein each of said cell processors has memories for data of activation and is capable of receiving data from right, left, upper or lower adjacent processing elements and transmitting data to left, right, upper or lower adjacent processing elements and is capable of calculating a threshold functions and neuro-dynamic functions corresponding to activation functions of a neuron cell body.

32. A neuro-computer according claim 29, wherein said lattice of processing elements is a toroidal lattice, and said connections between processing elements consist of one-way communication channels.

33. A neuro-computer according to claim 29, wherein said lattice of processing elements in a rectangular lattice, and said connections between processing elements consist of two-way communication channels.

* * * * *